INVENTORS
Delvin E. Kendall Jr.,
Robert C. Mack and Robert R. Wellock
BY
Teller & McCormick
ATTORNEYS July 2, 1963  D. E. KENDALL, JR., ETAL  3,096,046
REMOTE CONTROL OF ROBOT AIRCRAFT
Filed Nov. 14, 1958  18 Sheets-Sheet 3

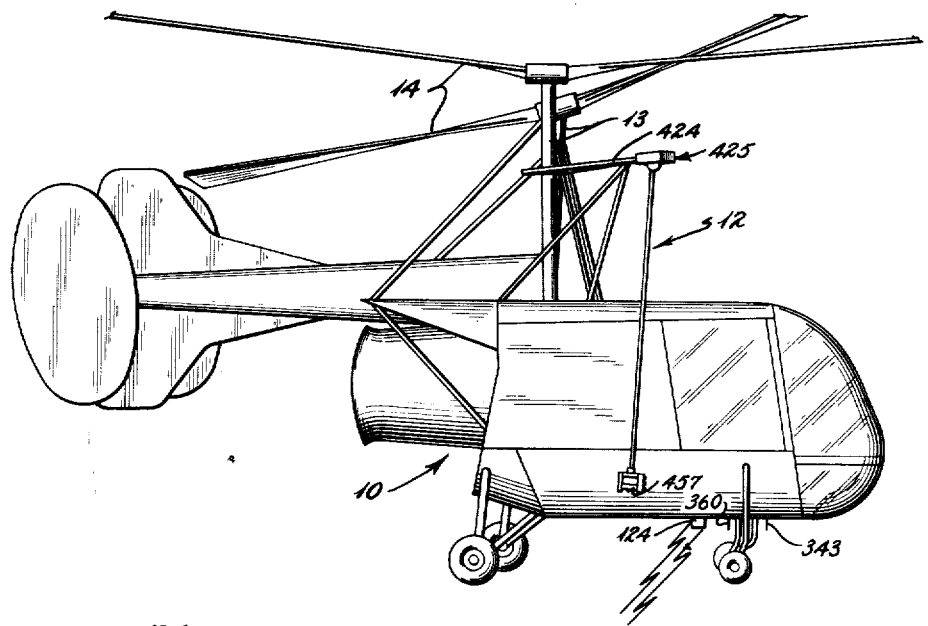
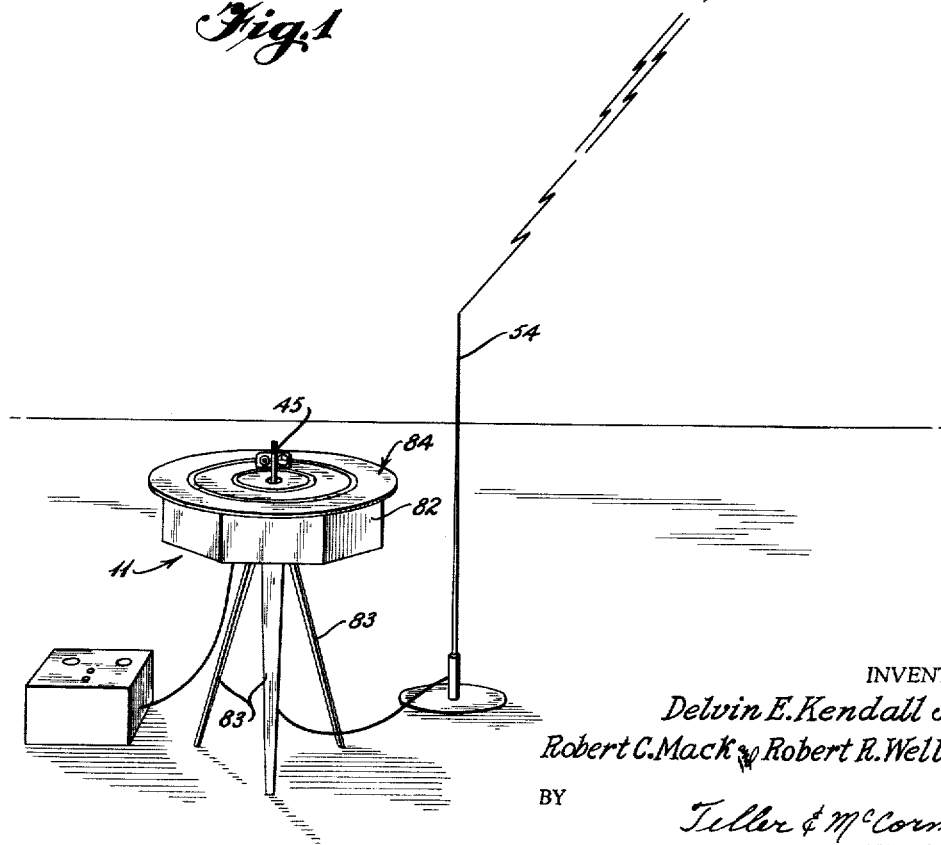
Fig. 1
INVENTORS
Delvin E. Kendall Jr.,
Robert C. Mack & Robert R. Wellock
BY
Teller & McCormick
ATTORNEYS July 2, 1963  D. E. KENDALL, JR., ETAL  3,096,046
REMOTE CONTROL OF ROBOT AIRCRAFT
Filed Nov. 14, 1958  18 Sheets-Sheet 2

INVENTORS
Delvin E. Kendall Jr.,
Robert C. Mack & Robert R. Wellock
BY
Teller & McCormick
ATTORNEYS

Fig. 11

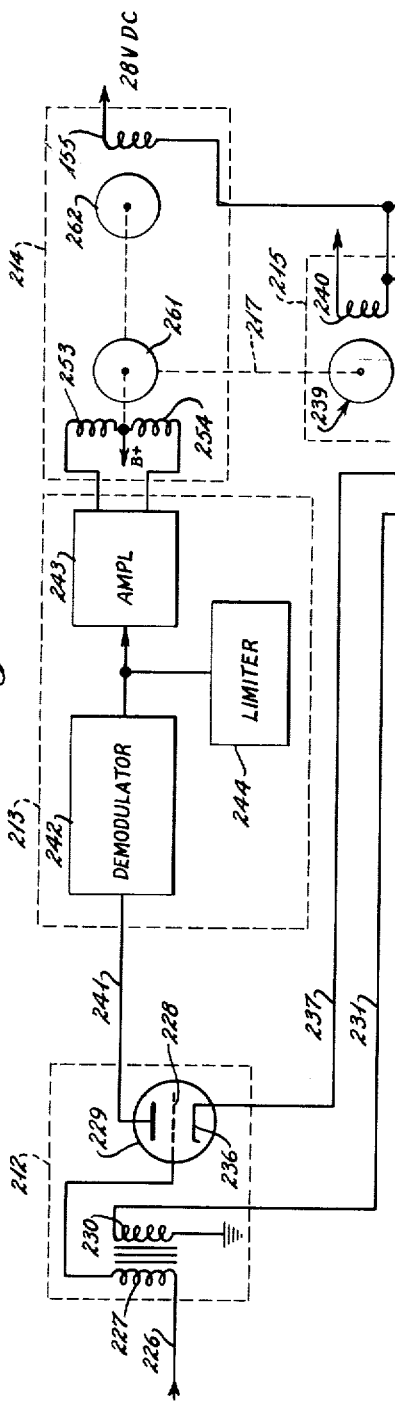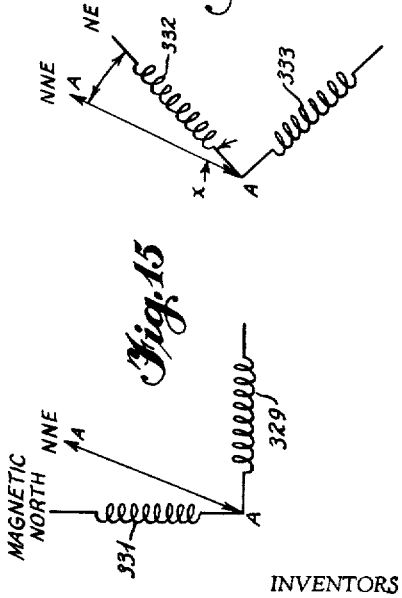

INVENTORS
Delvin E. Kendall Jr.,
Robert C. Mack & Robert R. Wellock

BY

ATTORNEYS

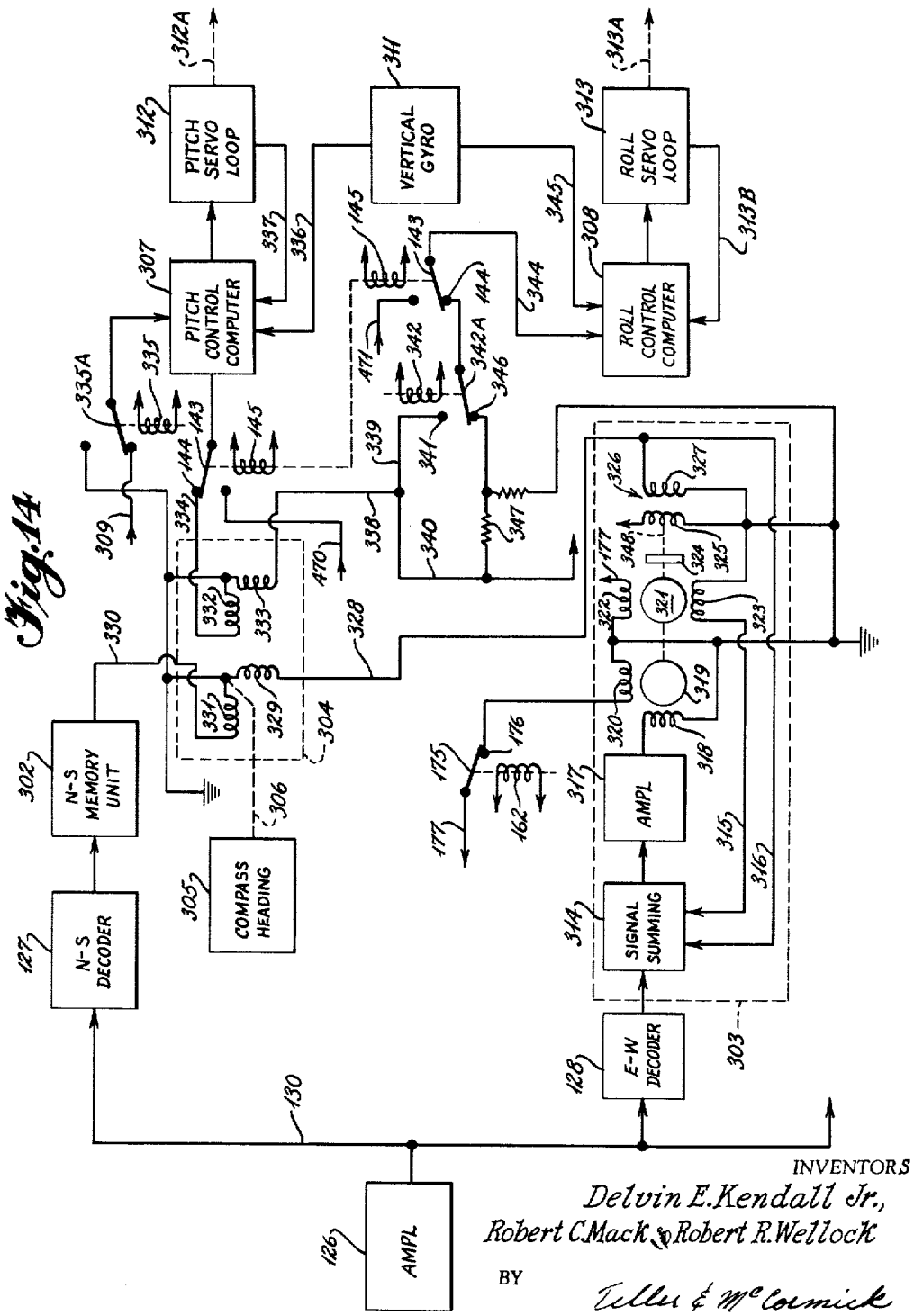

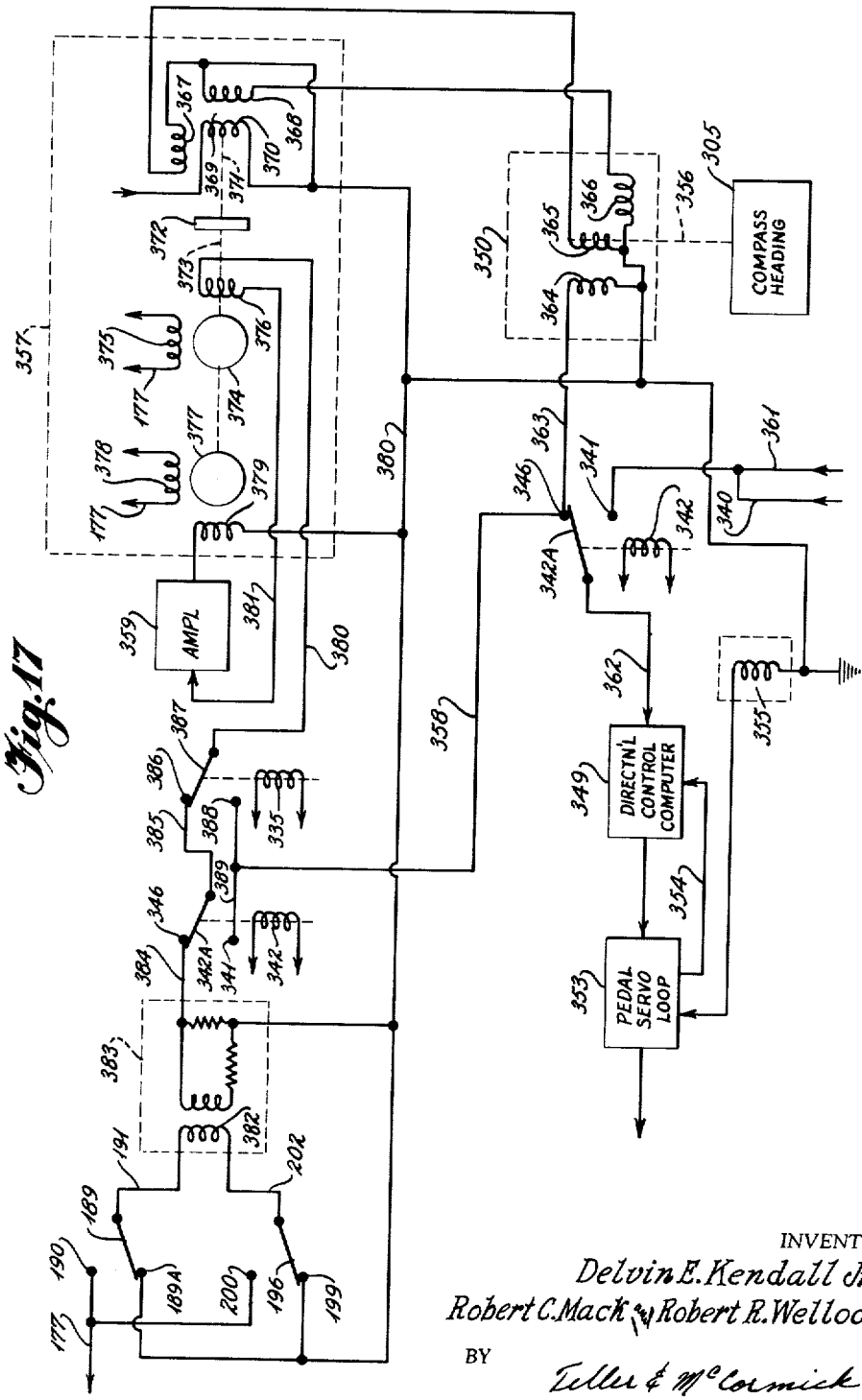

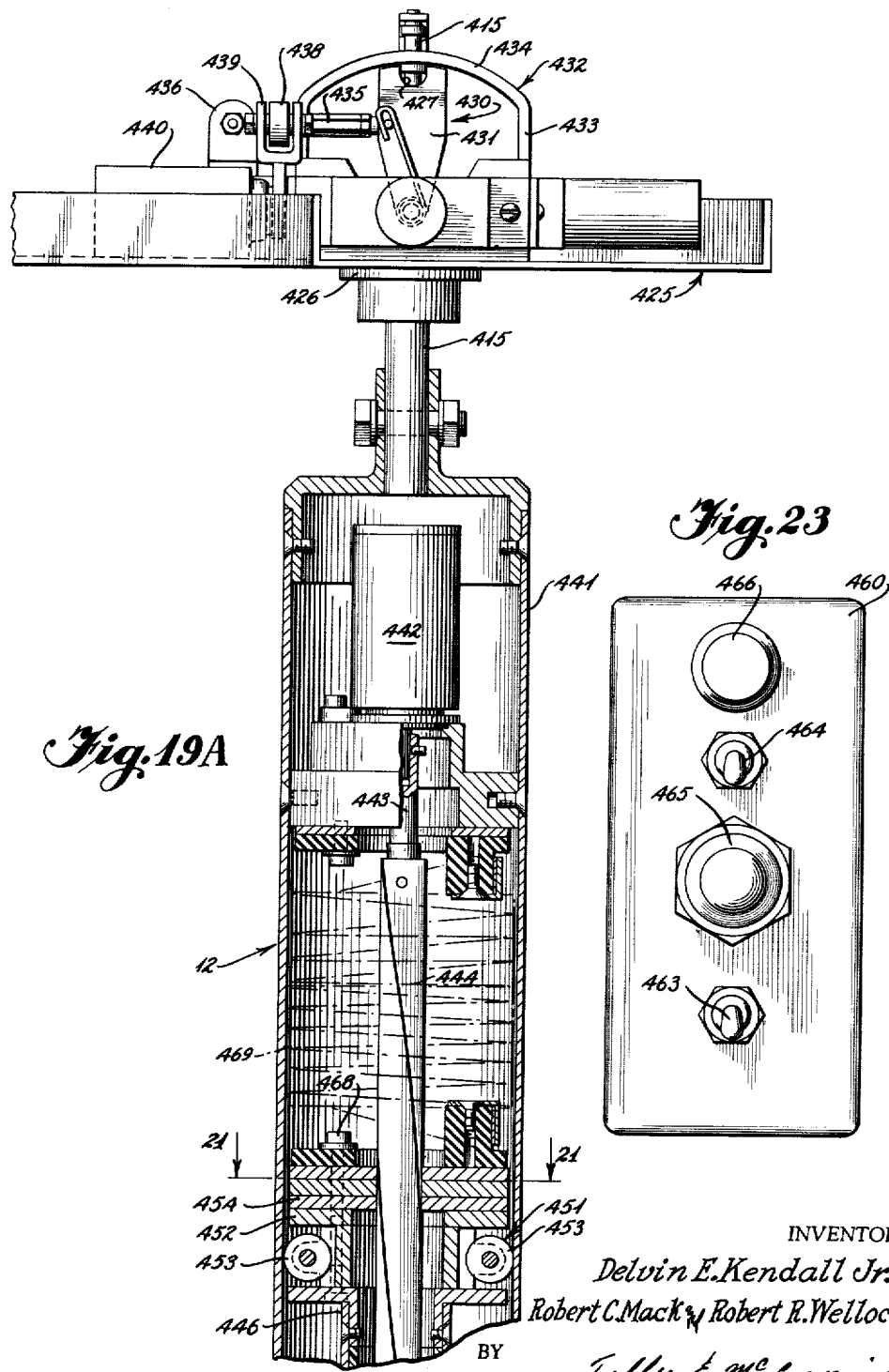

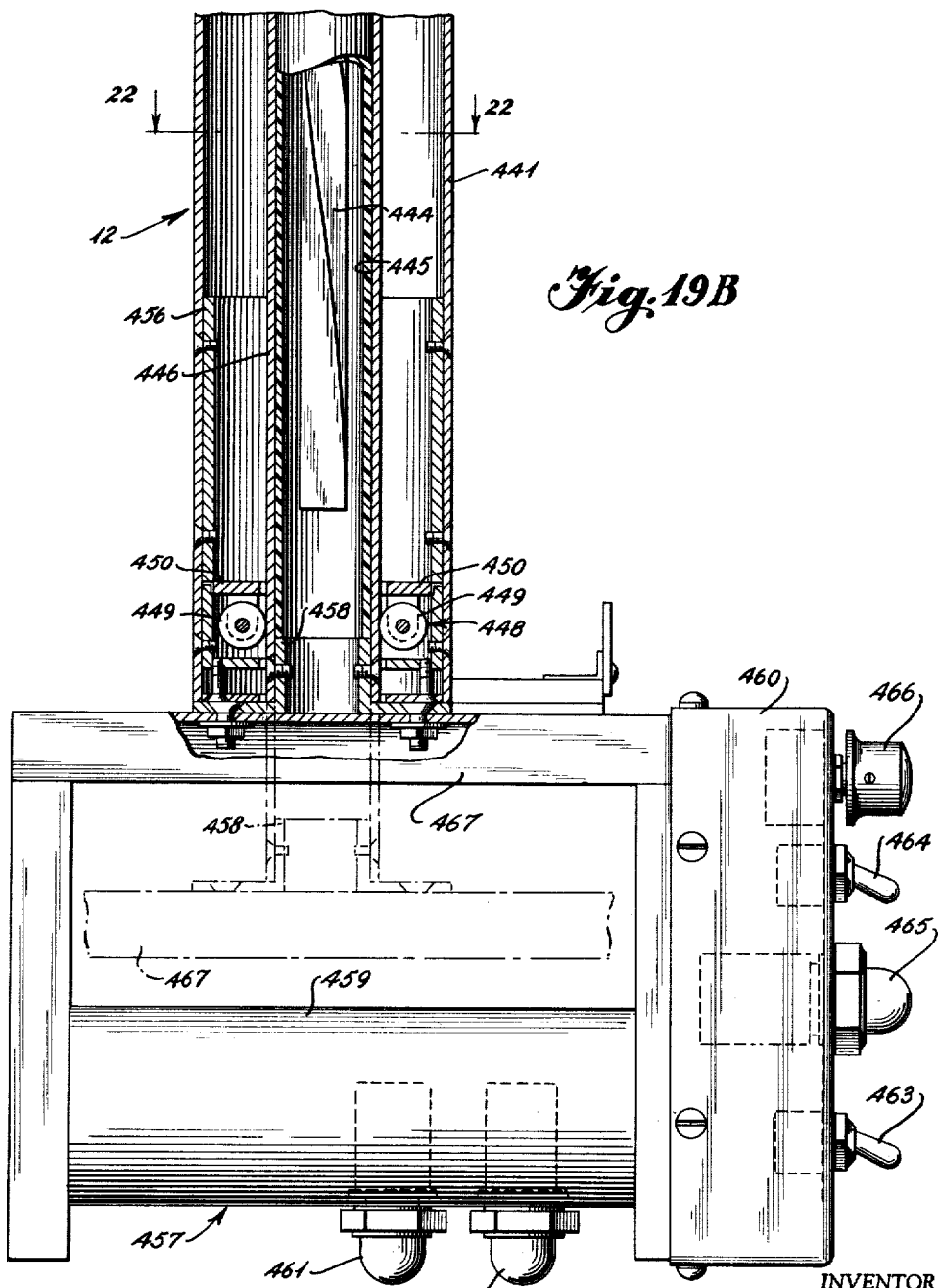

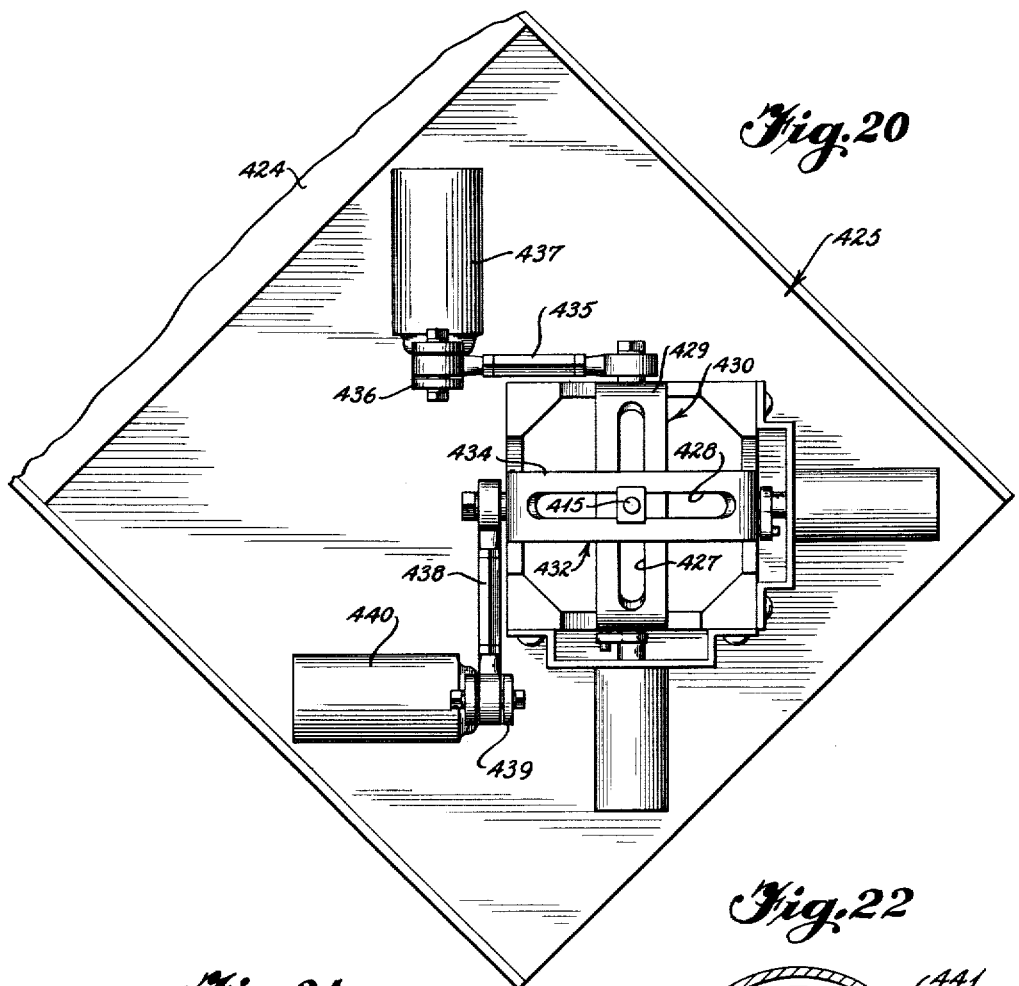
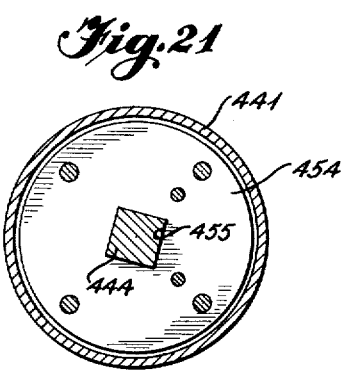
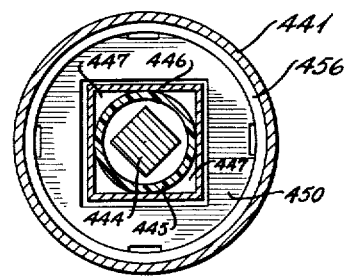

July 2, 1963
D. E. KENDALL, JR., ETAL
3,096,046
REMOTE CONTROL OF ROBOT AIRCRAFT
Filed Nov. 14, 1958
18 Sheets-Sheet 18
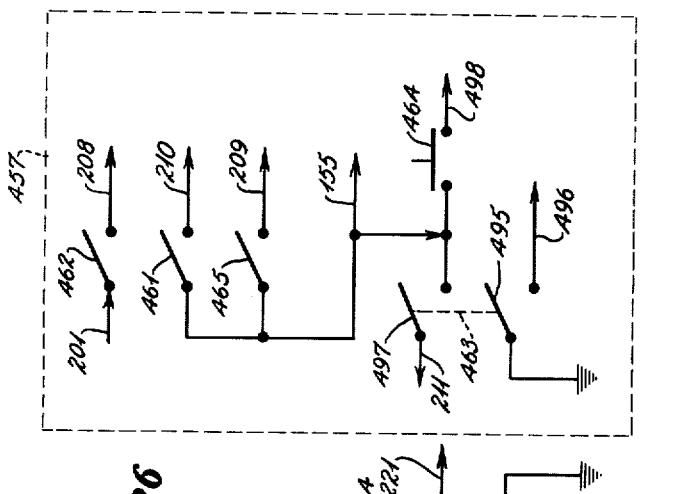
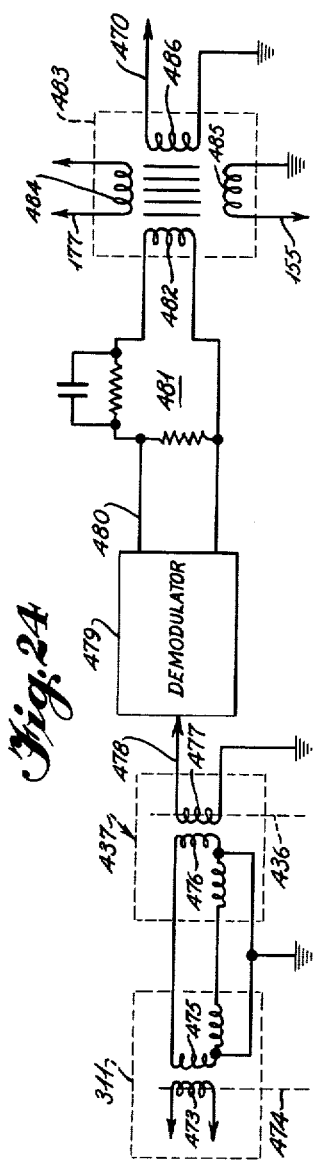
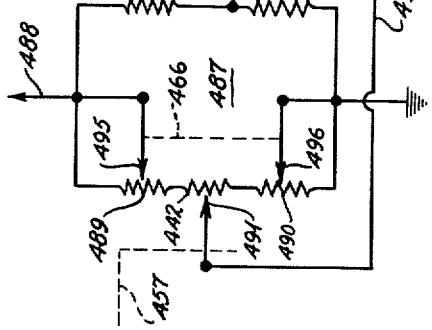
INVENTORS
*Delvin E. Kendall Jr.,
Robert C. Mack & Robert R. Wellock*
BY
*Tiller & McCormick*
ATTORNEYS

3,096,046
REMOTE CONTROL OF ROBOT AIRCRAFT
Delvin E. Kendall, Jr., West Hartford, Robert C. Mack, Warehouse Point, and Robert R. Wellock, Newington, Conn., assignors to Kaman Aircraft Corporation, a corporation of Connecticut
Filed Nov. 14, 1958, Ser. No. 773,964
49 Claims. (Cl. 244—17.13)

This invention relates to remote control of robot aircraft and, more particularly, is directed to the problem of providing a workable and practicable remote control system for a robot rotary wing aircraft, such as a robot helicopter, whereby the robot may perform missions which would be impractical, hazardous, or impossible to perform with a piloted helicopter.

While remote control systems for fixed wing aircraft are known, such systems are not readily adaptable to control of rotary wing aircraft because of the inherent differences in the modes of operation of the two types of aircraft. Thus, quite apart from the fact that control of forward, or moving, flight of a rotary wing aircraft is relatively more complicated than control of forward flight of a fixed wing aircraft, a rotary wing aircraft, such as a helicopter, may be operated in a hover mode which has no counterpart in the operation of fixed wing aircraft. Controls necessary to operate a helicopter, for example, in the hover mode are multiple and interrelated as is brought out more fully hereinafter. Consequently, to be fully satisfactory for the purpose intended, a remote control system for a rotary wing aircraft, such as a robot helicopter, must be capable of commanding the robot helicopter to perform moving flight as desired, and yet also be able to command operation in the hover mode with essentially the same reliability as if a pilot were present in the helicopter. The present invention provides such a system and, to our knowledge, is the first workable and practicable remote control system for a robot helicopter.

It is therefore an object of the present invention to provide new and improved methods and apparatus for remote control of robot aircraft.

It is another object of the present invention to provide such methods and apparatus whereby an operator of the system can exercise complete remote control of a robot aircraft from takeoff to landing.

It is another object of the present invention to provide such methods and apparatus whereby the robot aircraft can be commanded to perform long distance flights on previously memorized commands.

It is another object of the present invention to provide such methods and apparatus whereby a robot rotary wing aircraft may be operated in the hover mode.

It is another object of the present invention to provide such apparatus which includes an improved ground controller for commanding the direction and speed of the robot aircraft.

It is another object of the present invention to provide such apparatus which includes means for achieving precision hover of a robot rotary wing aircraft under control of a ground handler.

Briefly described, a preferred practice of the present invention, for remotely controlling a robot helicopter, comprises producing, at a remote control location, North-South and East-West signals having a vector sum oriented in the compass direction in which it is desired to have the robot helicopter fly and a magnitude proportional to the desired air speed. These North-South and East-West signals are transmitted, as a composite signal which may include other component signals as described hereinafter, to the robot helicopter where the composite signal is received and decoded into North-South and East-West signals having magnitudes which are proportional, respectively, to the North-South and East-West signals produced at the remote location.

The North-South and East-West signals thus produced in the robot helicopter are combined into a resultant signal having an orientation in the desired compass direction (i.e., corresponding to the orientation of the vector sum at the remote location) and a magnitude proportional to the desired air speed. This resultant signal is then resolved into electrical signals representing fuselage pitch angle and roll angle commands, and these electrical signals are then converted into mechanical flight control movements which cause the robot helicopter to move in the commanded compass direction and at the commanded air speed, the latter, of course, also being dependent on wind conditions. Furthermore, such remote control can be effected whether the helicopter is flying at a relatively high airspeed or is being operated in the hover mode.

Other signals which may be produced at the remote control location include altitude (collective pitch control) signals, a signal for assuming remote control of the robot helicopter, left or right turn signals, a heading hold signal, mission or engine shutdown signals, and a signal to cause the robot helicopter to fly on memorized commands. These other signals, when produced, are included in the composite signal transmitted to the helicopter and decoded into component signals corresponding to the respective signals produced at the remote control location. The decoded signals are then converted into the necessary mechanical control movements, where required, for executing the commands involved.

A preferred embodiment of apparatus according to the present invention comprises two basic parts. One part is the remote control station, and the other part is control apparatus carried by the robot helicopter which receives and executes commands issued from the remote control station.

The remote control station includes a remote controller which, in a preferred mechanical embodiment, comprises a tripod mounted casing having a table surface from which a control stick for controlling heading and air speed projects centrally upwardly. A rotatable ring member is mounted on the table surface for controlling collective pitch in order to control the altitude of the robot helicopter. The flight direction and air speed commands of the remote operator originate at the heading-air speed control stick. By orienting a reference side of the remote controller to magnetic North, a spatial correspondence exists between the azimuth in which the control stick is deflected and the direction in which the robot helicopter will fly. When the control stick is deflected, it can actuate two potentiometers, one located along a North-South axis, and the other located along an East-West axis, so that North-South and East-West electrical signal components of the desired compass direction of flight are produced. Rotation of the collective ring actuates a collective potentiometer to produce an electrical signal proportional to the desired change in altitude.

The remote controller also includes sub-carrier oscillators which are frequency modulated by the proportional North-South, East-West, and collective potentiometer outputs. The modulated sub-carrier frequencies are fed to a command transmitter and frequency modulate the carrier wave of the transmitter. Other signal producing means in the remote controller also frequency modulate one of the sub-carrier oscillators so that these other signals may be included in the composite signal transmitted by the command transmitter to the robot helicopter.

The control apparatus carried by the robot helicopter includes a receiver for receiving the transmitted composite signal, and decoders for decoding the composite signal into component parts. Electrical components connected to decoders reproduce the North-South and East-West component signals and combine them into a resultant magnetic flux signal having a compass orientation corresponding to that in which the ground control stick was deflected, and a magnitude proportional to the amount by which the ground control stick was deflected away from vertical. An electrical resolver apparatus resolves the resultant magnetic flux signal into electrical signals representing the required pitch and roll commands. These electrical signals are fed to associated servo-mechanisms which convert the electrical signals into mechanical flight control movements which bring the robot helicopter onto the commanded heading and cause it to fly at the commanded air speed.

Electrical components connected to the collective decoder produce electrical signals representing the commanded collective pitch correction. These signals are fed to an associated servo-mechanism which converts the electrical signals into mechanical collective pitch control movements. Other signals produced at the remote control location are decoded and fed to a switch functions system which includes a plurality of relays, each responsive to a particular signal. Through electrical components associated therewith, these relays cause connections to be made in the electrical circuitry of the control apparatus carried by the robot helicopter so that, where necessary, the electrical signals representing particular commands are executed as mechanical control movements.

Other components of the control apparatus carried by the robot helicopter include means for automatically maintaining a predetermined altitude, means for stabilizing the direction of flight of the robot helicopter, means for regulating engine speed of the robot helicopter, and means to remember the last commanded heading and air speed whereby the robot helicopter may be put on memory and will fly in the last commanded direction and at the last commanded air speed.

A precision hover, or halter, apparatus, attached to the robot helicopter, is an auxiliary control apparatus adapted to be manipulated by a ground handler so as to maneuver the helicopter very accurately when it is hovering slightly above the ground surface. Essentially, the apparatus slaves the helicopter to the position of the grip, held by the handler, located at the bottom of the halter.

A preferred mechanical arrangement of the precision hover, or halter, apparatus comprises a telescoping tube which is mounted at the top by a bearing mechanism carried by the helicopter which gives the tube freedom to swing fore and aft and laterally. Synchro-mechanisms at the halter mount, operating in connection with the vertical gyroscope forming a part of the control apparatus for the robot helicopter, apply signals to the robot pitch and stabilization components whenever the halter is moved away from a vertical attitude.

The lengthwise telescoping action of the halter is instrumented to provide a "tight altitude control" in which the helicopter automatically maintains a fixed height above the halter grip. The grip itself contains a switch by which the handler connects the halter into the automatic control system, overriding any remote commands present. Signals from the halter grip and mount are fed to a halter computer which is part of the control apparatus carried by the robot helicopter, and the signals are modified for stabilization and then used to actuate pitch, roll, collective, and heading control mechanisms as required.

Other objects and advantages of the present invention will become more apparent from the following detailed description taken in conjunction with the attached drawings, in which:

FIG. 1 shows components of a remote control station according to the present invention, and a robot helicopter (with a precision hover apparatus attached thereto) indicated as being controlled from the remote control station;

FIG. 3 is an electrical circuit diagram of the potentiometers shown in FIG. 2;

FIG. 4 is an electrical circuit diagram of memory-control switching circuitry shown in block form in FIG. 2;

FIG. 11 is an electrical circuit diagram, partly in block form, of the collective (altitude) channel shown in FIG. 8;

FIG. 12 is an electrical circuit diagram, partly in block form, of the collective control computer and servo-mechanism shown in FIG. 11;

FIG. 14 is an electrical circuit diagram, partly in block form, of the pitch and roll channels shown in FIG. 8;

FIG. 15 is a detail view showing North-South and East-West windings forming a part of a resolver component of the circuitry of FIG. 14;

FIG. 16 is another detail view showing helicopter oriented windings forming another part of said resolver component of the circuitry shown in FIG. 14;

FIG. 17 is an electrical circuit diagram, partly in block form, of the directional, or yaw, control channel shown in FIG. 8;

FIGS. 19A and 19B are, collectively, an elevational view, partly in section, of a precision hover, or halter, apparatus according to an embodiment of the present invention;

FIG. 20 is a plan view of the mounting structure, and electrical components associated therewith, for the precision hover apparatus shown in FIGS. 19A and 19B;

FIG. 21 is a sectional view, taken on line 21—21 of FIG. 19A;

FIG. 22 is a sectional view taken on line 22—22 of FIG. 19B;

FIG. 23 is an end view of the handle assembly shown in FIG. 19B;

FIG. 24 is an electrical circuit diagram, partly in block form, of the precision hover pitch control system;

FIG. 25 is an electrical circuit diagram of the precision hover collective control system; and FIG. 26 is an electrical circuit diagram of the switching system of the precision hover, or halter, apparatus.

Figure 2:
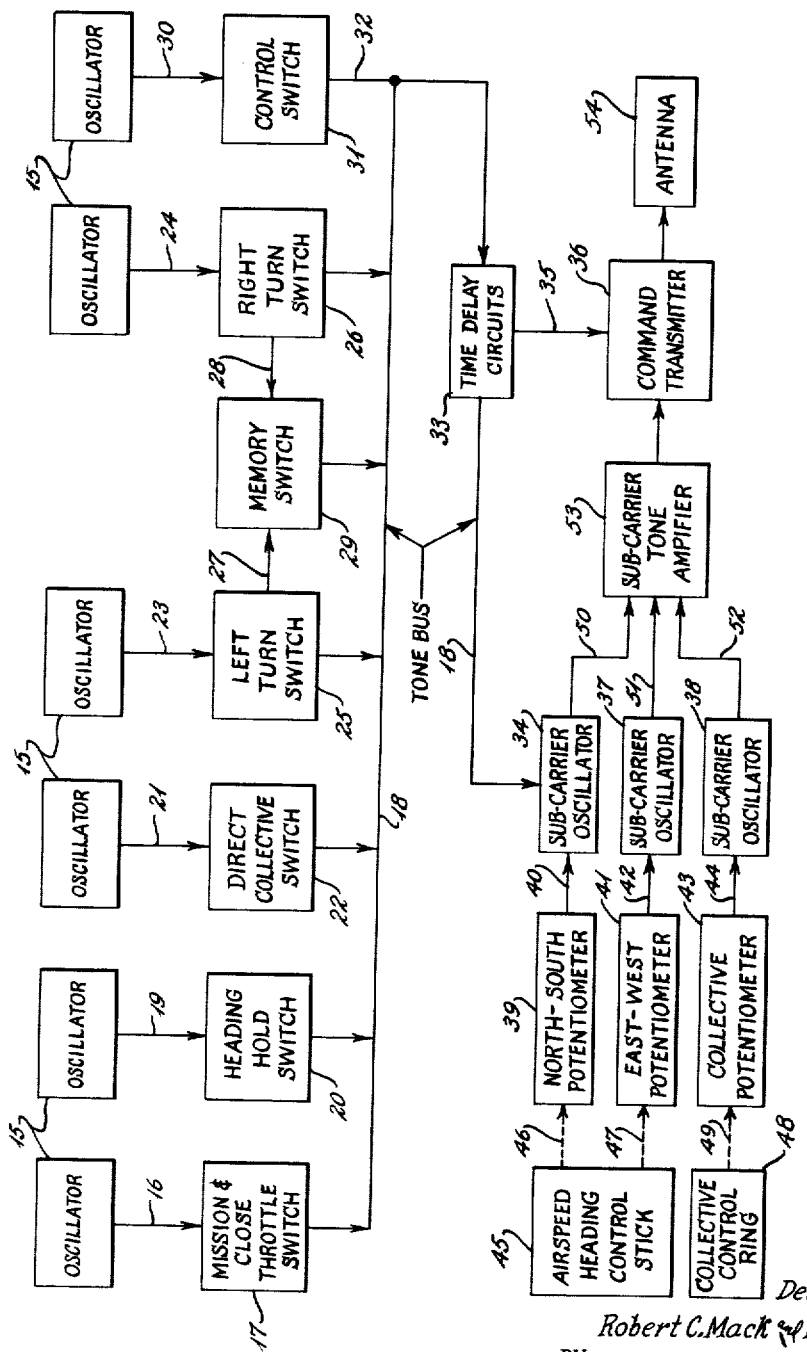
FIG. 2 is a block diagram of mechanical and electrical components of a ground control station according to an embodiment of the present invention.

Referring to the drawings, FIG. 1 shows a rotary wing aircraft, designated generally by the reference numeral 10, under control of signals being sent from a ground control station designated generally by the reference numeral 11. A precision hover, or halter, apparatus, designated generally by the reference numeral 12, is shown as being carried by the rotary wing aircraft 10. The electrical and mechanical components carried by the rotary wing aircraft 10 which receive and execute the commands from the ground control station 11 are, of course, not shown in any detail in FIG. 1. Instead, FIG. 1 is intended to present a very general view of the major assemblies making up an apparatus according to the present invention, these assemblies being the ground control station (or airborne control station if desired), the robot aircraft itself which carries the equipment which receives and executes the commands sent from the ground control station, and the halter apparatus which enables a ground handler to precisely hover the robot aircraft with respect to the ground surface.

The rotary wing aircraft shown in FIG. 1 is a representation of a model HTK helicopter manufactured by the assignee of the present invention. Such a helicopter has a pair of upwardly extending, diverging rotor shafts 13, each of which carries a rotary wing or blade assembly 14. When the rotor shafts 13 are driven, the rotary wings 14 rotate simultaneously in opposite directions with the blade assemblies, of course, clearing each other due to their relative inclination and common velocity.

As will be appreciated by those skilled in the art, altitude control, i.e., up and down movement of helicopter 10, is effected by varying the collective pitch of airfoil surfaces forming a part of the rotary wing or blade assemblies 14. The direction of flight and the air speed of the helicopter are controlled by tilting the rotor lift vector away from vertical in the desired direction and by an amount sufficient to produce the desired air speed. Such rotor lift vector tilt away from vertical involves varying the longitudinal cyclic pitch and lateral cyclic pitch of air foil surfaces forming a part of the rotary wings or blade assemblies as will again be appreciated by those skilled in the art. In addition to the flight controls just mentioned, the helicopter conventionally includes means operable by the pilot to control engine speed, and to turn the helicopter right or left while hovering.

Inasmuch as the actual airfoil surfaces on the rotary wings or blade assemblies and the conventional mechanical control members which are actuated to operate the helicopter are not per se the present invention, further description of such features is deemed unnecessary for an understanding of the present invention by those skilled in the art. To the extent that further description of such features is desired, reference is made to U.S. Letters Patent No. 2,695,674, issued to the assignee of the present invention, which shows and describes mechanical controls applicable to a model HTK helicopter.

While methods and apparatus according to the present invention have been utilized successfully to operate the aforementioned model HTK helicopter, the teaching of the present invention is also applicable to operation of helicopters having a pair of coaxially mounted rotors, those having single rotors positioned fore and aft of the helicopter, and those having a single rotor plus an aft mounted propeller for directional, or yaw, control. In other words, the present invention provides means to produce, by remote control, the mechanical control movements which, in a piloted helicopter, would be produced by the pilot. Since such mechanical control movements involve, for helicopters generally, controlling collective pitch, longitudinal cyclic pitch, lateral cyclic pitch, engine speed, and turning movements, methods and apparatus according to the present invention may therefore be considered as having utility for remote control of helicopters generally.

Since the precision hover, or halter, apparatus may be considered as an auxiliary apparatus for controlling the robot helicopter, a remote control system according to the present invention may be considered as comprising two basic parts. One of these parts is the ground control station, or airborne control station, from which the remote operator's manual commands are transmitted by radio. The other part is the robot helicopter incorporating the automatic control apparatus wherein the flight commands are received and executed. The detailed description of the present invention is therefore presented in the sequence of describing first the ground control station (with the airborne control station being discussed in relation thereto), then describing the airborne apparatus which receives and executes the flight commands, and then describing the auxiliary precision hover, or halter, apparatus. To facilitate following the detailed description, it is presented under applicable subject headings, the first of which follows immediately.

*Ground Control Station*

An embodiment of a ground control station according to the present invention incorporates both electrical and mechanical features. Electrical features are described first because it is believed that this will facilitate an understanding of the mechanical features. Accordingly, reference is made next to FIG. 2 which is a block diagram of a ground control station according to an embodiment of the present invention.

Referring to FIG. 2, the blocks 15 designate substantially fixed frequency output oscillators, each of which has a particular frequency output, or tone, for a particular function to be commanded by the operator at the ground control station. These oscillators preferably have a frequency output controllable to within one-tenth of a cycle per second, thereby providing a very precise frequency output, or tone. Inasmuch as such oscillators are known to those skilled in the art, further description thereof is deemed to be unnecessary, it being understood that any suitable such oscillator may be employed.

An output lead 16 extends from one of the oscillators 15 shown in FIG. 2 to a switch designated generally by block 17 whereby, when switch 17 is closed, output lead 16 is connected to a common bus 18 which is hereinafter referred to as the tone bus. As is described more fully hereinafter, according to one embodiment of the present invention, switch 17 performs the dual function of being a mission and a closed throttle switch. Mission refers to performing an operation such as unlatching cargo or some other object from the robot helicopter when it is in the air. Closed throttle refers to bringing the engine of the robot helicopter down to idle after the helicopter has landed.

Oscillator output lead 19 extends from another of the fixed frequency oscillators 15, as shown in FIG. 2, to a switch designated by block 20. Like switch 17, switch 20 is a normally open switch which, when closed, connects output lead 19 to tone bus 18. In an embodiment of the present invention, switch 20 is a heading hold switch, meaning that when the switch is closed, the robot helicopter is commanded to hold a given heading, while hovering, for example. As will be appreciated by those skilled in the art, switches 17 and 20 may be any electrical switches suitable for the purpose intended.

Oscillator output lead 21 extends to a normally open switch designated by block 22 and when the latter is closed, output lead 21 is connected through to tone bus 18. Switch 22 is the direct collective switch and, as is explained more fully hereinafter, is closed when the operator at the ground control station wishes to exercise direct command of the altitude at which the robot helicopter will fly, i.e., wants to be able to cause the helicopter to go either up or down.

Oscillator output leads 23 and 24 extend, respectively, to normally open switches designated by blocks 25 and 26. Switch 25 is actuated to cause the robot helicopter to turn left, when the helicopter is hovering for example, while switch 26 is actuated to cause the helicopter to turn right, it being understood, of course, that when either switch is closed, it connects its associated oscillator output lead to tone bus 18.

Leads 27 and 28 are shown as extending, respectively, from left turn switch 25 and right turn switch 26 to a memory switch designated by block 29. As is explained more fully hereinafter, closing of memory switch 29 connects both oscillator output leads 23 and 24 through to tone bus 18 whereby two fixed oscillator output frequencies appear on the tone bus. The designation "memory switch" refers to causing the robot helicopter to operate automatically in the last commanded direction, air speed, and barometric altitude, without further direct control by the operator at the ground control station.

Oscillator output lead 30 (see upper right hand portion of FIG. 2) extends to a control switch designated by block 31. When this switch is closed, it completes a circuit via lead 32, to tone bus 18 which, as shown in FIG. 2, feeds into a time delay circuit, designated by block 33. As is explained more fully hereinafter, output leads from the time delay circuit 33 include the tone bus 18 which feeds into a sub-carrier oscillator designated generally by block 34, and a lead 35 which feeds into the command transmitter designated generally by block 36. Thus, whenever any of the oscillators 15 is connected to tone bus 18, the oscillator output or tone goes through the time delay circuit 33 before reaching sub-carrier oscillator 34.

As shown in FIG. 2, there are three sub-carrier oscillators, these being sub-carrier oscillator 34 and two other similar sub-carrier oscillators designated by the blocks 37 and 38, respectively. Each sub-carrier oscillator has an input thereto coming from an associated potentiometer. Thus, as shown in FIG. 2, a North-South potentiometer, designated by the reference numeral 39, has an output lead 40 extending to sub-carrier oscillator 34. An East-West potentiometer, designated generally by the reference numeral 41, has an output lead 42 extending to sub-carrier oscillator 37. Finally, a collective potentiometer, designated generally by the reference numeral 43, has lead 44 extending to sub-carrier oscillator 38.

Block 45 designates an air speed-heading control stick which, through mechanical members indicated by dotted lines 46 and 47, may actuate the North-South and East-West potentiometers 39 and 41, respectively. Block 48 designates a collective control ring which, through a mechanical member indicated by dotted line 49, may actuate collective potentiometer 43. Further details in connection with the air speed-heading control stick 45, the collective control ring 48 and the mechanical members 46, 47 and 49 are given hereinafter in connection with the description of mechanical features of the ground control station. The description just given is deemed sufficient to show that the potentiometers 39, 41 and 43 are adapted to be actuated so that the output signals therefrom may proceed, via leads 40, 42 and 44, into sub-carrier oscillators 34, 37 and 38, respectively.

The output signals from sub-carrier oscillators 34, 37 and 38 proceed, as indicated by leads 50, 51 and 52, respectively, to a sub-carrier tone amplifier indicated generally by block 53. The amplifier output, which may proceed via intermediate electronic circuitry as desired, goes to command transmitter 36 which, of course, has an antenna 54 associated therewith. Sub-carrier oscillators 34, 37 and 38 may be of any suitable type known to those skilled in the art capable of producing a basic sub-carrier frequency adapted to be frequency modulated within predetermined limits to either side of the basic frequency.

Inasmuch as the inputs to the oscillators from potentiometers 39, 41 and 43 may be varied, depending upon how the air speed-heading control stick and the collective control ring are actuated, the inputs from the potentiometers may be described as proportional inputs and, hence, the frequency deviations resulting from these inputs will be proportional deviations from the basic sub-carrier frequencies involved. Thus, considering sub-carrier oscillator 34 as an example, varying the output of potentiometer 39 from a predetermined plus value to a predetermined minus value, and vice versa, will frequently deviate the output of oscillator 34 from a predetermined percent to one side of the basic oscillator frequency to a predetermined percent to the other side of the basic frequency. It is apparent that the percent frequency deviation may be chosen as desired but, by way of example, if the basic sub-carrier frequency output of oscillator 34 is 14.75 kilocycles, then the percent deviation may be in the neighborhood of 7.5 percent to either side of the basic frequency.

When connected to tone bus 18, each fixed frequency oscillator 15 feeds its particular substantially fixed frequency to sub-carrier oscillator 34, as shown in FIG. 2. This means that the basic sub-carrier oscillator frequency is deviated a fixed amount whenever any one of the fixed frequency oscillators is so connected. It is therefore evident that the proportional input and fixed inputs to sub-carrier oscillator 34 may modulate the basic sub-carrier frequency and produce a composite signal output which, after being amplied, is used to modulate the transmitter. Antenna 54 thus radiates the transmitter carrier wave frequency modulated according to the composite modulated sub-carrier tone input to the transmitter coming from sub-carrier tone amplifier 53. The system is thus an FM-FM system and further details concerning the circuitry of the sub-carrier oscillators, sub-carrier tone amplifier, command transmitter, and antenna are deemed unnecessary since such components, capable of operating as described, are known to those skilled in the art.

Ground Control Station—Potentiometers

For a more detailed showing with respect to potentiometers 39, 41 and 43, reference is made to the electrical circuit diagram shown in FIG. 3. In this circuit diagram, the North-South, East-West potentiometers 39 and 41 are shown as being located at right angles to each other which is the way they are located mechanically in the ground controller as is described more fully hereinafter in connection with mechanical features of the ground control station. N-S (North-South) potentiometer 39 is shown as having a slide 55 associated therewith which is adapted to be moved along the potentiometer by the mechanical member indicated by dotted line 46. Likewise, E-W (East-West) potentiometer 41 is shown as having a slide 56 associated therewith which is adapted to be moved along the potentiometer by means of the mechanical member indicated by dotted line 47. Potentiometer output leads 40 and 42 go to sub-carrier oscillators 34 and 37, respectively.

Collective potentiometer 43 has a slide 57 associated therewith which is adapted to be moved along the potentiometer by a mechanical member indicated by dotted line 49. The potentiometer output goes, via lead 44, to sub-carrier oscillator 38.

As shown in FIG. 3, potentiometers 39, 41 and 43 are connected electrically in parallel across a D.C. source 58 which is grounded, as shown in FIG. 3, so that plus or minus voltages may appear on the respective output leads 40, 42 and 44, depending upon the position of slides 55, 56 and 57. It is understood, of course, that suitable ground connections are made with respect to the leads 40, 42 and 44 so that each lead is capable of feeding whatever plus or minus potential exists, due to the associated slide position, to the sub-carrier oscillator involved whereby, as will be appreciated by those skilled in the art, the proportional frequency deviation mentioned above will result. In other words, generally speaking, movement of slide 55 downwardly or of slides 56 and 57 to the right will result in plus potentials being applied to the associated oscillators and, conversely, movement of slide 55 upwardly or slides 56 and 57 to the left, will result in negative voltages being applied to the associated sub-carrier oscillators. The frequency deviation is therefore proportional to the extent of movement of the potentiometer slides with end limits being predetermined as desired.

Ground Control Station—Control and Memory Switches

While, in FIG. 2, the memory switch 29 and control switch 31 are shown as separate switches for connecting the memory tone and the control tone through to tone bus 18, these switches are preferably gang operated so that the operator at the ground control station cannot put the robot helicopter on both memory and control at the same time which, of course, would be an inconsistent attempted operation of the apparatus. Therefore, in order to illustrate the type of switching which has been employed in an embodiment of apparatus according to the present invention, reference is made to FIG. 4 which shows further details of the memory switching, control switching, and time delay circuitry.

In FIG. 4, leads 27 and 28 are shown as feeding the outputs of the fixed frequency oscillators associated with left turn switch 25 and right turn switch 26 through to a common lead 59 when both the left turn switch and the right turn switch are in a position of rest as shown in FIG. 4. In other words, both switches are normally open insofar as their left and right turn functions are concerned but when normally open they do connect their associated oscillators through to common lead 59, thereby feeding two fixed frequencies to lead 59. Lead 59 is connected to a movable switch member 60 which is spring centered as indicated by spring 61 whereby switch member 60 may be moved either to the left or right (as viewed in FIG. 4) but will return to center when pressure on the switch is released. When the switch member is on center, it connects through to a grounded lead 62 and hence feeds through to ground the outputs of the fixed oscillators 15 associated with the left turn and right turn switches. Movable switch member 60 is adapted to contact a fixed contact 63 when moved to the left as viewed in FIG. 4 and adapted to contact a fixed contact 64 when moved to the right as viewed in FIG. 4. The assembly of movable switch member 60 and fixed contacts 63 and 64 corresponds generally to the block designation 29 for the memory switch in FIG. 2.

The switching assembly shown in FIG. 4 also includes a movable switch member 65 likewise spring centered as is movable switch member 60. When spring centered, movable switch member 65 contacts a fixed contact 66 which is connected to grounded lead 62 via leads 67 and 68. Movable switch member 65 is adapted to contact fixed contact 59 when moved to the left as shown in FIG. 4, and is adapted to contact fixed contact 70 when moved to the right as shown in FIG. 4, the latter being connected to tone bus 18 via lead 32.

Movable switch member 71 is not spring centered as are movable switch members 60 and 65 but, instead, is adapted to be in contact with either fixed contact 72 or fixed contact 73 when in left and right positions, respectively, as shown in FIG. 4. All of the movable switch members 60, 65 and 71 are ganged for movement together either substantially simultaneously to the left or substantially simultaneously to the right (as viewed in FIG. 4) with the exception that movement of movable switch member 71 results only if this particular switch member was in an opposite position at the time the movement was commanded. The mechanical ganging together of the movable switch members is indicated by the dotted line configuration indicated generally by the reference numeral 74. Additionally, the dotted lines 75 indicate a mechanical yoke arrangement whereby, as is explained more fully hereinafter, movable switch member 71 stays in left position (as viewed in FIG. 4), if movable switch members 60 and 65 are moved to the left. Conversely, if movable switch member 71 is in right position as viewed in FIG. 4, then it stays in this position if movable switch members 60 and 65 are moved to the right.

In describing the operation of the switch assembly shown in FIG. 4, it is assumed that movement of movable switch members 60, 65 and 71 to the right is movement to the control position, and that movement of these switch members to the left is movement to the memory position. It is further assumed that movable switch member 71 is initially to the left, or memory position, whereby it is in contact with fixed contact 72 as shown in FIG. 4.

With these assumptions kept in mind, if the mechanical member indicated by dotted lines 74 is actuated to move movable switch members 60 and 65 to the right, then the mechanical member indicated by the dotted lines 75 will throw movable switch member 71 so that it comes in contact with fixed contact 73. Movement of movable switch member 60 to the right brings it into contact with fixed contact 64 but this still leaves the outputs of the fixed frequency oscillators associated with right and left turn switches 25 and 26 connected to ground lead 62 since fixed contacts 61A and 64 are connected together as shown in FIG. 4. However, movement of movable switch member 65 to the right brings it into contact with fixed contact 70, thus connecting the output of the fixed frequency oscillator 15 which is associated with this switch through to tone bus 18, via lead 32, as shown in FIG. 4. The control tone therefore goes to a time delay on circuit indicated generally by block 76, this time delay circuit forming a part of the time delay circuits indicated by block 33 in FIG. 2. The control tone does not pass the time delay on circuit until the latter goes on whereby a time delay of predetermined extent, three seconds, for example, is introduced in feeding the tone control signal to sub-carrier oscillator 34.

In the meantime, movement of movable switch member 71 into contact with fixed contact 73 establishes a path from ground lead 62 via lead 68, movable switch member 71, and lead 77, to a lead 78 which is connected to command transmitter 36. As will be appreciated by those skilled in the art, the command transmitter conventionally has its own power switch whereby the transmitter may be turned on and warmed up in advance of operation. Lead 78 is therefore adapted to be energized by a suitable source of potential when the transmitter is warmed up whereby the closing of the circuit to ground as just described starts the transmitter in advance of permitting the control tone to pass time delay on circuit 76.

When lead 78 is energized, lead 77 is likewise energized and a lead 79 connected thereto feeds into time delay on circuit 76 to actuate this circuit to permit the control tone signal to pass through the time delay circuits, to sub-carrier oscillator 34. Time delay on circuit 76 may be any suitable time delay circuit for accomplishing the purpose intended, such as, for example, a time delay circuit including a heat responsive member adapted to complete a through circuit when lead 79 is energized to cause the heat responsive member to be heated. When, after a predetermined delay (three seconds, for example) time delay on circuit 76 does complete a circuit to sub-carrier oscillator 34, then the latter becomes operative to feed it output via amplifier 53 to command transmitter 36. In the meantime, the latter has warmed up and is ready for transmission of signals.

When spring-centered movable switch members 60 and 65 are released, they return to center position. Movement of movable switch member 60 back to center position does not change the situation with respect to the memory tone since fixed contacts 61A and 64 are connected together and the memory tone is therefore still connected through to ground lead 62. Movement of movable switch member 65 back to center position does, however, connect the output of the control tone oscillator through to ground lead 62 via leads 67 and 68. However, by this time, time delay on circuit 76 has been completed and other control tones can therefore proceed on the tone bus, through the time delay on circuit, to sub-carrier oscillator 34. Movement of the mechanical yoke member indicated by dotted line 75 to the left, due to the return to center position of movable switch members 60 and 65, does not move movable switch member 71 away from contact with fixed contact 73 due to the lost motion in yoke member 75. The command transmitter 36, therefore, remains on for further transmission of ground originated signals.

If movable switch members 60 and 65 are now moved to the left, this does cause the mechanical yoke member indicated by dotted line 75 to move movable switch member 71 to the left so that it comes into contact with fixed contact 72. This de-energizes lead 79, whereby time delay on circuit 76 starts to cool but takes a predetermined time, three seconds for example, before the circuit through the time delay on circuit is interrupted. Meanwhile, movement of movable switch member 71 into contact with fixed contact 72 establishes a circuit from ground lead 62, via lead 68, movable switch member 71, and lead 80 to a time delay off circuit 81 which is connected to lead 78 going to command transmitter 36. Time delay off circuit 81 is a part of the time delay circuits indicated by block 33 and operates to open the circuit between leads 80 and 78 when the time delay off circuit is energized. Time delay off circuit 81 can be any suitable time delay circuit for the purpose intended such as, for example, a circuit including a heater operated thermostat switch which causes the circuit to be opened when the thermostat is heated to a predetermined extent. The time required to open the circuit between leads 80 and 78 may be predetermined as desired, six seconds, for example, so as to be longer than the time taken for time delay on circuit 76 to cool and break the circuit to sub-carrier oscillator 34.

Movement of movable switch member 60 to the left connects the output of the fixed frequency oscillators associated with left turn and right turn switches 25 and 26 to tone bus 18 since movable switch member 60 comes into contact with fixed contact 63. The memory tones therefore go through time delay on circuit 76 since the latter stays on for a predetermined period of time after movable switch member 60 is moved into contact with fixed contact 63. Movement of movable switch member 65 into contact with fixed contact 69 does not change the grounding of the output of the fixed frequency oscillator associated with this particular switch member and the control tone output is therefore still grounded. When movable switch members 60 and 65 are released and returned to center position, this again grounds the output of the memory tone oscillators and maintains the ground of the control tone oscillator. Movable switch 71 stays to the left maintaining the circuit to time delay off circuit 81 whereupon the latter operates to break the circuit to the transmitter 36 and the latter therefore ceases to function. The robot helicopter is therefore put on memory operation and will continue such operation until control is once again taken over by the operator at the ground station.

In summary, when mechanical member 74 is moved to the right so that control is taken over by the ground operator, the command transmitter 36 starts and the time delay on circuit 76 begins to warm up. After a predetermined period of time, such as three seconds, the tone bus path is completed to sub-carrier oscillator 34 and the control tone is therefore transmitted to the robot helicopter. In the meantime, time delay off circuit 81 cools and establishes a connection between leads 80 and 78.

When the ground operator puts the robot helicopter on memory, by moving the switch assembly to the left, the memory tones are transmitted since time delay on circuit 76 is still one. However, this time delay on circuit starts to cool and, after a predetermined period of time, such as three seconds, breaks the circuit to sub-carrier oscillator 34, thereby stopping the transmission of memory tone signals. After a further delay, another three seconds, for example, time delay off circuit 81 breaks the connection between leads 80 and 78 to interrupt the command transmitter and turn it off.

*Ground Control Station—Mechanical Features*

Referring back to FIG. 1, an embodiment of a ground control station according to the present invention is shown as including a ground controller casing 82 mounted on a tripod mount 83 whereby the upper table surface indicated generally by the reference numeral 84 may be supported in a level position. Casing 82 is preferably provided with accessible compartments, not shown, for housing electronic components and other equipment utilized in the operation of the ground control station.

Figure 5:
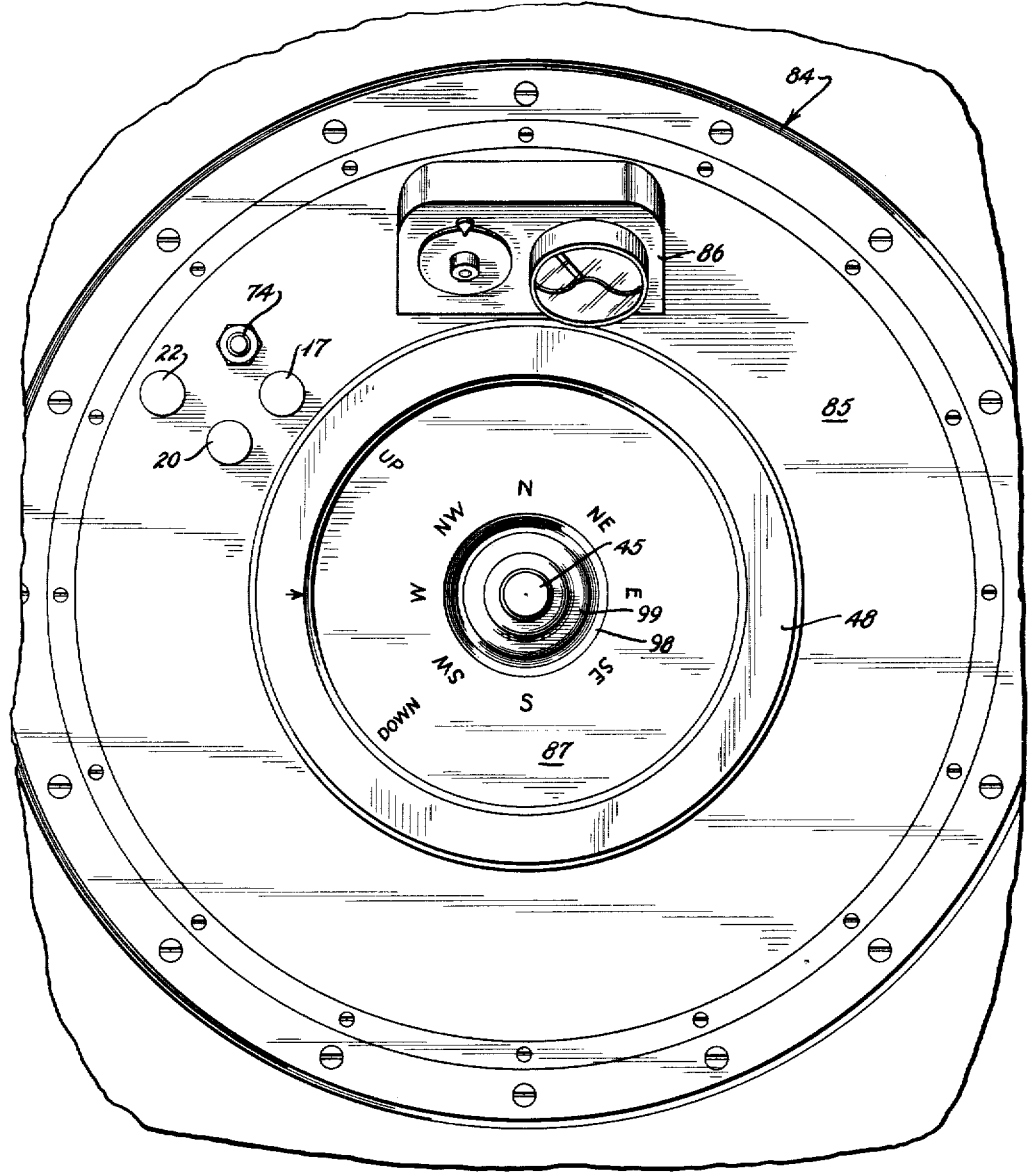
FIG. 5 is a top view of a portion of a ground controller according to an embodiment of the present invention.

Referring now to FIG. 5, the upper table surface 84 is shown as including a rotatable annular table surface portion 85 which carries a meter assembly 86 which may include such meters as an air speed meter and a computed heading command meter whereby the operator at the ground controller will have a visual indication of these factors. Annular portion 85 also carries suitable buttons or knobs for actuating the mission and closed throttle switch, the heading hold switch, and the direct collective switch. Reference numerals 17, 20 and 22 have been applied to buttons shown in FIG. 5 to indicate correspondence with the blocks 17, 20 and 22, shown in FIG. 2. Annular portion 85 also carries an upwardly projecting knob member indicated by the reference numeral 74 so as to correspond to the mechanical arrangement indicated by dotted lines 74 in FIG. 4 for actuating the memory and control switches. Mounting the meter assembly and the various switch actuators on rotatable surface 85 enables the operator at the ground control station to turn surface portion 85 so that the meters and switch actuators will be in front of him at all times. This can become necessary, for example, when the ground controller has been oriented to magnetic North and the robot helicopter is approaching from magnetic South.

Upper table surface 84 also carries a collective control ring 48 which is rotatable throughout an arc of predetermined extent indicated by the up and down legends adjacent the inner left hand portion of ring 48 as viewed in FIG. 5. A fixed portion 87 of upper table surface 84 has azimuth indications thereon, as shown in FIG. 5, whereby the upper table surface may be oriented to magnetic North and the operator will have references to assist him in operating the air speed-heading control stick 45 which projects centrally upwardly with respect to the upper table surface 84, as shown in FIGS. 1 and 5.

Figure 6:
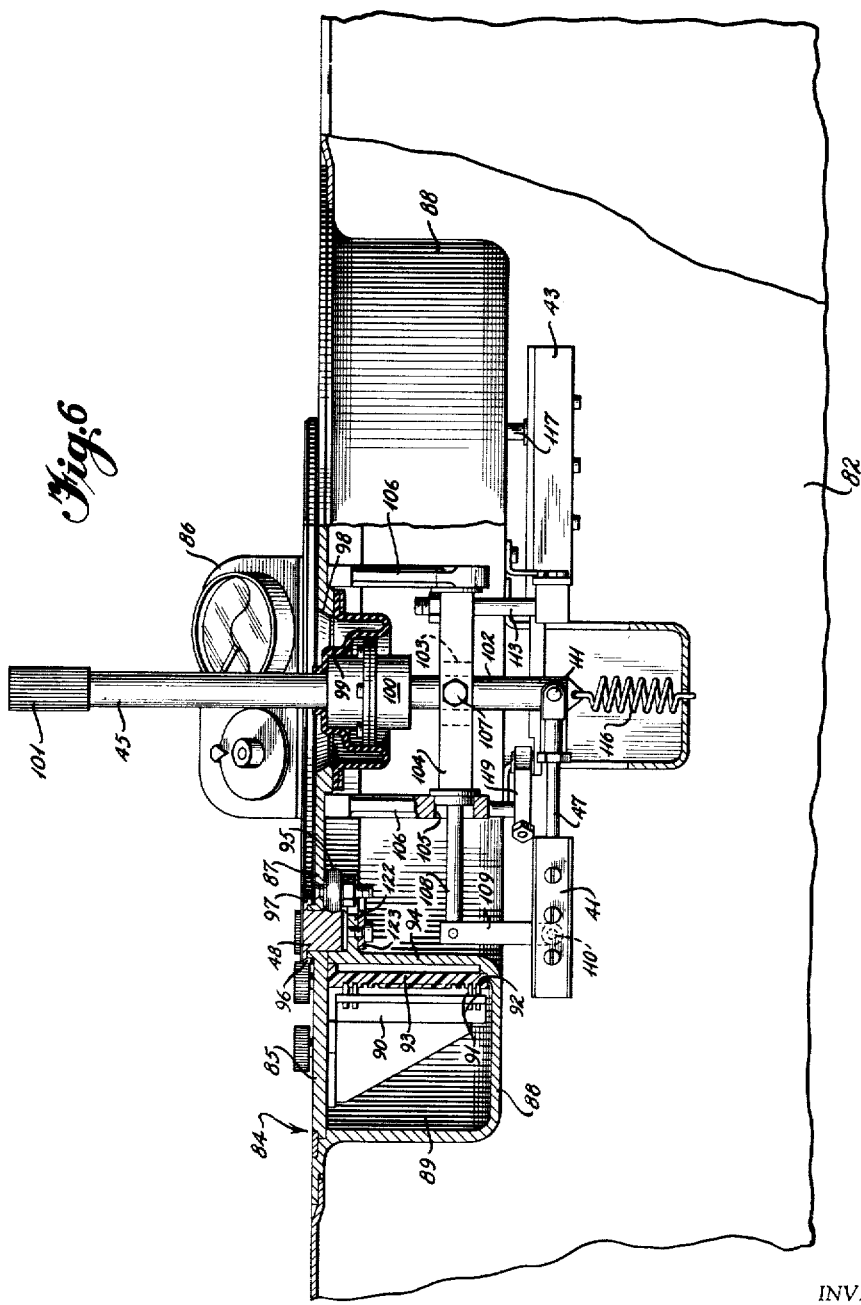
FIG. 6 is an elevational view, partly in section, of the controller shown in FIG. 5.

Referring to FIG. 6, a fixed wall member 88 is seen as defining an annular well 89 which extends downwardly with respect to upper table surface 84. The annular rotatable portion 85 of table surface 84 is supported on upper end portions of wall member 88 whereby portion 85 may be rotated as desired. An electric brush carrying member 90 made of an insulating material such as a phenolic resin is attached to and extends downwardly from the undersurface of rotatable annular portion 85. Member 90 carries electrically conductive brush members 91, each of which makes contact with a corresponding circumferentially extending electrically conductive slip ring 92 carried by an insulating support member 93, again preferably made of a phenolic resin, which is mounted on the fixed inner wall portion 94 of well defining wall member 88. There are, of course, enough associated brushes 91 and slip rings 92 to maintain the necessary electrical connections to the various switches and meters carried by annular rotatable surface member 85, despite rotation of the latter. Electrical connections extending from the brushes 91 and the slip rings 92 are omitted from FIG. 6, it being understood that these may be made as desired to accomplish the circuit connections shown in FIGS. 2 and 4.

Collective control ring 48 is supported for rotation with respect to fixed table surface portion 87 by means including a plurality of roller members 95 which are suitably mounted with respect to the underside of portion 87 so as to engage collective control ring 48. As shown in FIG. 6, the mounting arrangement for ring 48 includes suitable shoulder and flange assemblies 96 and 97 whereby ring 48 may rotate independently with respect to annular rotatable surface portion 85 and, of course, with respect to fixed table surface portion 87.

Air speed-heading control stick 45 projects centrally upwardly with respect to an opening 98 in fixed table surface portion 87 with a resilient (rubber, for example) wall member 99 extending from an underneath surface of fixed table surface portion 87 into contact with stick 45 as shown in FIG. 6. Enlarged portion 100 associated with stick 45 may conveniently house the left turn, right turn switches 25 and 26 so that, through a suitable internal rod, not shown, these switches may be actuated by selectively turning turn knob 101 to the left, or to the right, as desired. Details of the left turn, right turn switches are not shown since these switches may be of any suitable construction capable of effecting the electrical connections shown in FIG. 4 whereby, when the turn knob is in neutral position, the memory tones from the fixed frequency oscillators associated with the left turn and right turn switches are available for transmission to the tone bus when the memory switch is actuated.

Stick 45 has a downwardly extending portion 102 which passes through a slot 103 in a rotatable shaft member 104 which has its ends journalled for rotation in openings 105 provided in wall members 106 which extend downwardly from fixed table surface portion 87 as shown in FIG. 6. Stick extension 102 is pivotally connected by a bolt member 107 with respect to the walls defining slot 103 so that stick 45 can be moved to the left or right as viewed in FIG. 6, pivoting about bolt member 107. Shaft member 104 has a reduced extension 108 from which an arm 109 extends downwardly as shown in FIG. 6. The E-W (East-West) potentiometer 41 is pivotally supported by arm 109 at pivot mounting 110. A potentiometer slide actuating arm 47 extends from potentiometer 41 and is pivotally connected at 111 to the lower end of stick extension 102. Therefore, when stick 45 is moved either to the left or right as viewed in FIG. 6, pivot connection 111 moves to, in turn, move slide actuating arm 47 and hence change the setting of E-W potentiometer 41. This movement takes place about the E-W axis 112 (FIG. 7).

Figure 7:
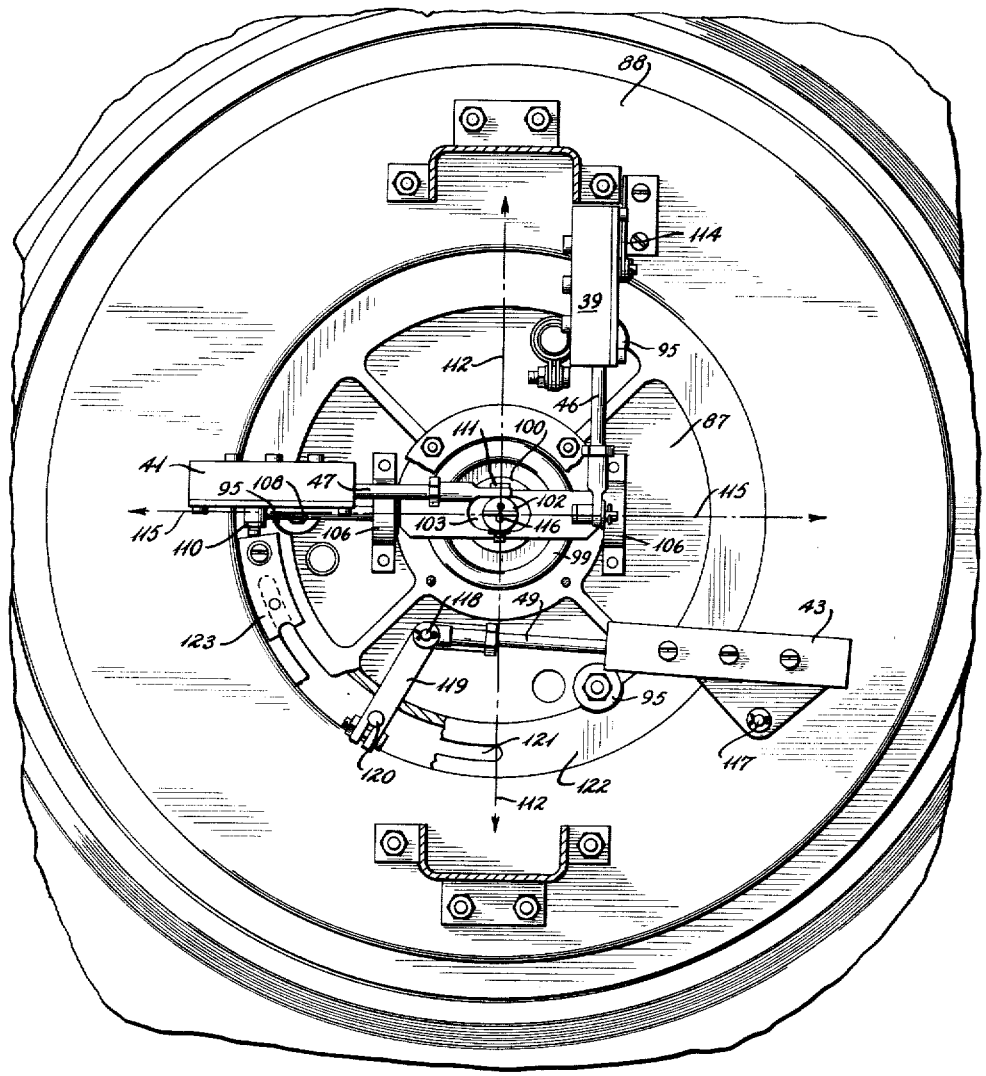
FIG. 7 is a bottom view of the controller shown in FIG. 5.

Rotatable shaft member 104 also carries a downwardly extending arm member 113 which is pivotally connected to a potentiometer slide actuating arm 46 (see FIG. 7). This arm extends into N-S (North-South) potentiometer 39 which is pivotally mounted to a support member 114 attached to an underneath surface of wall member 88. Therefore, when stick 45 is moved about the N-S axis 115 (see FIGS. 6 and 7), potentiometer slide actuating arm 46 is moved with respect to potentiometer 39 to change the setting of the latter. At the same time, E-W potentiometer 41 swings with turning shaft 104 since this E-W potentiometer is carried by arm 109 which is attached to extension 108 of shaft 104. It is important to note that the N-S and E-W potentiometers are oriented precisely 90° with respect to each other whereby, when the ground controller is oriented to magnetic North, actuation of stick 45 about the N-S axis will be N-S actuation and actuation of stick 45 about the E-W axis will be E-W actuation. Obviously, stick 45 may be actuated in any direction from the vertical and when such actuation is along a line intermediate the N-S and E-W axes, both the N-S and E-W potentiometers 39 and 41 will have their settings changed. Moreover, the change in setting will be in proportion to the displacement of stick actuation from the particular axis involved.

A suitable bias means, indicated generally by spring 116 shown in FIG. 6, is connected to the lower end of stick extension 102 so that stick 45 will return to upright position when released. An additional function of the bias means 116 is to impart "feel" to stick 45 whereby the operator actuating the stick will be aware of the amount by which he is deflecting the stick and will thus have a greater appreciation of the air speed which he is commanding. If desired, a variable resistance bias may be employed whereby the bias will increase as the stick is deflected farther away from vertical.

The collective potentiometer 43 is pivotally mounted at 117 to the underside of wall member 88 as shown in FIGS. 6 and 7. Slide actuating arm 49 extends from collective potentiometer 43 and is pivotally connected at 118 to an arm 119 which, in turn, is connected to an arm 120 which extends downwardly from collective control ring 48. Arm member 120 extends through a slot 121 located in a wall member 122 connected to an extension of inner wall member 94 (see FIG. 6). A slot adjusting plate 123 (see FIG. 7) is adjustably connected with respect to wall member 122 whereby the arcuate extent of slot 121 may be predetermined as desired. Thus, collective control ring 48 may be moved through an arc of predetermined length so as to provide the desired travel of slide actuating arm 49.

From the foregoing description of mechanical features of the ground control station, it is seen that the remote operator can set up the ground controller at a desired location, level it, and orient it to magnetic North whereby the N-S potentiometer 39 will be oriented North-South and the E-W potentiometer 41 will be oriented East-West. After turning the command transmitter 36 on and providing the necessary power to operate other electronic components of the apparatus from a suitable source, not shown, the operator can then move the control switch actuating knob 74. As has been described above, this results in transmitting a modulated radio frequency carrier to the robot aircraft, whereby, as is described later, the signal is received, decoded, and actuates mechanisms which set up other mechanisms for receipt of commands from the ground control station. The ground operator can then issue these other commands as desired with certain commands being initiated by the actuation of switches and other commands being initiated by movement of the control stick 45 or collective control ring 48. As is explained more fully hereinafter, the direction of flight and the air speed are commanded by actuating stick 45 in the desired direction of flight and in an amount proportional to the desired air speed. Altitude is commanded by actuating the collective control ring.

*Control System in the Robot Helicopter*

Described very generally, and according to an embodiment of the present invention, the control system in the robot helicopter comprises a command receiving radio receiver and antenna, means for decoding received commands and computing and producing the required signals for executing the decoded commands, control servo-mechanisms, a compass system, and sensors for slide-slip, air speed, and engine speed. For the general layout of such a system, reference is next made to FIG. 8 which shows a block diagram of the system.

Figure 8:
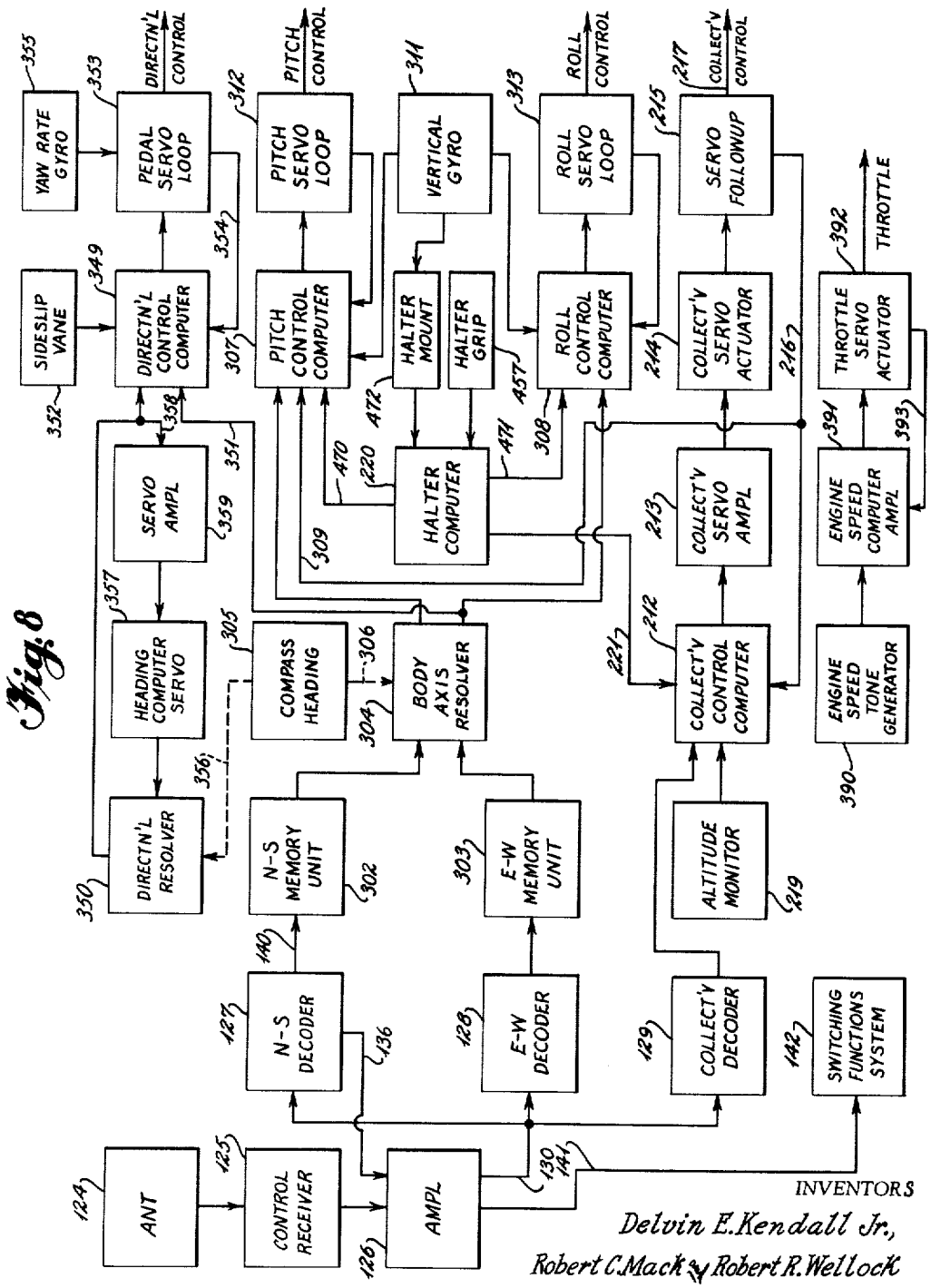
FIG. 8 is a block diagram of electrical and mechanical components forming part of the control apparatus carried by the robot helicopter according to an embodiment of the present invention.

Referring to FIG. 8, a control receiver antenna designated by block 124 picks up the signals transmitted from the ground control station command transmitter antenna 54 and feeds them to the control receiver designated by block 125. Antenna 124 may conveniently be located beneath the fuselage of the robot helicopter to the rear of the front landing wheels as shown in FIG. 1. The output of receiver 125 goes to a proportional and switching tone amplifier designated by block 126. Circuit details of antenna 124, receiver 125, and amplifier 126 are omitted since any suitable antenna, receiver, and amplifier may be used as will be appreciated by those skilled in the art.

The amplified received signals proceed from amplifier 126 to three decoders designated by blocks 127, 128 and 129 in FIG. 8. North-South decoder 127 decodes the signals used to modulate sub-carrier oscillator 34 (see FIG. 2) while decoders 128 and 129 decode the signals used to modulate sub-carrier oscillators 37 and 38, respectively. Since the decoder circuitry is the same for all three decoders, with the exception that the North-South decoder also decodes the tone signals used to modulate the carrier frequency generated by sub-carrier oscillator 34, a more detailed description is therefore presented with respect to the North-South decoder only, it being understood that this description applies to East-West decoder 128 and collective decoder 129.

Figure 9:
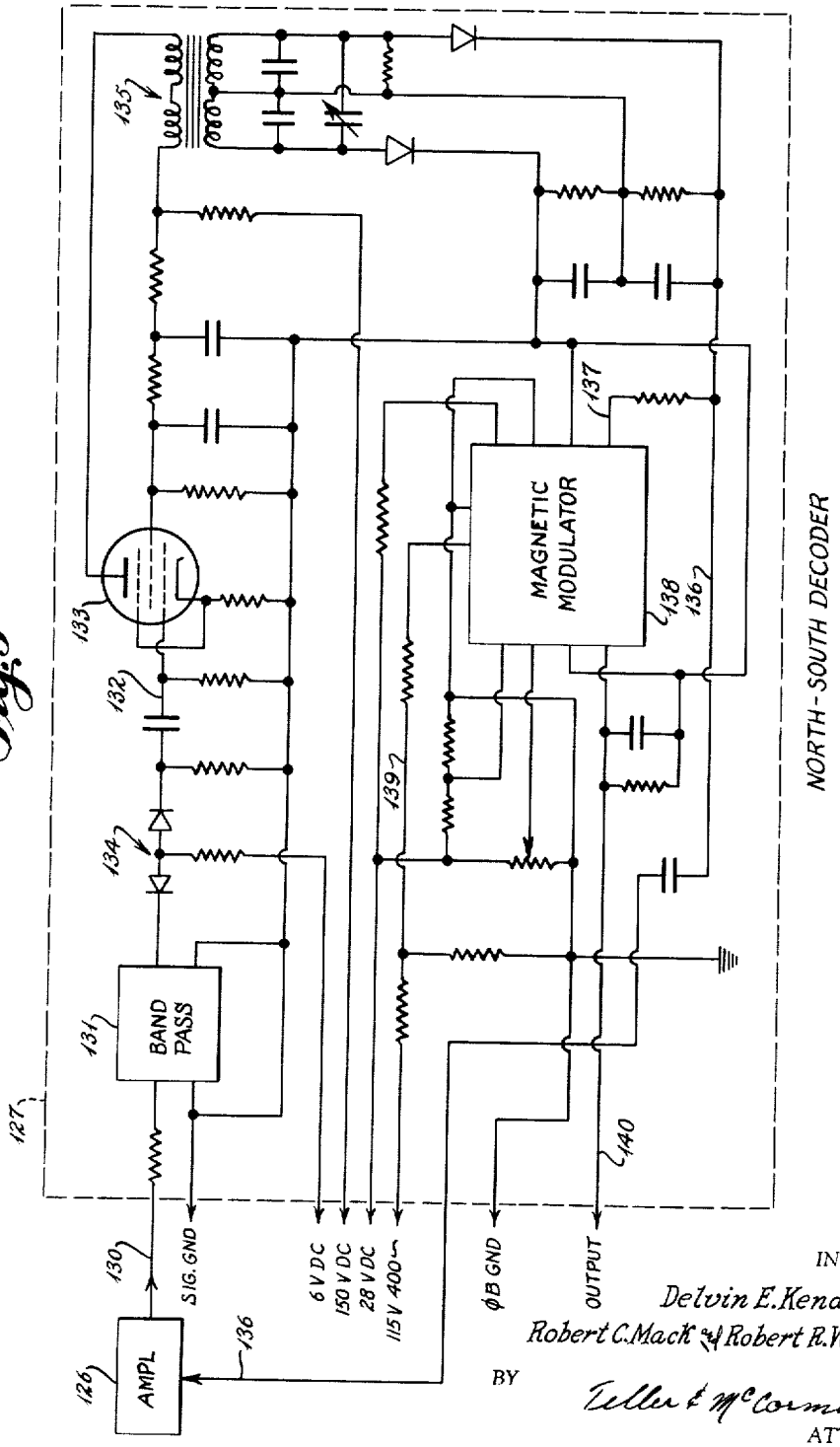
FIG. 9 is an electrical circuit diagram of a decoder forming part of the control apparatus shown in FIG. 8.

Reference is therefore made to FIG. 9 which shows the output of amplifier 126 as proceeding via lead 130 to a band pass filter designated generally by block 131. Band pass filter 131 is any suitable type of filter network known to those skilled in the art which will pass a frequency band of predetermined width. In other words, band pass filter 131 will pass the carrier frequency of sub-carrier oscillator 34 and a predetermined deviation of this frequency to either side of the base carrier frequency, the spread being sufficient to accommodate the maximum proportional deviations resulting from actuation of North-South potentiometer 39 and, of course, will also accommodate the smaller deviations resulting from modulations imparted by the various substantially fixed frequency outputs of oscillators 15.

The output of band pass filter 131 proceeds via lead 132 to an amplifier 133. A limiter, designated generally by reference numeral 134, is connected with respect to lead 132 so as to amplitude limit the output signals from band pass filter 131 with respect to the predetermined sub-carrier frequency, in this case, the predetermined base frequency of North-South sub-carrier oscillator 34. Limiter 134 may be of any suitable type, known to those skilled in the art, for accomplishing such amplitude limiting.

The output of amplifier 133 is fed to a discriminator transformer, designated generally by reference numeral 135, which may be of any suitable type capable of producing an output D.C. voltage which is proportional to the frequency deviation (caused by actuation of North-South potentiometer 39) from the predetermined frequency generated by North-South sub-carrier oscillator 34. Additionally, in the case of North-South decoder 127, discriminator transformer 135 passes any of the output tones from oscillators 15 which may have been applied to North-South sub-carrier oscillator 34. The decoded tone signals proceed via lead 136 back to amplifier 126 where, as is described hereinafter, they are amplified and fed to the switching functions system.

Discriminator transformer output lead 137 which, as explained, has a D.C. voltage produced thereon which is proportional to the frequency deviation from the base frequency of North-South sub-carrier oscillator 34, feeds into a magnetic modulator designated generally by block 138. The latter is also fed by a lead 139 which applies a reference exciting alternating potential of predetermined frequency such as 400 c.p.s. (cycles per second). Magnetic modulator 138 is any suitable magnetic modulator known to those skilled in the art which produces, on output lead 140, an A.C. output having an amplitude proportional to that of the D.C. potential fed into the modulator on input lead 137. In other words, assuming a 400 c.p.s. reference fed in on lead 139, there will be a 400 c.p.s. output on lead 140 having an amplitude proportional to the deviation in frequency (caused by actuation of North-South potentiometer 39) from predetermined base frequency of North-South sub-carrier oscillator 34.

*Switching Functions System in Robot Helicopter*

Figure 10:
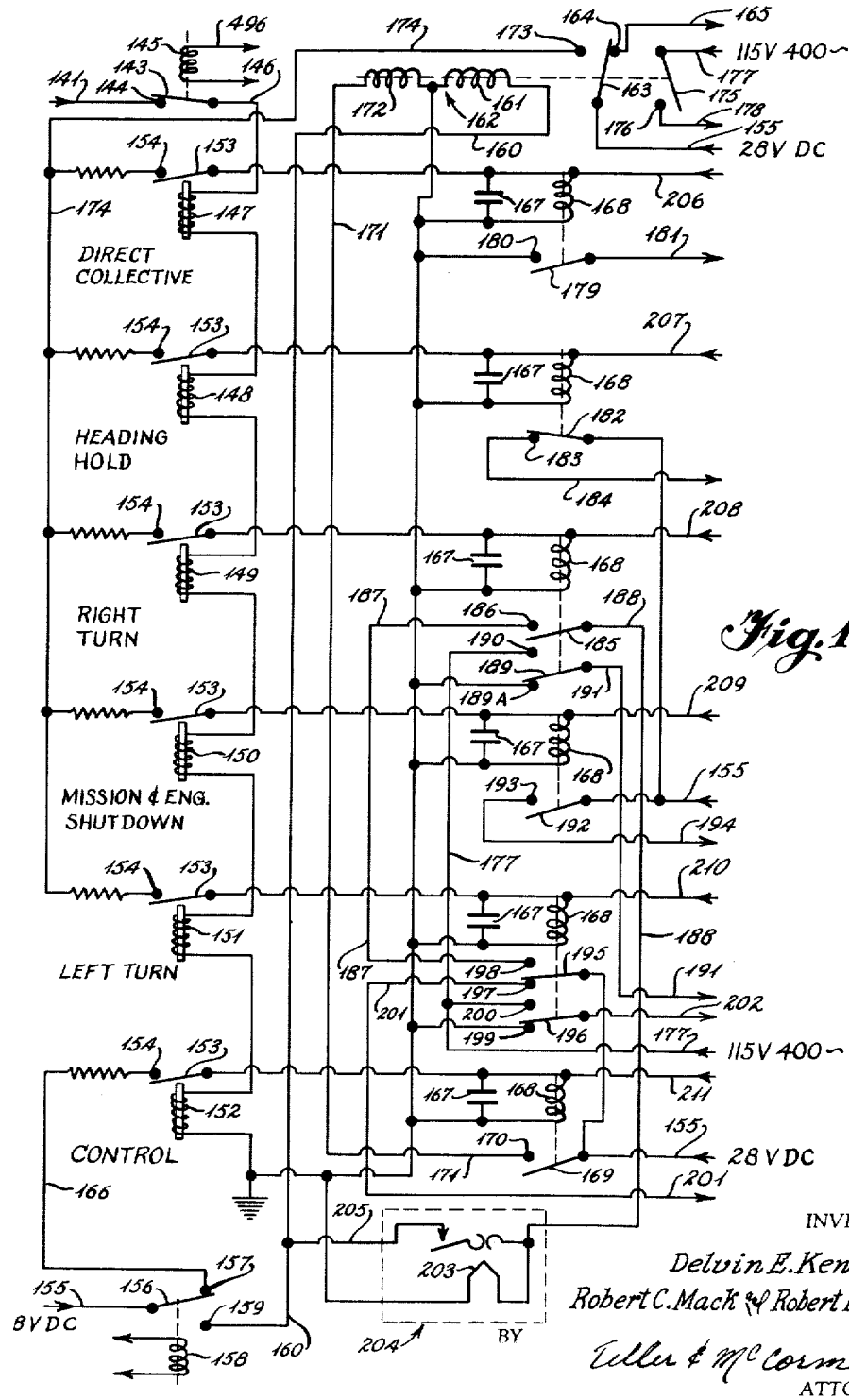
FIG. 10 is an electrical circuit diagram of the switching functions system shown in FIG. 8.

The A.C. tone signals decoded by North-South decoder 127 proceed via lead 136 to amplifier 126 where they are amplified and fed via lead 141 to the switching functions system designated generally by block 142 (see FIG. 8). This system, so to speak, sets up the various electrical paths required to enable the commands sent from the ground control station to be executed by the control apparatus in the robot helicopter. FIG. 10 shows details of the switching function system circuitry.

Referring to FIG. 10, lead 141, which carries the amplified decoded tone signals, is shown as going to relay contact 144 which is normally engaged by arm 143 of relay 145, the latter being de-energized as shown in FIG. 10. As is explained in greater detail hereinafter, relay 145 is the precision hover relay and is energized when a ground handler takes over control of the helicopter by means of halter assembly 12. When relay 145 is energized to move arm 143 away from contact 144, it is apparent that the tone signals cannot proceed to lead 146. This means that the operator at the ground control station cannot command the robot helicopter after control has been taken over by a handler on the ground who is manipulating the halter apparatus.

Assuming, however, that relay 145 is de-energized as shown in FIG. 10, then the tone signals can proceed to lead 146 and pass through six series connected resonant reed tone relay coils 147–152 to ground as shown in FIG. 10. Each tone relay coil has associated therewith a resonant reed 153 which is normally slightly spaced from a fixed contact 154. The coil-read assembly just described is so constructed, as will be appreciated by those skilled in the art, that when a particular A.C. frequency to which the reed is responsive passes through the coil, the reed will resonate rapidly so that it touches fixed contact 154 repeatedly while the coil is energized. The duration of contact between reed 153 and fixed contact 154 may be predetermined as desired but, as an example, the reed may make contact every one-twentieth of a given time unit such as an A.C. cycle.

Assuming that the control tone is present on lead 146, then reed 153 associated with relay 152 will resonate and periodically complete a circuit from a D.C. bus 155 (28 v. D.C., for example) through a high-low signal relay arm 156 which contacts high signal relay contact 157 when the high-low signal relay 158 is energized. Relay 158 is energized, by suitable electrical connections, not shown, from the control receiver 125 when the signals received by this receiver have a predetermined strength and are therefore suitable for interpretation as commands. If the received signals are too low, relay 158 is deenergized and arm 156 comes into contact with low signal contact 159, thereby connecting D.C. bus 155 to lead 160 and thus energizing coil 161 of a memory-control latching relay designated generally by reference numeral 162 (see top of FIG. 10). When relay coil 161 is energized it holds relay arm 163, associated therewith, in contact with relay contact 164, thus completing a circuit from D.C. bus 155 to lead 165 which goes to a memory beacon light (not shown) on the robot helicopter to give a visual indication that the robot helicopter is on memory control, the nature of which is described in greater detail hereinafter. However, from this it is evident that if the signals received by the control receiver 125 are too low, the robot helicopter will be put on memory operation, thus insuring that it does not attempt to obey control signals from the ground which are too weak.

Returning to high-low signal relay 158, and assuming that this relay is energized so that high signal relay contact 157 is engaged, a circuit is completed from D.C. bus 155 through relay arm 156, contact 157, and lead 166 to make the D.C. potential available at fixed contact 154 of control tone relay 152. Therefore, as resonant reed 153 periodically contacts fixed contact 154, the D.C. potential is applied periodically to a capacitor 167 and inductance 168 connected to arm 153, as shown in FIG. 10. The characteristics of the capacitor and inductance are such that the inductance coil is ultimately energized to an extent sufficient to actuate relay arm 169 associated therewith and move it into contact with relay contact 170.

When this occurs, a circuit is completed from D.C. bus 155 to lead 171, thus energizing coil 172 of memory-control relay 162. This causes relay arm 163 to move into contact with relay contact 173, thereby connecting D.C. bus 155 to lead 174 whereby the D.C. potential is available at the fixed contacts 154 associated with each of the resonant reed relay coils 147–151, as shown in FIG. 10. The memory beacon light, of course, goes out, since contact is broken at fixed contact 164 of memory-control relay 162. Additionally, this relay includes an arm 175 which is moved into contact with relay contact 176 to complete a circuit from A.C. bus 177 to a lead 178 which, as is described in greater detail hereinafter, is a motor excitation lead for memory servo-mechanisms. As an example, A.C. bus 177 may carry 115 v. 400 cycle A.C. Memory-control relay 162 is a latching type relay meaning that when the relay arms 163 and 175 are moved to one position in response to energization of one of the relay coils 161 or 172, they remain in that position until the other coil is energized to move them to their other position.

With D.C. potential thus being available at each of the resonant reed relay fixed contacts 154 as just described, it is evident that when any of the relay coils 147–151 receives the frequency to which the coil-resonant reed assembly is tuned, the particular reed involved will resonate to ultimately energize its associated inductance coil 168.

Thus, when the direct collective resonant reed relay is energized, i.e., a direct collective command is sent from the ground control station, received by the control receiver 125 in the robot helicopter, decoded and sent to resonant reed relay 147, then, as has been described above, coil 168 associated therewith is ultimately energized. When this coil is energized, it moves relay arm 179 associated therewith into contact with relay contact 180, thereby completing a circuit from lead 181 to ground as shown in FIG. 10. As is explained in greater detail hereinafter, lead 181 comes from the altitude control circuitry and, when grounded, causes an altitude control relay to be energized.

When relay coil 168 associated with heading hold resonant relay reed 148 is energized, it causes relay arm 182 to move out of contact with relay contact 183. Relay arm 182 is connected to D.C. bus 155 and therefore when arm 182 moves out of contact with relay contact 183, it disconnects lead 184 from the D.C. bus. The significance of this is described later in connection with the description of the heading hold operation.

When the relay coil 168 associated with right turn resonant reed 149 is energized, it causes relay arm 185 associated therewith to come into contact with relay contact 186 thereby establishing a circuit between leads 187 and 188. Relay arm 189 moves away from relay contact 189A and into contact with relay contact 190. This ungrounds lead 191 and, instead, connects it to A.C. bus 177. The significance of this is described hereinafter in connection with the description of directional, or yaw, control.

Assuming that relay coil 168 associated with mission and engine shut down resonant reed relay 150 is energized, it causes relay arm 192 associated therewith to come into contact with relay contact 193, thereby connecting lead 194 to D.C. bus 155. The significance of this is described in greater detail hereinafter in connection with the description of the throttle control for the robot helicopter.

Assuming that relay coil 168 associated with left turn resonant reed tone relay 151 is energized, this causes relay arms 195 and 196 to move so that arm 195 leaves relay contact 197 and engages relay contact 198, and arm 196 leaves relay contact 199 and engages relay contact 200. Whe relay arm 195 leaves contact 197, it disconnects lead 201 from D.C. bus 155 and connects lead 187 to the D.C. bus. Lead 201 goes to a right turn switch located on the grip of the precision hover halter apparatus, as is described hereinafter, whereby the ground handler cannot inadvertently command a right turn when he is commanding a left turn. This is simply a safety interlock featutre. Movement of relay arm 196 from contact 199 ungrounds lead 202 and, when arm 196 engages contact 200, connects lead 202 to A.C. bus 177. Like lead 191, lead 202 goes to the directional control circuitry described hereinafter.

If both the right turn and left turn resonant reed tone relays are energized, as occurs when the memory tones are transmitted from the ground control station, then a circuit is completed from D.C. bus 155, through relay arm 195 to lead 187, and then through relay arm 185 to lead 188. Current flows from lead 188 through a heater 203 to ground as shown in FIG. 10. The heater is part of a time delay device 204 which operates after a predetermined delay, one second, for example, to complete a circuit from lead 188 to lead 205 which goes, via lead 160, to memory-control latching relay 162 and causes memory coil 161 to be energized. This causes relay arms 163 and 175 associated with memory-control relay 162 to move to their memory position (as they are shown in FIG. 10), whereby, as is described in greater detail hereinafter, the robot helicopter operates on memory. The provision of time delay device 204 insures that an accidental overlap between right turn and left turn signals transmitted from the ground control station will not put the robot helicopter on memery unless, of course, the overlap persists beyond the predetermined time delay period.

Leads 206–211 come from the precision hover system whereby the respective relay coils 168 associated therewith may be energized from this system independently of the remote ground control system. This is described in greater detail hereinafter in connection with the description of the precision hover system.

*Altitude Control of Robot Helicopter*

Referring back to FIG. 8, it is noted that the output of collective decoder 129 goes to a collective control computer designated by block 212, that the output of this computer goes to a collective servo amplifier designated by block 213, that the output of this amplifier goes to a collective servo-actuator designated by block 214, and that the output of this actuator goes to a servo follow-up mechanism, designated by block 215. Line 216 indicates that the servo follow-up output is fed back to the collective control computer 212 while line 217 indicates the mechanical movement output of the servo-mechanism which is imparted to the collective pitch mechanical control system of the helicopter. The channel just described is the collective or altitude channel of the control system in the robot helicopter whereby the robot is caused to go up or down in response to commands from the ground control station, exercised, of course, by rotating the collective control ring 48 (see FIG. 5).

In addition to direct collective control, the robot helicopter may be commanded to maintain a given altitude automatically. Components for accomplishing this include an altitude monitor designated by block 219, the output of the latter being fed to collective control computer 212 as shown in FIG. 8. Another input to this computer may come from the halter (precision hover) computer, designated by block 220, as shown by line 221 in FIG. 8.

Figure 11:
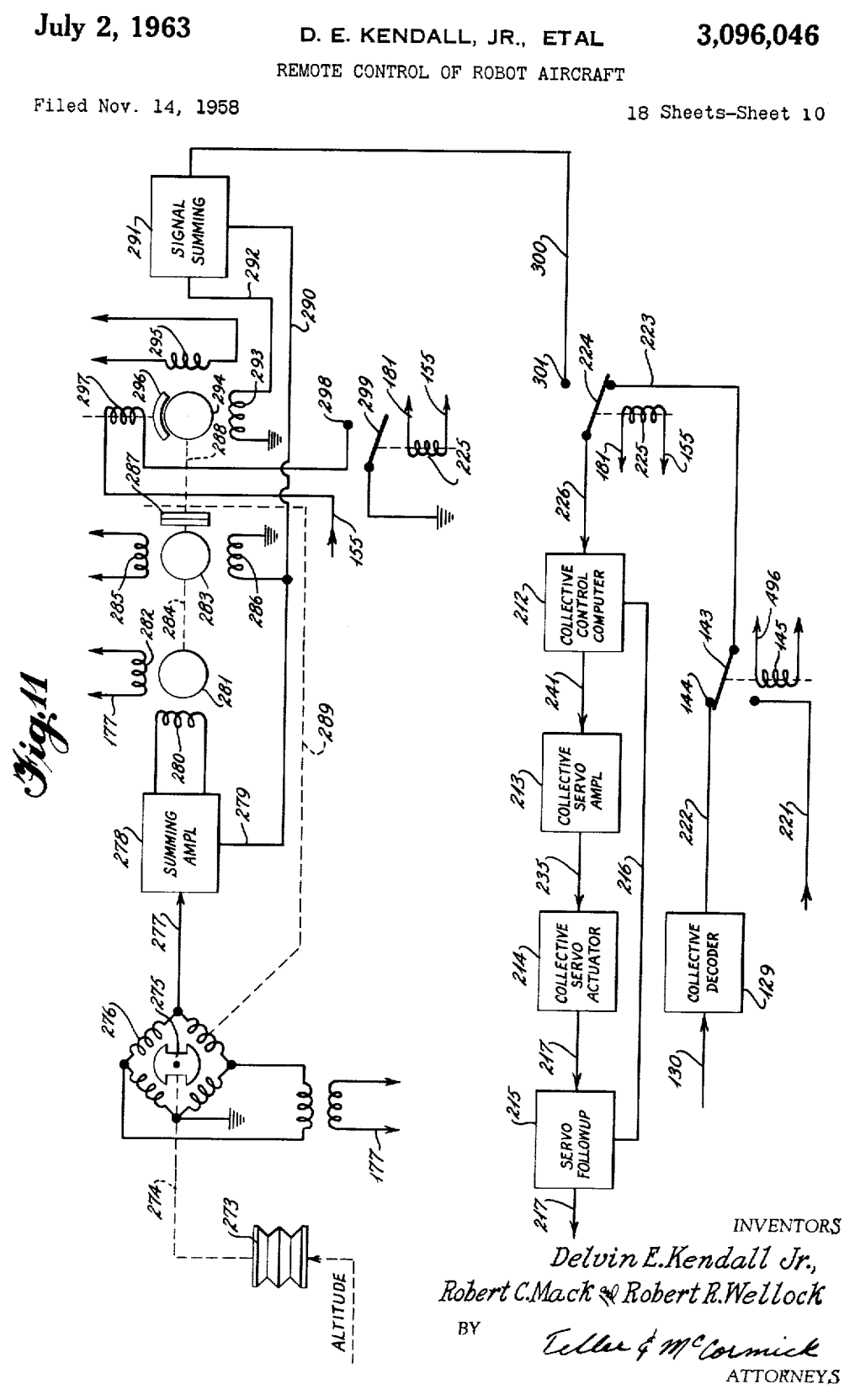

Reference is now made to FIG. 11 for a more detailed description of the altitude channel just described in relation to FIG. 8. Referring to the lower left portion of FIG. 11, it is seen that lead 130, which comes from amplifier 126 shown in FIG. 8, feeds into collective decoder 129. This decoder is constructed and operates similarly to the North-South decoder 127 described above and, accordingly, a repetition of the decoder description is deemed to be unnecessary. Suffice it to say that collective decoder 129 decodes the sub-carrier frequency generated by sub-carrier oscillator 38 (see FIG. 2) to produce an output signal of predetermined frequency, such as 400 c.p.s., having an amplitude which is proportional to the frequency deviation from the predetermined frequency of the collective subcarrier oscillator 34, this frequency deviation resulting from actuation of the collective control ring 48.

The output from collective decoder 129, which may be called the remote collective command, proceeds via lead 222, precision hover relay arm 143, lead 223, and direct collective relay arm 224 to the collective control computer designated by block 212. When precision hover relay 145 is energized to move arm 143 away from contact 144 it is apparent that remote collective commands cannot be sent to the collective control computer. Direct collective relay 225 is energized in response to energization of direct collective resonant reed tone relay 147, the latter causing relay arm 179 to connect lead 181 through to ground (see FIG. 10). Since the other side of relay 225 is connected to a suitable source of power such as D.C. bus 155, the connecting of lead 181 to ground energizes the relay and establishes a path to the collective control computer 212.

In FIG. 11, the output of computer 212 is shown as going to collective servo-amplifier 213 with the output of the latter going to the collective servo-actuator 214, and the output of the latter going to the servo follow-up 215, these block designations corresponding to what is shown in FIG. 8. However, FIG. 12 shows a further breakdown of the respective blocks 212–215 and therefore reference is made next to FIG. 12 where the portions of the circuitry shown there which correspond to the block designations 212–215 are indicated by dotted line boxes containing such portions.

Thus, referring to FIG. 12, it is seen that collective control computer 212 includes a series summing arrangement comprising inductance 227 which is connected at one end to incoming lead 226 and which has its other end connected to grid 228 of an amplifier tube 229. Inductance 227 is coupled to an inductance 230 which has one end grounded and the other end connected to lead 231 which is the position rate, or damping, feedback lead (forming a part of the feedback indicated by line 216 in FIGS. 8 and 11) coming from tachometer winding 232, the tachometer being excited by winding 233 energized from A.C. bus 177 so as to have, for example, 115 volt, 400 cycle excitation. Tachometer assembly 234 is connected to the servo-mechanism output shaft indicated by dotted line 217 whereby, upon rotation of the shaft, the tachometer is moved to produce an output signal, 400 cycles for example, having a magnitude depending upon the rate of movement of shaft 217 as will be understood by those skilled in the art.

This rate or damping signal is therefore summed with the incoming signal on lead 226 and the resultant applied to grid 228 of tube 229. Cathode 236 of tube 229 is connected to position feedback lead 237 (another part of the feedback indicated by line 216 in FIGS. 8 and 11) which in turn is connected to winding 238 of position feedback assembly 239. An exciting winding 240 is energized from the common supply source (not shown) for the servo-mechanism exciting windings so that the turning of the rotor of assembly 239 produces an output signal on lead 237 which has an amplitude proportional to the amount of movement of shaft 217. This signal changes the potential of cathode 236 accordingly so that plate output lead 241 has a signal appearing thereon which causes the servo loop to be rebalanced as will be appreciated by those skilled in the art.

The function of demodulator 242 is to change the 400 cycle signals coming into the demodulator on lead 241 to D.C. output signals which are applied to control grids of opposed amplifier tubes in the power amplifier designated by block 243. A limiter, designated by block 244, functions to limit the D.C. output of demodulator 242 to a level so that the power amplifier tubes are not driven too far in either direction and, hence, the ultimate force of actuation of the collective control rods is not excessive in either direction. The circuitry for demodulator 242, amplifier 243, and limiter 244 may be any such circuitry suitable for the purpose intended but, as an illustration, one example of such circuitry is shown in FIG. 13.

Figure 13:
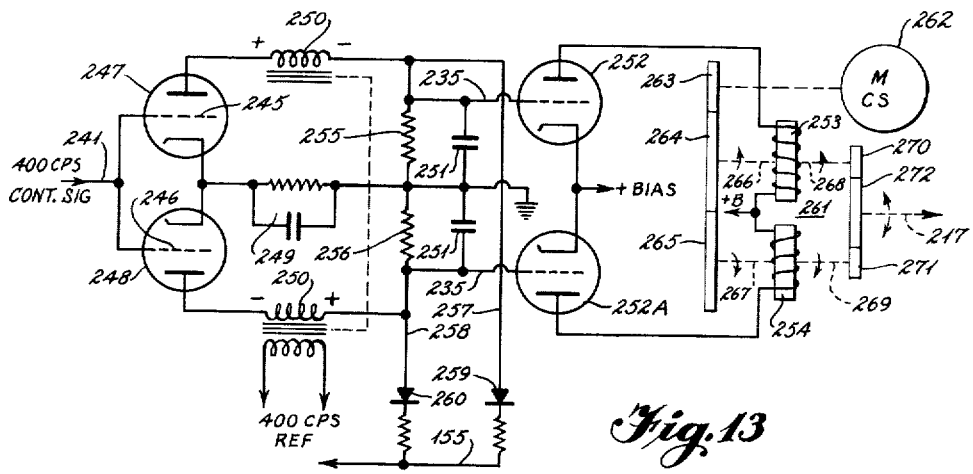
FIG. 13 is an electrical circuit diagram showing, in greater detail, how the output shaft of the servo-mechanism shown in FIG. 12 is actuated.

Referring to FIG. 13, it is seen that lead 241 is connected to the control grids 245 and 246 of two vacuum tubes 247 and 248. The tube cathodes are connected together and grounded through a resistance capacitor combination 249. The plate circuit of each tube includes a split secondary winding 250 which is energized by a suitable reference frequency, such as 400 cycles. Obviously, this means that any one instant, one plate can be positive and the other negative. The output of the conducting tube is filtered through a filter capacitor 251 to leave only the D.C. component of the signal, which is applied, via lead 235, to the control grid of the power amplifier tube 252 or 252A corresponding to the conducting tube 247 or 248. Thus, assuming that tube 247 is conducting, this causes the control grid of the corresponding power amplifier tube 252 to become more negative with the result that the other power amplifier tube 252A becomes more conductive and causes more current to flow through the associated clutch coil 254. Conversely, if tube 248 is conducting, the control grid of power amplifier tube 252A is driven more negative and power amplifier tube 252 becomes more conductive and causes more current to flow through the associated clutch coil 253.

The limiter 244 includes resistors 255 and 256 which are connected across the plate to cathode circuits of tubes 247 and 248, respectively, as shown in FIG. 13, and have leads 257 and 258 coming from ends of the resistors to diodes 259 and 260. Each of the diodes is connected through to D.C. bus 155 whereby the potential of leads 257 and 258 is effectively clamped to the potential of the D.C. bus, 28 volts, for example. This obviously limits the maximum D.C. potential which can be applied to the grids of the power amplifier tubes 252 and 252A. The power amplifier circuit is preferably so designed that if both power amplifier tubes are conducting and there is a relatively small milliamp output from both, one milliamp, for example, there will be a balanced current flow through clutch coils 253 and 254.

Referring back to FIG. 12, it is seen that coils 253 and 254 are shown as being associated with magnetic powder clutches designated generally by the circuit 261. There are two of these clutches, both being of a type known to those skilled in the art wherein magnetization of magnetic particles forming a part of the clutch assembly, due to energization of the associated coil 253 or 254, causes the clutch output shaft to be driven, and the output shaft torque is proportional to the degree of energization of the associated clutch coil 253 or 254. The clutch output shafts are connected in geared opposition to output shaft 217 whereby the direction of rotation of shaft 217 will depend upon the net differential torque existing between the clutch output shafts. A motor 262 drives the clutch input shafts, the motor preferably being a D.C. motor which may be energized from D.C. bus 155.

For further details with respect to the magnetic powder clutch assembly, reference is again made to FIG. 13 which shows the D.C. motor 262 as driving a gear 263 which, in turn, drives a gear 264 in one direction and the latter meshes with a gear 265 so as to simultaneously drive the latter gear in the opposite direction. Gears 264 and 265 are coupled to and drive clutch input shafts designated by dotted lines 266 and 267.

The respective clutch output shafts 268 and 269 are adapted to be clutched to their associated input shafts, depending upon whether clutch coils 253 and 254 are energized. As has been stated above, the characteristics of these magnetic powder clutches are such that the degree of coupling between input shaft 266 and output shaft 268, and input shaft 267 and output shaft 269 will depend upon the amount of current flowing through coils 253 and 254, respectively. Clutch output shaft 268 carries a gear 270 while clutch output shaft 269 carries a gear 271. These gears rotate in opposite directions, when driven, and mesh with a gear 272 which drives servo output shaft 217. Therefore, the direction in which shaft 217 is driven, and the rate of speed at which it is driven, will depend upon the torque differential existing between gears 270 and 271 which, in turn, depends upon the difference in current flowing through coils 253 and 254. The net result is that collective control commands, originating at the remote control station, are converted into mechanical collective pitch control movements in the robot helicopter.

*Automatic Altitude Control*

In order to enable the robot helicopter to maintain a desired altitude automatically within acceptable limits, means are provided for sensing the altitude and creating a signal whenever the robot helicopter deviates upwardly or downwardly from the selected altitude, whereby the collective pitch is changed to bring the robot helicopter back to the selected altitude. Such circuitry is shown in FIG. 11 where the reference numeral 273 designates a barometric pressure responsive member, a suitable bellows, for example, which is capable of sensing changes in altitude and creating mechanical motion in response thereto. Member 273 is, of course, carried by the robot helicopter. Motion produced as the result of changes in altitude is transmitted by a suitable mechanical member indicated by dotted lines 274 to the rotor 275 of an inductance bridge 276.

As shown in FIG. 11, the bridge is excited from a suitable A.C. source, such as the A.C. bus 177. Therefore, as will be appreciated by those skilled in the art, movement of rotor 275 will produce an unbalance in the bridge proportional to the extent of movement of the rotor and cause an A.C. signal, having the frequency of the excitation source, to proceed via lead 277 to summing amplifier 278 where the signal coming in on lead 277 is summed with a position rate feedback signal fed into the amplifier on feedback lead 279. The signal summing circuitry involved can be as described in connection with the collective control computer 212, shown in FIG. 12, and the description will therefore not be repeated.

The output of summing amplifier 278 excites winding 280 of a servo loop motor 281 in accordance with the signal resulting from displacement of the rotor 275 of inductance bridge 276. Motor 281 has another winding 282 which is excited from an A.C. source of fixed voltage and frequency such as A.C. bus 177 whereby the frequency of the excitation voltages of windings 280 and 282 is the same. As will be appreciated by those skilled in the art, the type of arrangement just described is one where the input or excitation voltage for winding 280 is a voltage variable signal of predetermined frequency which will be phase reversing, depending upon the direction of movement of inductance bridge rotor 275. In other words, the excitation voltage can vary from zero to a maximum voltage with a phase with respect to the reference voltage appearing on winding 282 of either +90 or −90 electrical degrees. Of course, the signals from the position rate feedback lead 279 are also taken into account so that the amplitude of the excitation signal for winding 280 is proportional to the sum of the input signals on leads 277 and 279. It can be assumed that the sign of the signal applied to winding 280 is positive if the phase with respect to the signal applied to winding 282 is +90 degrees and is negative if the phase is −90 degrees.

The excitation signal for winding 280 may be termed the error signal to the servo loop. This error signal, in conjunction with the fixed signal on winding 282, causes the rotor of motor 281 to rotate in either one direction or the other, depending upon the assumed plus or minus signs of the exciting signal, or amplified error signal, which energizes motor winding 280, with the speed of rotor rotation being roughly proportional to the control phase voltage. Motor 281 is thus a two-phase servo-motor which, as an example, may be a two-phase induction motor having a high resistance rotor, whereby the motor has a speed curve roughly proportional to control phase voltage and also possesses good electro-mechanical damping.

In cases where rapid, high torque for small error, or the like, is desired, it is preferred to couple the rotor of a tachometer generator to the motor shaft whereby an additional damping signal may be supplied to the input to servo-motor 281. Without such a tachometer generator, the motor might have a tendency to overshoot or hunt. Accordingly, as shown in FIG. 11, the rotor of a tachometer generator 283 is mechanically coupled to the rotor of motor 281 as indicated by dotted lines 284. Generator 283 has an exciting winding 285, energized from a suitable A.C. source, not shown, at a frequency corresponding to the frequency of excitation of motor 281, and has an output winding 286. Where the exciting frequency is 400 cycles, for example, generator 283 may be a drag-cup generator which, as will be appreciated by those skilled in the art, has its windings 285 and 286 so arranged on its stator that they do not couple from one to the other directly. The rotor of such a generator is a thin cup-shaped shell which, when turning in the magnetic field set up by the exciting winding 285, couples the output winding 286 to the input winding in proportion to the rotor speed. The output signal is therefore proportional to the input voltage to winding 285 and to the speed of rotation of shaft 284.

Inasmuch as, with a 400 cycle excitation, motor 281 may rotate generator 283 at a speed as high as from 5,000 to 10,000 r.p.m., it is necessary to mechanically step down the generator shaft output in order to obtain resultant mechanical movements as low as 30 degrees, for example, to either side of an assumed neutral. Therefore, in FIG. 11, suitable reduction gearing, designated by reference numeral 287, is shown as being interposed between the drive output of motor 281 and a rotatable shaft designated by dotted lines 288. In some applications, the magnitude of the reduction gearing 287 may be in the neighborhood of 600 to 1. A mechanical feedback indicated by dotted line 289 couples shaft 288 to inductance bridge 276 whereby the latter is positioned in accordance with movement of shaft 288. As will be understood by those skilled in the art, this rebalances the inductance bridge and thus nulls the servo loop until the next displacement of the rotor occurs.

The output of generator winding 286 is fed back to summing amplifier 278, via lead 279, as mentioned above, in order to provide a damping signal for the servo loop. This output is also fed via lead 290 to a signal summing device designated generally by block 291 where it is summed with a signal fed into device 291 on lead 292 coming from the output winding 293 of a synchro unit 294 which, in general, operates similarly to generator 283. Thus, unit 294 has an exciting winding 295 which may be energized from the same source as is generator winding 285. In contrast to the operation of generator 283, unit 294 serves to couple windings 295 and 293 together in a variable manner, depending upon the degree of movement of shaft 288. In other words, this is a type of variable transformer coupling as will be appreciated by those skilled in the art, whereby the strength of the output signal from winding 293 depends upon the extent of movement of the core member of synchro unit 294.

Synchro unit 294 is provided with a clutch device, indicated by reference numeral 296, having a coil 297 which is energized when the robot helicopter is put on altitude hold, i.e., when the remote operator moves direct collective switch 22 to off (altitude hold) position. Winding 297 is shown as having one end connected to D.C. bus 155 and its other end connected to a fixed contact 298 of direct collective relay 225. When the latter is de-energized arm 299 engages contact 298 and is grounded. This causes winding 297 to be energized and clutch device 296 couples synchro unit 294 to shaft 288 whereby the synchro unit may turn in response to movement of shaft 288. Otherwise, when relay 225 is energized (when the remote operator is issuing direct collective commands), and coil 297 is de-energized, clutch device 296 disengages synchro unit 294 from shaft 288. By suitable means, not shown, unit 294 is brought back to zero position in order to be ready for the next operation on altitude hold.

The summed signals from signal summing device 291 proceed via lead 300 and through fixed contact 301, direct collective relay arm 224 (when relay 225 is de-energized), and lead 226 into the collective control computer 212 where the signals are converted into mechanical collective pitch control movements as has been described above in connection with direct collective control. A suitable filter network for smoothing the output signals from signal summing device 291 may be interposed in lead 300, if desired.

*Pitch and Roll Control of Robot Helicopter*

Forward flight of the robot helicopter is controlled by varying the longitudinal cyclic pitch of airfoil surfaces on the rotary wing or wings. Such control is hereinafter referred to as pitch control. Control of lateral (sideways) movement of the robot helicopter is achieved by varying the lateral cyclic pitch of such airfoil surfaces and is hereinafter referred to as roll control. These terms, pitch and roll control, will be understood by those skilled in the art as having application to helicopters in general whether they have a single rotary wing or plural rotary wings.

Referring back to FIG. 8, it is seen that the output of the North-South decoder 127 is shown as going to a North-South memory unit designated by block 302 and the output of East-West decoder is shown as going to an East-West memory unit designated by block 303. The outputs of both memory units go to a so-called body axis resolver designated by block 304, which also receives an input from a compass heading mechanism designated by block 305 and shown as having a mechanical connection to the body axis resolver as indicated by dotted line 306.

Output signals from body axis resolver 304 go to the pitch control computer designated by block 307 and to the roll control computer designated by block 308. Additional inputs to the pitch control computer include an input designated by line 309 coming from the position feedback of the collective servo loop (see line 216 in FIG. 8), an input from the precision hover or halter computer designated by block 220, an input from a vertical gyro mechanism designated by block 311, and a feedback input from the pitch servo loop designated by block 312. The output of the pitch control computer goes to the pitch servo loop and the mechanical output of the latter actuates the pitch control mechanism of the robot helicopter. Roll control computer 308 likewise receives inputs from halter computer 220, vertical gyro 311, and a feedback input from the roll servo loop designated by block 313. The output of the roll control computer goes to the roll servo loop and the mechanical output of the latter actuates the roll control mechanism of the robot helicopter. Reference is now made to FIG. 14 which shows more details of the circuitry of the pitch and roll channels discussed in connection with the block diagram of FIG. 8.

Referring to FIG. 14, the amplified audio frequency signals from amplifier 126 go, via lead 130, to North-South decoder 127 and East-West decoder 128. These decoders operate, as described above in connection with the collective decoder 129, to produce an output signal of predetermined frequency, 400 cycles, for example, having an amplitude proportional to the actuation of the North-South or East-West potentiometers at the remote control station. In other words, a signal having an amplitude proportional to the deviation of the frequency of the associated sub-carrier output from the base sub-carrier frequency to which the particular decoder corresponds. In the case of North-South decoder 127, the associated sub-carrier oscillator at the remote control location is oscillator 34, and in the case of East-West decoder 128, the associated sub-carrier oscillator is oscillator 37. The output of each decoder goes to its associated memory unit and since these memory units are constructed and operate similarly, only the East-West memory unit 303 is shown in detail.

As shown in FIG. 14, the output signals from East-West decoder 128 proceed to a signal summing device designated by block 314 which operates, as has been described above in connection with summing device 212 shown in FIG. 12, to sum the decoder output signals with position rate and position feedback signals fed into summing device 314 by feedback leads 315 and 316. The summed signals are amplified by an amplifier designated by block 317 and fed to winding 318 of servo motor 319. Winding 320 of motor 319 is energized from A.C. bus 177 when memory-control latching relay 162 is in control position as shown in FIG. 14. Therefore, as has been described above in connection with FIG. 11, the rotor of motor 319 will be rotated in a direction dependent upon the assumed electrical sign on the output of decoder 128 and at a speed dependent upon the strength, or amplitude, of the signal applied to winding 318. Motor 319 drives the rotor of tachometer generator 321, the latter having an exciting winding 322 which is connected to A.C. bus 177 and a signal output winding 323 which develops the position rate or damping feedback signals transmitted to the signal summing device 314 via lead 315.

The mechanical output of motor 319 is stepped down through suitable reduction gearing indicated by reference numeral 324 to mechanically move winding 325 of a resolver device indicated generally by reference numeral 326. Resolver 326 is any suitable such device known to those skilled in the art wherein the resolver includes two windings 325 and 327 which are coupled inductively and the coupling of which is changed by physically moving one winding with respect to the other. Winding 325 is the input winding and is adapted to be excited by an A.C. signal of predetermined voltage and frequency, 400 cycles, for example, from a suitable source, not shown. Winding 325 is physically turned with respect to fixed winding 327 (the output winding) when there is an electrical output signal from East-West decoder 128 which proceeds into the servo loop and causes resultant mechanical output via gear coupling 324, and the mechanical connection indicated by dotted line 348.

The output signal generated in resolver output winding 327 proceeds via lead 328 to winding 329 of the so-called body axis resolver designated by block 304 in FIG. 8. The construction and operation of North-South memory unit 302 is similar to what has just been described with respect to East-West memory unit 303 and, hence, detailed description of unit 302 is deemed unnecessary. Output signals from the North-South memory unit proceed via lead 330 to winding 331.

Windings 329 and 331 are positioned at right angles to each other so that they do not couple inductively to each other and they are both carried on the rotor of a magnetic compass device, a magnetically slaved gyro mechanism, for example, whereby the two windings maintain their orientation in accordance with magnetic North irrespective of the direction of flight of the robot helicopter. Such a compass mechanism is designated by block 305 and the mechanical coupling from it to the windings 329 and 331 is indicated by dotted line 306. In the example shown in FIG. 14, it is assumed that winding 331 is oriented as the North-South winding and winding 329 is oriented as the East-West winding, i.e., winding 331 is oriented in a North-South plane and winding 329 is oriented in an East-West plane.

Another pair of windings 332 and 333 are located physically at right angles to each other so that they do not couple inductively and they are also located so as to be stator windings with respect to windings 331 and 329 whereby they may couple inductively to these windings depending, of course, upon the respective positions of the pairs of windings at any particular time. Windings 332 and 333 are mounted so that their orientation corresponds to that of the robot helicopter, i.e., they are oriented in the direction of the fuselage of the robot helicopter. Therefore, if the robot helicopter is heading due magnetic North, for example, winding 332 will be oriented due magnetic North and maximum inductive coupling exists between windings 331 and 332. The same is true of windings 329 and 333 except that they, of course, will be oriented along the East-West plane. If the robot helicopter is heading Northeast, for example, then windings 331 and 329 are displaced 45 degrees from windings 332 and 333, respectively, so that the respective pairs of windings do not couple inductively to maximum extent.

Since windings 331 and 329 have an orientation to magnetic North corresponding to the orientation to magnetic North of North-South and East-West potentiometers 39 and 41, respectively, at the ground control station, when control stick 45 at the ground control station is deflected in a direction lying between the North-South and East-West axes, the resultant signals fed to resolver windings 331 and 329 will be proportional, respectively, to the North-South and East-West vectors into which the movement of control stick 45 can be resolved. Thus, if the control stick is moved Northeast, for example, the North-South and East-West vectors will be equal and of a magnitude dependent upon the amount by which the stick is moved away from vertical.

Energization of windings 331 and 329 by signals coming in on leads 330 and 328 thus results in a magnetic flux vector being produced which pulsates back and forth along a line parallel to the directional line in which the ground control stick 45 is moved, the amplitude of the pulsating flux vector depending upon the amount by which the control stick is moved away from vertical. If windings 332 and 333 do not have an orientation corresponding to that commanded by the ground control stick, i.e., the robot helicopter is not heading in the direction commanded, then the pulsating magnetic flux couples either one or both of windings 332 and 333 to induce forward (pitch correction) and lateral (roll correction) voltages in windings 332 and 333, respectively. This is true whether the helicopter is being operated in the hover mode or is flying in coordinated flight at high air speed.

To further illustrate the operation just described, reference is made to FIGS. 15 and 16 where FIG. 15 shows a resultant flux vector A—A produced by windings 331 and 329 when the air speed heading control stick is depressed in an assumed North-Northeast (NNE) direction. FIG. 16 shows the assumed heading of the robot helicopter as being Northeast (NE) so that windings 332 and 333 are displaced 45 degrees respectively from windings 331 and 329. The inductive coupling between the respective windings is therefore such that the voltage induced in winding 332 will be proportional to the amplitude of the flux vector times the cosine of angle X (22.5° in this particular example), and the voltage induced in winding 333 will be proportional to the amplitude of flux vector A—A times the sine of angle X. In this particular example, these voltage signals are the signals which proceed to the pitch and roll control computers.

For other compass directions of flux vector A—A, and the orientation of windings 332 and 333 relative thereto, the same principles apply, as will be apparent to those skilled in the art, and further detailed description thereof is deemed to be unnecessary. It will also be appreciated by those skilled in the art that when the helicopter is being operated in the hover mode (with heading hold), it can be commanded to move in any direction, sideways for example, irrespective of whether the fuselage heading is in the commanded direction.

Referring back to FIG. 14, the pitch command proceeds via lead 334, to pitch control computer 307 with precision hover relay 145 being, of course, de-energized. Lead 309, which is connected to the collective position feedback signal source (see FIG. 8) also feeds into pitch control computer 307 via arm 335A of a relay 335 which is energized when the robot helicopter is in the air. Relay 335 is energized from a suitable source (not shown) and may be controlled automatically by a switch associated with the landing gear, for example, so that relay 335 is automatically energized when the helicopter is in the air. A vertical gyro mechanism, designated by block 311, feeds a pitch attitude signal into pitch control computer via lead 336 and this signal is mixed with the pitch command and collective coupling signals coming in on leads 334 and 309 to develop the desired command voltage for the pitch servo loop 312. Position rate and position feedback signals are fed back from servo loop 312 to computer 307 as indicated by line 337 and compared with the command voltage developed in the computer.

As will be appreciated by those skilled in the art, the summing action of pitch control computer 307 is similar to that described above in connection with collective control computer 212 (see FIG. 12) and further detailed description of the pitch control computer circuitry is deemed to be unnecessary. Also, the circuitry and operation of the pitch servo loop 312 is similar to that described above in connection with the collective servo loop (see blocks 213, 214 and 215 in FIG. 12) and further detailed description is therefore deemed to be unnecessary. The mechanical output of the pitch servo loop, indicated by dotted line 312A, actuates the longitudinal cyclic, or pitch, control mechanism of the robot helicopter.

Roll command signals developed in winding 333 proceed via lead 338 to leads 339 and 340. Lead 339 extends to high air speed relay contact 341 which is a contact of air speed relay 342. This relay is energized from a suitable source, not shown, when the robot helicopter achieves a predetermined air speed (twenty-five knots, for example) and is suitably actuated by an air speed sensor 343 extending into the air stream beneath the body of the robot helicopter (see FIG. 1) so as to be responsive to air speed. When relay 342 is energized, the roll command signal proceeds via relay arm 342A, and precision hover relay arm 143, to lead 344 which feeds into the roll control computer 308. Precision hover relay is, of course, de-energized when ground control is being exercised. Computer 308 is also fed by lead 345 which transmits a roll attitude signal from the vertical gyro mechanism 311. As in the pitch control computer 307, the roll command and roll attitude signals are mixed in roll control computer 308 to develop a roll command voltage which is compared with position rate and position feedback voltages fed back to the roll control computer from the roll servo loop 313 and the resultant signal is fed to the roll servo loop. As described above in connection with the collective servo loop (see blocks 213, 214, and 215 in FIG. 12), the mechanical output of the roll servo loop, indicated by dotted line 313A, actuates the lateral cyclic, or roll, control mechanism of the robot helicopter. Feedback to the roll control computer is indicated by line 313B in FIG. 14.

If the robot helicopter is not flying at an air speed sufficient to cause air speed relay 342 to be energized, the relay arm 342A makes contact with low air speed contact 346. The roll command signal developed in roll command winding 333 therefore proceeds via leads 338 and 340 to an attenuator 347 which reduces the signal before it is fed to lead 344 and hence to roll control computer 308. Roll control is therefore slowed down, so to speak, when the air speed of the robot helicopter is below a predetermined speed and is increased (doubled, for example) when the air speed is above the predetermined speed. The reason for the increase is to increase the amount of bank the robot helicopter will develop to reduce an error in heading, which is the lag between the commanded heading and the aircraft heading in turning maneuvers.

When the remote operator at the ground control station wishes the robot helicopter to fly on memory, he moves the memory-control switch mechanism designated by the reference numeral 74 in FIG. 4 to the left as viewed in FIG. 4, thereby energizing memory-control latching relay 162 to move the latching relay arm 175 out of contact with relay contact 176 (see FIG. 14). This disconnects the exciting windings 320 of motors 319 of both the North-South and East-West memory units 302 and 303 from A.C. bus 177 whereby the motors do not drive their associated generators. However, the resolver windings 325 remain energized and remain in the last position to which they were moved by memory unit shaft 348. Consequently, a steady output goes to each winding 329 and 331 of the body axis resolver 304. Then, if windings 332 and 333 change orientation from the memorized heading, pitch and roll command signals are produced as has been described above in connection with FIGS. 15 and 16 to bring the robot helicopter back to the memorized speed and heading. Shaft 348 of each memory unit therefore has, in effect, an infinite memory. Thus, the particular memory command to be obeyed when the robot helicopter is commanded to fly on memory will depend upon the rotational position of the shaft at the time the robot helicopter is commanded to fly on memory.

*Directional Control System of Robot Helicopter*

In an embodiment of the present invention useful for remotely controlling the aforementioned model HTK helicopter, directional control, or control of the relative heading of the robot helicopter is achieved by actuating pedal control rods which, in turn, control the yawing movement to maintain the robot helicopter on the commanded heading. However, as will be appreciated by those skilled in the art, where the helicopter employs a yaw controlling propeller, the latter may be controlled in accordance with the teaching of the present invention to prevent the robot helicopter from yawing with respect to the commanded heading.

Referring to FIG. 8 (top portion), it is noted that the directional control channel includes a directional control computer designated by block 349, which receives inputs from a directional resolver designated by block 350, from the roll command output of the body axis resolver 304 as indicated by line 351, and from a sideslip vane designated by block 352. The output of the directional control computer goes to the pedal servo loop designated by block 353 which has a feedback to the computer as indicated by line 354. Additionally, the pedal servo loop is fed by a yaw rate gyro designated by block 355. The output of the pedal servo loop is mechanical movement which actuates the pedal control rods to effect directional control as will be appreciated by those skilled in the art.

The directional resolver 350 is mechanically actuated by the compass heading device 305 as indicated by dotted line 356. Additionally, the directional resolver has an input from the heading computer servo designated by block 357. As indicated by line 358, the output of the directional resolver can be fed into a heading servo amplifier designated by block 359 which has its output connected to heading computer servo 357.

For a more detailed description of the directional control channel shown in FIG. 8, reference is now made to FIG. 17. When the robot helicopter is flying at high air speed, air speed relay 342 (see lower center part of FIG. 17) is energized to bring relay arm 342A into contact with high air speed relay contact 341, as has been described above in connection with FIG. 14. This connects leads 340 and 361 through to lead 362 which feeds into the directional control computer 349. Lead 361 comes from the sideslip vane apparatus designated by box 352 (see FIG. 8) which includes a light weight directionally stable vane 360 mounted beneath the fuselage of the robot helicopter near the central line of the front landing gear as indicated in FIG. 1. When the robot helicopter is flying at a sufficient speed, above fifteen knots, for example, the alignment of the sideslip vane is sufficiently accurate so that the vane is sensitive to relative wind direction and can thus detent winds tending to cause the robot helicopter to slip sideways from its commanded course. Deflection of the sideslip vane is translated into a sideslip signal by any suitable means, such as a synchro resolver, not shown, and this signal is fed via lead 361 and lead 362 to the directional control computer 349 as a sideslip corrective signal.

Sideslip is further reduced by signal coupling between the roll, or bank, command and the rudder pedals which yaws the fuselage in the direction of the turn. Thus, the roll command from the body axis resolver winding 333 (see FIG. 14) proceeds via lead 340 and lead 362 (see FIG. 17) to the directional control computer so that both the sideslip vane signal and the roll command signal are summed in the computer. The signals summed in the computer are compared with the position rate and position feedback signals fed back from the pedal servo loop 353 as indicated by line 354, and the resultant difference signal is amplified and fed to the pedal servo loop. The latter processes the signal to convert it into the required mechanical movement needed to actuate the directional control mechanism (pedal control rods or the like) of the robot helicopter.

Preferably, the electrical output of a yaw rate gyro mechanism 355 is also fed into pedal servo loop 353 to provide stabilizing signals from the yaw rate gyro mechanism which are converted by the servo loop into stabilizing mechanical control movements applied to pedal control rods or the like. As will be appreciated by those skilled in the art, this stabilizes the heading axis of the robot helicopter, and the output of the yaw rate gyro mechanism may be fed into the derived rate channel of the amplifier in the pedal servo loop.

When the robot helicopter is flying slow (below twenty knots, for example), or hovering, air speed relay 342 is de-energized. Therefore, as shown in FIG. 17, relay arm 342A is in contact with relay contact 346 to complete a path from lead 363 to lead 362. Lead 363 is the output lead of the directional, or auto pilot, resolver designated by block 350 and comes from output winding 364 of this resolver. Input windings 365 and 366 of this resolver are located physically at right angles with respect to each other and are carried by a shaft member indicated by dotted line 356. This shaft member is an output shaft of a compass heading device indicated by block 305 and the shaft maintains orientation with the actual direction of flight of the robot helicopter whereby the two resolver windings 365 and 366, fixed at right angles with respect to each other, are oriented in accordance with the actual direction of flight of the robot helicopter. Accordingly, it is seen that windings 365 and 366 may move physically with respect to output winding 364, thus changing the flux linkage between the input windings and the output winding.

Windings 365 and 366 are connected "back-to-back" to output windings 367 and 368 of a resolver 369 forming a part of the heading computer servo 357 as shown in FIG. 17. The connection is thus a bridge type of connection in which the input to the bridge is excitation from an input winding 370 of resolver 369 which may be connected to any suitable A.C. exciting source, 400 cycles, for example. Winding 370 is carried by a shaft member designated by dotted line 371 so that the winding turns in response to turning movement of the shaft and thus varies the flux coupling between the winding and output windings 367 and 368. The arrangement is such that when the position of shaft 371 corresponds to the position of compass heading shaft 356, the system is nulled so that there is no output voltage at output lead 363 of the directional resolver 350. However, if either shaft 371 or shaft 356 deviates from such correspondence, or synchronization, an output voltage is developed in winding 364 of the directional resolver and produces a corrective signal as will be understood by those skilled in the art.

Output shaft 371 is coupled through a suitable stepdown mechanical coupling indicated by reference numeral 372 to output shaft 373. This shaft is driven by servo motor 377 which has an exciting winding 378 connected to A.C. bus 177 and an input winding 379 connected to the output of servo amplifier 359. Generator 374 is also driven by motor 377 and has an exciting winding 375 connected to A.C. bus 177, and an output winding 376. Input signals to amplifier 359 are fed via lead 380, generator output winding 376, and lead 381 whereby, in addition to signals coming in on lead 380, the position rate or tachometer feedback signals developed in winding 376 are also fed into the amplifier to damp the servo motor 377 as has been discussed above in connection with the collective servo amplifier and servo actuator, for example.

Likewise, from the description given above in connection with other servo loops, such as the servo loop in the collective control channel, it is evident that motor 377 drives generator 374 in accordance with the output of amplifier 359 applied to motor winding 379 and, through coupling 372 and shaft 371, causes resolver winding 370 to turn one way or the other with respect to resolver windings 367 and 368. This non-correspondence of the positions of shafts 371 and 356 (compass heading shaft) results in an output voltage signal being developed in output winding 364 of directional resolver 350. The signal thus developed is fed via leads 363 and 362 to directional control computer 349 and then to pedal servo loop 353. The latter converts the electrical signal into mechanical movement which causes the pedal control rods to control the yawing movement to bring the helicopter back to the compass heading according to compass heading shaft 356. When the helicopter is then headed in the right direction, there is once again correspondence between the shaft positions of shafts 371 and 356 and there is no further output from winding 364 until the helicopter again deviates from the established heading.

When the robot helicopter is being operated in the heading hold mode, i.e., when the heading hold resonant reed tone relay 148 has been energized by the coded frequency applicable thereto so as to, in turn, energize its slave relay coil 168 and actuate relay arm 182, the rotative position of shaft 371 at the time relay arm 182 is actuated is the position corresponding to the commanded heading. Therefore, if the compass heading shaft 356 departs from a rotative position corresponding to that of shaft 371, a corrective voltage is induced in winding 364 of the directional resolver and applied via leads 363 and 362 to the directional control computer 349 to cause the helicopter to turn to bring the compass heading shaft 356 back into correspondence with shaft 371 as has been described above.

For most flying, the heading hold switch is not used because the robot helicopter automatically switches from heading hold at low speed to coordinated flight at cruising speed. In other words, when air speed relay 342 is de-energized, the output of the directional resolver is connected to the directional control computer as described in the preceding paragraph whereby the robot helicopter is in the heading hold mode. However, if the robot helicopter is hovering in very high winds, actuation of the heading hold switch 20 causes relay arm 182 (see FIG. 10) to break the circuit from D.C. bus 155 to air speed relay 342 so that the output of directional resolver 350 is connected to the directional control computer to maintain the heading of the robot helicopter as has been described. When the robot helicopter is operating on memory at low speeds, it is apparent that it will also be operating in the heading hold mode.

As mentioned above in connection with the description of mechanical features of the ground control station, right turns and left turns of the robot helicopter are commanded by rotating the top of the air speed-heading control stick 45 in the desired direction of turn. Turns will result only if the robot helicopter is flying slow, or hovering, or if the heading hold switch has been actuated. Assuming that a right turn is commanded, relay arm 189 of the slave relay associated with right turn resonant reed relay 149 is moved into contact with fixed contact 190, thereby connecting lead 191 to A.C. bus 177. This feeds A.C. to coil 382 of an attenuator circuit 383 as shown in FIG. 17, the other end of coil 382 being connected by lead 202 and left turn relay arm 196 to ground. The output of attenuator 383 proceeds via lead 384 and air speed relay arm 342A to lead 385 which is connected to fixed contact 386 of landing gear relay 335. When the robot helicopter is in the air, landing gear relay 335 is de-energized so that its relay arm 387 is in contact with fixed contact 386 and thus completes a circuit through to lead 380. The latter is connected to generator output winding 376 and feeds the turn signal to amplifier 359 whereby, as has been described above, ultimate rotation of mechanical shaft 371 is caused in a direction corresponding to the assumed phase of the signal fed to attenuator input winding 382. Movement of resolver winding 370 in response to mechanical movement of shaft 371 creates an unbalance in the output of the "back-to-back" resolver windings whereby an output voltage is induced in output winding 364 of directional resolver 350. As has been described above, this causes a corrective signal to be fed to directional control computer 349 which, as also described above, causes the helicopter to turn to bring the heading of the helicopter to a heading such that the rotative position of compass heading shaft 356 corresponds to the rotative position of generator driven shaft 371. As an example, the magnitude of the turn signal may be such as to cause shaft 371 to run at fifteen degrees per second in the desired direction of rotation to change the heading reference.

If a left turn is commanded, slave relay arm 196 of the slave relay associated with left turn resonant reed relay 151 is moved into contact with fixed contact 200, thus connecting lead 202 to A.C. bus 177. This feeds A.C. to the other end of attenuator coil 382 as shown in FIG. 17 and the assumed phase of the A.C. coming from this direction is such that the input to the heading computer servo causes rotation of shaft 371 in the opposite direction from that caused by a right turn command. Thus, the assumed phase of the A.C. input to attenuator coil 382 may be 0° for a left turn and 180° for a right turn whereby opposite polarity signals are applied to motor winding 379. Rotation of shaft 371 in response to a left turn command causes the robot helicopter to turn left until the command ceases and the robot helicopter has the commanded heading as described above in connection with right turn operation.

When the robot helicopter is on the ground, landing gear relay 335 is energized by suitable means such as switches associated with the landing gear, not shown. This brings landing gear relay arm 387 into contact with fixed contact 388 thereby connecting lead 380 to lead 389. Lead 358 connects lead 389 to directional resolver output lead 363. Therefore, if there is non-correspondence between the shaft positions of heading computing servo shaft 371 and compass heading shaft 356, and assuming, of course, that the heading computing servo is energized, the output of the directional resolver is fed via leads 363, 358, 389, 380, generator winding 376 and lead 381 to servo amplifier 359. The resultant input to motor winding 379 causes rotation of shaft 371 to bring the latter into correspondence with compass heading shaft 356 and thus null the heading error. In this way, before the robot helicopter leaves the ground, non-correspondence between the rotative positions of shafts 371 and 356 can be eliminated.

*Regulating Engine Speed of the Robot Helicopter*

As will be appreciated by those skilled in the art, variations in the rotary velocity of the rotary wing or wings of a helicopter during flight will affect the magnitude of the rotor lift vector. It is therefore desirable to substantially eliminate such variations so that control of such factors as collective pitch, and longitudinal and lateral cyclic pitch can be exercised on the assumption that the rotary wing, or blade, velocity is substantially constant during normal flight. In an embodiment of the present invention used for remotely controlling the aforementioned model HTK helicopter, control of rotary wing velocity is effected by regulating the speed of the engine driving the two rotors of the helicopter. Engine speed is regulated by actuating the throttle of the engine to either speed up or slow down the engine, as required, in order to maintain a predetermined engine speed, 3200 r.p.m., for example.

Referring to FIG. 8, the engine speed regulation, or throttle, channel of the control system in the robot helicopter is shown as including an engine speed tone generator designated by block 390 which feeds its output to an engine speed computer amplifier designated by block 391. The output of the latter is fed to the engine throttle servo actuator designated by block 392 which has a feedback to the engine speed computer amplifier as indicated by line 393. The output from the throttle servo actuator is, of course, mechanical control movement which mechanically moves the engine throttle one way or the other in order to regulate the engine speed.

Figure 18:
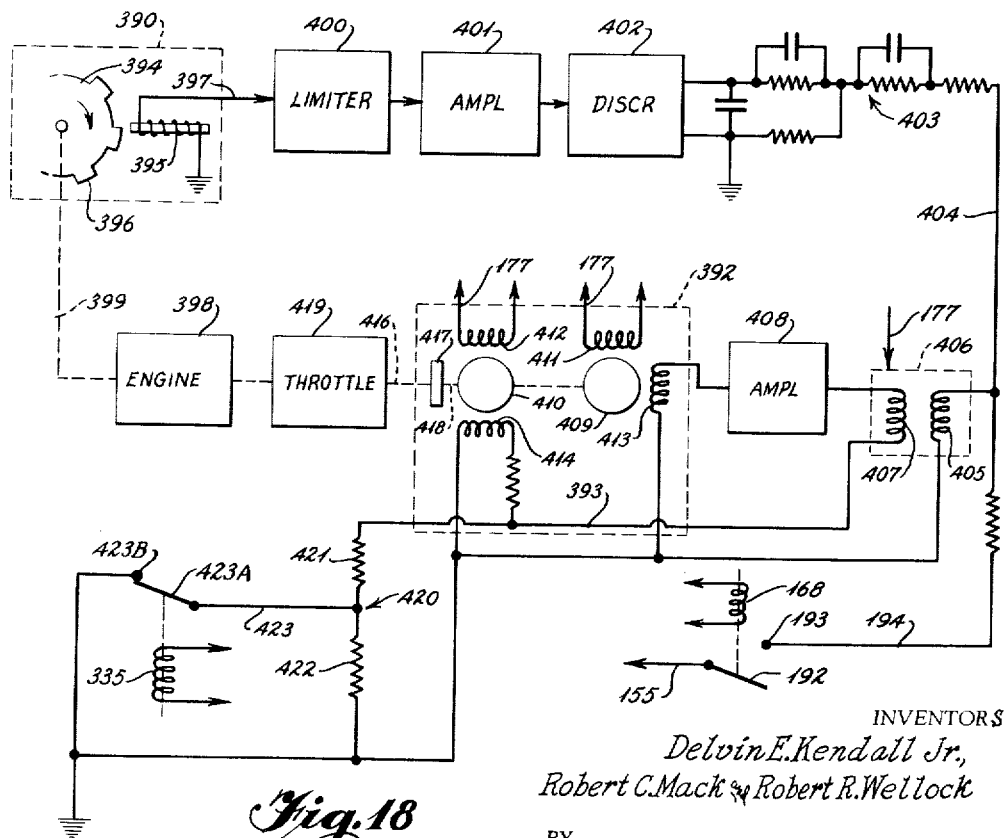
FIG. 18 is an electrical circuit diagram, partly in block form, of the engine speed control channel shown in FIG. 8.

For a more detailed explanation of the engine speed regulating, or throttle, channel shown in FIG. 8, reference is now made to FIG. 18 where the engine speed tone generator 390 is shown as including a coarse toothed gear 394 operatively associated with a magnetic pickup 395 so that each time that a tooth 396 of the gear passes the pickup, a cycle of output voltage is produced on lead 397. Gear 394 is driven from the robot helicopter engine, designated by block 398, the mechanical driving connection from the engine to the gear being indicated by dotted line 399. In an embodiment of the present invention where the engine speed is regulated at 3200 r.p.m., the construction of gear 394 and magnetic pickup 395 are such that when the engine speed is 3200 r.p.m., the frequency of the A.C. voltage wave form on lead 397 is approximately 3886 cycles per second. It is apparent that the frequency of the voltage wave form on lead 397 is proportional to the engine speed.

The output from the magnetic pickup 395 proceeds, via lead 397, to an amplitude limiter, designated by box 400 since such a limiter may be of any suitable type known to those skilled in the art. After being amplitude limited, the A.C. signal proceeds to an amplifier 401, the output of which feeds into a discriminator designated by block 402. Discriminator 402 may be of any suitable type known to those skilled in the art capable of producing a D.C. voltage output which is proportional to the deviation between a predetermined frequency (3886 c.p.s. for 3200 engine r.p.m. for example) and the frequency actually appearing on lead 397. Since such discriminators are well known to those skilled in the art, further details of the discriminator circuit is deemed unnecessary.

The D.C. voltage output from discriminator 402 goes to a stabilization network, designated generally by reference numeral 403 and made up of resistors and capacitors as shown in FIG. 18, which shapes the discriminator output in a manner providing anticipation or lead for the desired corrective signal. In other words, as will be understood by those skilled in the art, the D.C. output of discriminator 402 is shaped by the stabilization network 403 so as to have an initial peaked portion followed by a trailing portion of lesser strength whereby the initial or peaked portion may, so to speak, give the remaining parts of the engine speed regulating system an initial jolt so that the system will react rapidly to effect the necessary correction.

The shaped signal from the stabilization network proceeds via lead 404 to winding 405 of a magnetic modulator designated by block 406. This magnetic modulator is excited from a suitable A.C. source such as A.C. bus 177 whereby the output from output winding 407 of the modulator will be 400 cycles A.C. output which is fed to an amplifier 408. Since the magnetic modulator may be of any suitable type well known to those skilled in the art and capable of functioning as described, further details concerning the circuitry and operation of the magnetic modulator are deemed to be unnecessary. These components of the system just described, proceeding from limiter 400 to amplifier 408, collectively make up the engine speed computer amplifier designated by block 391 in FIG. 8.

Throttle servo actuator 392 conventionally includes a servo motor 409 which drives generator 410. Both the motor and generator are excited by windings 411 and 412, respectively, each winding being excited from A.C. bus 117, for example, so as to be excited with 115 volts, 400 cycles A.C. The corrective signal from amplifier 408 is fed to motor winding 413, thus causing the motor to rotate in one direction or the other, depending upon whether the A.C. frequency on lead 397 is above or below the predetermined frequency produced when the engine is running at the predetermined r.p.m. Generator 410 has an output winding 414 which produces a position rate or tachometer feedback signal to magnetic modulator winding 407, via feedback lead 393, whereby the position rate or tachometer feedback signal is compared with the engine speed error signal and the difference is amplified by amplifier 408 and fed to the throttle servo actuator 392 as shown in FIG. 18.

Throttle actuating shaft 416 is driven through a suitable step-down mechanical coupling indicated by reference numeral 417 so as to turn one way or the other, and at a rate, in accordance with mechanical movement of servo loop output shaft 418. Shaft 416 is connected to the engine throttle designated by block 419 which, of course, controls the speed of engine 398. This, in turn, through the mechanical connection designated by line 399, controls the speed of gear 394.

Relatively tight control of engine speed while the robot helicopter is on the ground with low collective pitch and in the air at flight pitch is achieved by increasing the gain of the engine speed regulator system when the robot helicopter is airborne. This is accomplished by a gain doubling network designated generally by reference numeral 420 which, in one embodiment as shown in FIG. 18, includes two resistors 421 and 422. These resistors are connected in series between feedback lead 393 and ground as shown in FIG. 18 and lead 423 is connected between the resistors to relay arm 423A of landing gear relay 335. As has been explained above, this landing gear relay is energized when the robot helicopter is on the ground and is de-energized when the robot helicopter is in the air. When it is energized, lead 423 is connected, through relay arm 423A and relay contact 423B to ground, thereby bypassing resistor 422 and thus decreasing the potential of the feedback signals on lead 393 as compared to the potential of these signals when both resistors 421 and 422 are in series between lead 393 and ground. With the potential of the feedback signals thus decreased, the difference between the engine speed error signals and the feedback signals is, of course, greater, and consequently the input to the throttle servo actuator is greater for the same engine speed error than if the engine speed error occurs when the robot helicopter is on the ground. When the robot helicopter is on the ground, resistor 422 is not bypassed and the difference between the engine speed error signals and the feedback signals on lead 393 is therefore cut down by a predetermined amount depending upon the relative values of resistors 421 and 422. These values may be such as to reduce the gain of the system by one-half, for example, when the helicopter is not airborne.

Referring to the lower right hand portion of FIG. 18, lead 194 is shown as being connected to fixed contact 193 of the slave relay 168 associated with the mission and engine shutdown resonant reed tone relay 150 shown in FIG. 10. Therefore, when the robot helicopter is on the ground and the mission and engine shutdown tone relay 150 is energized, slave relay arm 192 is brought into contact with slave relay contact 193 to connect lead 194 to D.C. bus 155, for example. The D.C. signal proceeds into magnetic modulator 406 and is of such a strength that it overrides any engine speed error signals coming in on lead 404. The effect of the override is to cause the throttle servo actuator to turn shaft 416 in such a direction as to close the throttle in several seconds. Suitable interlock means, not shown, are provided whereby engine shutdown cannot occur when the robot helicopter is in the air.

Precision Hovering of the Robot Helicopter

The precision hover, or halter, system permits a ground handler without prior training to manuever the robot helicopter accurately when it is adjacent to the ground surface. The system is completely automatic and essentially slaves the robot helicopter to the position of the grip, held by the handler, on the bottom of the halter mechanism. In FIG. 1, the halter mechanism which is designated generally by the reference numeral 12, is shown as depending from the outer end portion of a supporting arm member 424 which, in the particular arrangement shown, projects from the rotor assemblies at an angle of approximately 45° to the longitudinal center line of the robot helicopter.

Mechanically, the halter mechanism is a telescoping tube mounted at the top by a bearing giving the tube freedom to swing fore and aft and laterally. Synchro mechanisms at the mounting location, in connection with the vertical gyroscope carried by the robot helicopter, supply signals to the robot helicopter pitch and roll channels whenever the halter departs from a vertical attitude. This action results in stabilizing the robot helicopter with respect to the halter axis. The lengthwise telescoping action of the halter mechanism is instrumented to provide a very tight altitude control in which the robot helicopter automatically maintains a fixed height above the halter grip.

Mechanical Features of the Precision Hover System

For further details relative to mechanical features of the precision hover, or halter, system, reference is now made to FIGS. 19A and 19B where, in FIG. 19A, the halter assembly which is designated generally by the reference numeral 12, is shown as being supported by a rod member 415 which depends from end portion 425 of arm member 424 carried by the robot helicopter. Rod member 415 is carried by a thrust type universal bearing assembly 426 which permits the rod member to swing fore and aft, laterally, or in any direction from the vertical with respect to the supporting end portion 425 of arm member 424.

Rod member 415 also extends upwardly with respect to bearing assembly 426 and extends through slots 427 and 428 located at right angles to each other as shown in FIG. 20. Slot 427 is provided in the upper portion 429 of an inverted U-shaped member, designated generally by reference numeral 430, having downwardly extending leg members 431 which are pivotally mounted at their ends by suitable means, not shown, so that the upper slot-containing member 429 may swing back and forth in a direction parallel to the longitudinal center line of the robot helicopter. In other words, U-shaped member 430 may swing in a fore and aft direction with respect to the robot helicopter.

U-shaped member 432 likewise includes downwardly extending leg members 433 and these leg members are pivotally mounted by suitable means, not shown, so that this U-shaped member may swing in a direction at right angles to the longitudinal center line of the robot helicopter. In other words, U-shaped member 432 may swing inboard and outboard with respect to the robot helicopter.

The dimensions of the respective slots 427 and 428 in the upper wall members 429 and 434, respectively, are such that when rod member 415 is moved away from a vertical portion, the rod member may engage a slot defining wall. Thus, if the upper end of the rod member moves in a forward direction, it causes U-shaped member 430 to swing in a forward direction and, if the rod member is moved in a rearward or aft direction, it causes this U-shaped member to follow accordingly. Correspondingly, if the upper end of the rod member moves inboard, U-shaped member 432 is swung inboard and if the rod member is moved outboard, this U-shaped member is moved outboard.

It is apparent, from the arrangement described, that movement of the upper end of rod member 415 in a direction which lies between fore and aft and inboard and outboard will cause movement of both U-shaped members 430 and 432, the amount of movement of each U-shaped member being the vector resolution of the vector representing the actual movement of the upper end of rod member 415. In other words, if the rod member moves in a direction at 45° to both fore and aft and inboard and outboard, both U-shaped members 430 and 432 are moved equally. This arrangement thus provides a means of obtaining voltage signals which are in proportion to the fore and aft, and inboard and outboard, movement components of the halter assembly.

U-shaped member 430 has one end of a link 435 pivotally connected thereto and the other end of the link is pivotally connected to an arm member 436 of a synchromechanism 437. Swinging movement of member 430 fore and aft thus causes arm 436 to swing fore and aft. As is explained in greater detail hereinafter in connection with the electrical circuitry of the precision hover system, this causes an electrical signal to be generated which is ultimately fed into the pitch control computer 307 (see FIG. 8) and results in corrective mechanical movement of the longitudinal cyclic or pitch control mechanism of the robot helicopter.

Correspondingly, U-shaped member 432 has one end of a link 438 pivotally connected thereto and the other end of this link is pivotally connected to an arm 439 of a synchro-mechanism 440. Consequently, inboard and outboard movement of member 432 causes inboard and outboard movement of arm 439 to produce corrective lateral cyclic or roll command signals as is explained hereinafter in connection with electrical features of the precision hover system. Movement of both U-shaped members 430 and 432, of course, causes movement of both synchro-mechanism actuating arms 436 and 439 in proportion to the fore and aft and inboard and outboard vector components of movement of halter rod member 415.

As shown in FIG. 19A, upwardly extending rod member 415 is detachably rigidly connected at its lower end to an elongated tubular casing 441 so that the casing extends downwardly with respect to rod member 415, the latter being in effect an upward extension of the longitudinal center line or axis of the tubular casing. A potentiometer 442 is located within the upper end portion of tubular casing 441 as shown in FIG. 19A. This potentiometer may be of any suitable type wherein movement of the potentiometer slide is caused by rotating a potentiometer drive shaft 443. In the embodiment of the halter apparatus shown, potentiometer drive shaft 443 is connected to and turned by a drive rod 444 which, as shown in FIGS. 21 and 22, has a square uniform cross section throughout its length. Furthermore, drive rod 444 is twisted or spiralled throughout its length so that, as explained below, when the drive rod is caused to turn, it may be caused to turn approximately ten times as a maximum, thereby actuating the potentiometer drive rod 443 through ten revolutions. This produces the predetermined maximum actuation of potentiometer 442 but, of course, the ten turn figure is merely illustrative.

Referring to FIG. 22, drive rod 444 is surrounded by an insulating tube 445, preferably polyethylene, which, in turn, is surrounded by a hollow tubular drive rod actuating member 446 which preferably has a square cross section as shown in FIG. 22. Thus, with the insulating tube 445 being preferably cylindrical, corner spaces 447 are provided between members 445 and 446 through which spaces electrical wires may be passed in going from the top to the bottom of the halter mechanism.

Square walled drive rod actuating member 446 is supported for lengthwise telescopic movement with respect to outer casing 441 by means of two roller assemblies. One of these roller assemblies, designated generally by the reference numeral 448, is attached to outer tubular casing 441 at the bottom thereof as shown in FIG. 19B. This assembly 448 includes four rollers 449 carried by roller supporting brackets 450 and positioned 90° with respect to each other so that there is a roller engaging each of the outer flat sides of square cross section member 446. In this way, the rollers not only provide an antifriction bearing for telescopic movement of member 446 with respect to outer casing 441, but they also prevent the square cross section tubular member from turning or twisting with respect to the outer casing.

The other roller assembly, indicated generally by the reference numeral 451, is located at the upper end of square cross section drive actuator 446, as shown in FIG. 19A, and is carried by the latter so as to be movable with it when the drive rod actuator telescopes in or out with respect to outer casing 441. Thus, assembly 451 includes a roller carrying bracket 452 which supports four rollers 453 preferably located at 90° with respect to each other so that all of the rollers engage the inner wall of outer casing 441 to prevent the upper end of drive rod actuator 446 from wobbling within casing 441.

A plurality of relatively thin washers 454 are mounted on and carried by bracket member 452 so as to move with drive rod actuator 446 when the latter is moved lengthwise with respect to outer casing 441. Each washer has a square cross section opening 455 (see FIG. 21) providing a snug sliding fit with the outer sides of square cross section driving rod 444. Since the washers are rigidly mounted on bracket 452 and are movable with drive rod actuating member 446 which cannot twist within outer casing 441, when actuator 446 is moved lengthwise from within casing 441, the washers 454 move along drive rod 444 and cause the latter to turn, due to the twisted or spiral configuration of the drive rod. The amount of turning naturally depends upon the amount of lengthwise movement of actuator 446 but, as mentioned above, total extension of the actuator can result in ten rotations, for example, of the potentiometer driving rod. As another example, the length of the drive rod 444 can be in the neighborhood of six feet and will naturally depend upon how high it is desired to have the robot helicopter above the ground surface when the halter assembly comes within reaching range of the ground handler. With the length just mentioned, the helicopter may be precision hovered to a height of approximately six feet above the handle.

A stop member 456 (see FIG. 19B) is located at the lower end portion of outer casing 441 and is of such a size that it will be engaged by the lower portion of upper bracket 452 to prevent further downward movement of drive rod actuator 446 with respect to casing 441. Actuator 446 is moved downwardly with respect to casing 441 by moving handle or grip member 457 downwardly. The handle or grip is connected to actuator 446 by means of a hollow connecting member 458 extending upwardly from the handle.

The grip 459 and other portions of handle 457, including an end casing 460, are hollow so as to accommodate various switch mechanisms and the electrical wiring necessary therefor. Grip 459 carries two push button type switches 461 and 462. These switches may be of any type known to those skilled in the art suitable for the purpose intended, but are preferably spring biased push button switches which are closed only when depressed and open in response to the spring bias when pressure on them is removed. These switches are the left turn and right turn switches respectively whereby the ground handler can cause the helicopter to turn left or right as desired.

End casing 460 carries plural switch members (see FIG. 23). Switch member 463 is a toggle type double pole double throw switch which, as is explained hereinafter in connection with electrical features of the precision hover system, is actuated to cause the precision hover relay 145 and control slave relay coil 168 to be energized whereby the ground handler takes over control of the helicopter. Switch 464 is also preferably a toggle switch which, when actuated, causes the various servo relays as to be engaged so that the various servo-mechanisms which actuate the mechanical control members for controlling collective pitch and the like in the helicopter will be connected to be able to perform their control functions in response to commands from the ground handler.

Switch member 465 is preferably a spring biased push button type switch which functions as a mission switch (cargo release, for example) when the helicopter is in the air, and which functions as an engine shutdown switch (close throttle switch) when the helicopter is on the ground.

Knob 466 is a rotatable control knob for the collective trim potentiometer (not shown) located in end casing 460. The function of this potentiometer is explained hereinafter in connection with the description of electrical features of the precision hover system.

Necessary electrical wiring for the various switches and the collective trim potentiometer passes through the upper hollow portion 467 of handle 457, through hollow neck member 458, and through space or spaces 447 (see FIG. 22) until it reaches bracket member 452. By means of a suitable connection indicated by reference numeral 468, the wiring is connected to an extensible cable member, indicated by reference numeral 469, which is capable of stretching and then contracting again as the drive rod actuator 446 is moved outwardly and inwardly with respect to casing 441. From extensible cable assembly 469, the wiring goes to the various components on the helicopter with which the various switches and potentiometers of the halter assembly are associated.

*Electrical Features of the Precision Hover System*

Referring back to FIG. 8, the precision hover or halter computer designated by box 220 is shown as having output leads designated by lines 470 and 471 going to pitch control computer 307 and roll control computer 308, respectively. The halter computer has a third output, indicated by line 221, going to the collective control computer 212. Therefore, when the ground handler takes over control of the helicopter, he can cause signals to go to the pitch, roll, and collective control computers to cause the helicopter to obey his commands as to attitude and altitude.

The halter computer is shown as having inputs coming from the halter mount designated by box 472 and the halter grip designated by box 457. A vertical gyroscope mechanism, designated by box 311, is shown as feeding into the halter mount. As is explained hereinafter, the halter mount is the assembly at the end portion 425 of arm member 424 which carries the halter assembly designated generally by the reference numeral 12 and which includes the synchro-mechanisms 437 and 440 which may be actuated, as described above, to produce electrical signals indicative of the extent of fore or aft and inboard or outboard movement of the halter assembly. The halter grip designation as used in FIG. 8 refers to those electrical features, including potentiometer 442 which is located within the upper end portion of tubular casing 441 as shown in FIG. 19A, whereby signals for controlling collective pitch may be produced by moving grip member 457, and consequently drive rod actuating member 446, longitudinally with respect to potentiometer drive rod 444.

Referring now to FIG. 24, the vertical gyroscope mechanism, designated generally by the reference numeral 311, is shown as including an input winding 473 which may be excited by any suitable A.C. source such as a 26 volt, 400 cycle A.C. source, for example. Dotted line 474 indicates the vertical axis of the gyroscope, i.e., that the gyroscope maintains a vertical attitude with respect to the ground surface.

Mechanism 311 has an output winding 475 which is connected back-to-back with an input winding 476 which, for the circuit shown in FIG. 24, is assumed to be the input winding to synchro-mechanism 437, i.e., the synchro-mechanism for producing electrical signals in response to fore or aft movement of the halter grip 457. Synchro-mechanism 437 also includes an output winding 477 positioned with respect to input winding 476 so as to be movable with respect thereto to change the inductive coupling therebetween. Dotted line 436 indicates arm member 436 of synchro-mechanism 437 (see FIGS. 19A and 20) whereby winding 477 is moved physically with respect to winding 476.

As will be understood by those skilled in the art, movement of the attitude of mechanical member 436 away from parallel (vertical) with respect to the attitude of gyroscope mechanism 311 indicated by dotted line 474 causes the inductive coupling between windings 476 and 477 to be different from the inductive coupling between windings 473 and 475. This results in unbalance of the bridge type circuit shown and the consequent production of an output signal on output lead 478 of synchro-mechanism 437. The magnitude of the output signal, which as an example is assumed to have a 400 cycle frequency, naturally depends upon the amount by which winding 477 is displaced away from vertical attitude with respect to winding 473.

The output signal on output lead 478 proceeds to a demodulator designated by box 479 which may be of any suitable type known to those skilled in the art capable of producing a D.C. error voltage having an amplitude proportional to the deviation from vertical of the attitude of mechanical member 436, and consequently winding 477. The D.C. output from demodulator 479 proceeds on lead 480 to a stabilizing network 481 which, as will be appreciated by those skilled in the art, shapes the signal to provide the proper voltage wave form to be fed to input winding 482 of the magnetic modulator designated by block 483. This magnetic modulator has exciting windings 484 and 485 which may be energized from A.C. bus 177 and D.C. bus 155, respectively. Output lead 470 of the magnetic modulator goes to the pitch control computer 307 as shown in FIG. 8 and comes from an output winding 486 of the magnetic modulator. As will be appreciated by those skilled in the art, with windings 482 and 485 having D.C. inputs thereto, and winding 484 having an assumed 400 cycle A.C. input, the signals produced by output winding 486 are 400 cycle signals having an amplitude in proportion to the amount of pitch correction desired and an assumed phase corresponding to whether the correction is to be fore or aft correction.

The precision hover roll command is produced in the same manner as has just been described in connection with the precision hover pitch command with the exceptions, of course, that roll synchro-mechanism 440 is involved instead of pitch synchro-mechanism 437 and the precision hover roll commands proceed via lead 471 to roll control computer 308. Consequently, it is deemed unnecessary to repeat a description of the circuitry for producing the precision hover roll commands.

When the halter grip 426 is moved away from vertical in a direction lying between fore and aft and inboard and outboard, then, of course, command signals are fed to both the pitch control computer and the roll control computer with the respective signals being in proportion to the fore and aft and inboard and outboard components making up the vector representing the actual movement of the halter grip. It is important to note also that when the pitch and roll commands are executed so that the synchro attitudes are parallel to the vertical gyro mechanism attitude, i.e., dotted line 436 is parallel to dotted line 474, the helicopter may, and probably will be, tilted away from horizontal so that it is not parallel to the ground surface. This simply means that the helicopter assumes an attitude sufficient to enable it to stay where the ground handler wants it to stay. Where, for example, a relatively strong wind is blowing, the helicopter will tilt sufficiently so that it has an attitude enabling it to maintain its position despite the wind.

Referring to FIG. 25, which shows precision hover electrical circuitry for producing the precision hover collective command, the reference numeral 487 designates generally a bridge circuit across which is applied a suitable D.C. potential, via lead 488, which is connected to a D.C. source, not shown. The D.C. potential may, as an example, be 150 volts. Potentiometer 442, which is the potentiometer located within the upper end of tubular casing 441 shown in FIG. 19A, is connected in series with two collective trim potentiometers 489 and 490 as shown in FIG. 25. Slide member 491 is actuated in response to up or down movement of the halter grip 457 which, in FIG. 25, is represented by the dotted line to which the reference numeral 457 is applied. Therefore, bridge circuit 487 may be unbalanced one way or the other by movement of slide 491 to cause a D.C. output voltage signal of one relative polarity or the other to proceed via output lead 492 to the stabilization network designated generally by reference numeral 493. Network 493 shapes the output signal in a manner known to those skilled in the art whereby the signal has the desired voltage wave form to be fed into the magnetic modulator designated generally by reference numeral 494. This magnetic modulator may be of any type suitable for the purpose intended as will be appreciated by those skilled in the art, whereby precision hover collective commands signals are produced on output lead 221 which goes to the collective control computer as shown in FIG. 8. Thus, magnetic modulator 494 is shown as being excited from A.C. bus 177 whereby the output signals on lead 221 will be 400 cycle signals.

Referring back to the left portion of FIG. 25, the collective trim potentiometers 489 and 490 each has a slide associated therewith and these slides are ganged together for movement simultaneously. Thus, potentiometer 489 has a slide 495 associated therewith and potentiometer 490 has a slide 496 associated therewith. Reference numeral 466 is applied to the dotted line in the bridge circuit of FIG. 25 which represents control knob 466 located on end casing 460 of handle 457. Thus, rotation of knob 466 simultaneously adjusts slides 495 and 496 one way or the other, depending upon the direction in which the knob is turned. The effect of this, as will be appreciated by those skilled in the art, is to shift the neutral or center of potentiometer 442 to thereby provide a shift of the neutral point of the bridge and consequently a change of the altitude. Of course, when halter handle 457 is pulled down to cause slide 491 to be moved and thus produce a down collective command, when the helicopter responds to this command and does move downwardly, the twisted or spiralled configuration of potentiometer drive rod 444 causes it to turn in a direction to move the potentiometer slide back to its initial position and thus rebalance bridge circuit 487. This results, of course, from the fact that drive rod actuating member 446 is prevented from turning when drive rod 444 moves longitudinally with respect thereto.

FIG. 26 is an electrical diagram of switch members carried by the precision hover, or halter, handle 457, this figure also showing leads associated with these switch members. Thus, double pole double throw switch 463 is shown as including a precision hover switch 495 which, when closed, grounds lead 496 which goes to precision hover relay 145 (see FIG. 10) whereby, when lead 496 is grounded, the precision hover relay is energized to, among other things, interrupt the circuit from lead 141 coming from the North-South decoder to the various resonant reed tone relays and thereby interrupt or prevent any remote signals from going to the control apparatus. Switch member 463 also includes a switch 497 which, when closed, connects control lead 211 to D.C. bus 155, thereby actuating relay coil 168 of the slave relay associated with control tone relay 152. (See FIG. 10.) This keeps the switching circuitry on control, i.e., memory-control latching relay 162 is either kept on control position or actuated to control position so that lead 178 going to the North-South and East-West memory servo-mechanisms is energized from A.C. bus 177. Therefore, with the precision hover control switches 495 and 497 being ganged together, when toggle member 463 is actuated, both switches are moved to on position at substantially the same time and the ground handler assumes control of the helicopter.

Switch 464, when closed, connects lead 498 to D.C. bus 155. This energizes suitable servo engage relays, not shown, associated with the various servo-mechanisms in conventional manner so that the mechanisms are suitably coupled to the various control instrumentalities which they are to control. Since such servo engage relays are customarily associated with servo-mechanisms, they have been omitted from the drawings and will be understood as being of any type suitable for the purposes intended and known to those skilled in the art. Switch 464 is simply included to show that the ground handler will actuate a switch to, so to speak, set up the various servo-mechanisms for use.

Switch 465, when closed, connects lead 209 to D.C. bus 155. When lead 209 is thus energized, it causes slave relay coil 168 associated with the mission and engine shutdown relay 150 to be energized (see FIG. 10). This actuates relay arm 192. When the helicopter is in the air, this results in actuation of a cargo release mechanism, for example, which is not shown since it may be any suitable such mechanism. When the helicopter is on the ground, actuation of arm 192 energizes lead 194 which, as is shown in FIG. 18, causes an override D.C. signal to be applied to the throttle control circuit and close the throttle to shut down the engine.

Closing of left turn switch 461 located on grip portion 459 of halter handle 457 connects lead 210 to D.C. bus 155. This energizes the slave relay coil 168 associated with left turn resonant reed tone relay 151 (see FIG. 10). As explained above in connection with the directional control channel (FIG. 17), this causes the helicopter to turn left.

Closing of right turn switch 462 connects lead 208 to lead 201 which, as shown in FIG. 10, comes from fixed contact 197 of the slave relay associated with the left turn tone relay 151. This is simply an interlock feature to insure that right turn switch 462 will not be effective to attempt to cause the helicopter to turn right if the left turn switch has been actuated. The proximity of the two switches is such as to make this interlock desirable. Assuming that the left turn relay is not energized, then lead 201 is connected through to D.C. bus 155 as shown in FIG. 10 and thus, when switch 462 is closed, lead 208 is energized. Again referring to FIG. 10, lead 208 goes to the slave relay coil 168 associated with right turn tone relay 149. Therefore, when the slave relay coil is energized, it actuates relay arm 189, resulting in turning of the helicopter to the right as described above in connection with the directional control channel (see FIG. 17).

*Summary of Operation*

Since the operation of component parts making up an embodiment of a remote control system according to the present invention has been described above under applicable headings relating to such component parts, the summary of operation which follows does not attempt to repeat details of operation of such component parts but, instead, describes generally the control sequence of a typical flight. In this connection, it is assumed that the helicopter involved is of the aforementioned model HTK type (see FIG. 1) but the description will be understood as being applicable in general to other types of helicopter having comparable mechanical flight controls.

Prior to the start of the flight, the ground control station 11 is set up as indicated schematically in FIG. 1 with the table surface 84 of the ground controller 82 oriented to magnetic North as indicated in FIG. 5. This means that the North-South potentiometer 39 is oriented along a North-South line and the East-West potentiometer 41 is oriented along an East-West line. If desired, the annular table surface portion 85 may be turned so that the meter assembly 86 will be facing the operator. Through a suitable power switch, not shown, the command transmitter 36 is started up. The spring centered memory-control switch 74 (see FIG. 5) is checked to see that it is actuated to the memory side, i.e., moved to the left as viewed in FIG. 4.

The robot helicopter, located at a convenient takeoff point, should be started up at the time the transmitter power is turned on. With the engine running, the radio receiver 125 and such components as the vertical gyroscope mechanism 311 are energized by throwing suitable switches, not shown, so that the necessary electronic and auto-pilot components of the robot helicopter are operationally ready. During this period, the electronic component will warm up and the vertical gyro will erect. Also, the heading channel which feeds into the pedal servo loop described above will synchronize on the fuselage heading.

When the remote operator is given the signal that the robot helicopter is ready, he checks to see that the collective control ring 48 is rotated to the down stop (see FIG. 5) and that the speed-heading control stick 45 is in the vertical position. Following this, he holds the memory-control switch 74 to the right as viewed in FIG. 4, i.e., toward control position. As explained above in connection with FIG. 4, this puts the robot helicopter on control, this fact being observed if desired by providing a rotating memory light or the like on the helicopter which got out when memory-control latching relay 162 is actuated to control position (see FIG. 10). In the robot, the fact that the remote operator has taken over control can be indicated by a suitable control light or the like if desired.

When it is known that the remote operator has taken over control, the safety pilot or handler at the robot helicopter readies the helicopter for takeoff by moving the cyclic stick to zero the pitch and roll error meters, brings the engine up to near its ultimate speed, and engages the necessary servo-mechanisms. The engine will continue to accelerate to a predetermined speed (3200 r.p.m., for example) under the control of the engine speed regulator and the throttle servo. When this is accomplished, the robot helicopter is ready for takeoff.

The remote operator, upon seeing the handler leave the robot helicopter or receiving a signal from the safety pilot, rotates collective control ring 48 toward Up Collective. In due course, at about two-thirds "Up," for example, the robot helicopter will leave the ground. The collective control should be adjusted to hold the hover between five and twenty feet. In calm air, a setting is found readily where this altitude range is held. In a wind, small corrections will be required. Any drift of the robot helicopter may be compensated for by leaning the speed-heading control stick 45 in a direction opposite to the helicopter drift. The robot helicopter is turned right or left while hovering by rotating knob 101 atop the speed-heading control stick 45 in the desired direction of turn. Releasing knob 101 stops the turn and the robot helicopter, on heading hold, holds this heading.

The robot helicopter is put into forward flight by displacing the speed-heading control stick 45 away from vertical in the direction of the fuselage heading. The robot will then being to accelerate, greater displacement of the stick from the vertical resulting in a higher final speed. Addition of power, by increasing the collective setting, i.e., turning collective control ring 48 further toward Up Collective, will result in the robot helicopter climbing in forward flight.

At a predetermined air speed, twenty-five knots, for example, the air speed switch will trip and the robot helicopter will then perform all maneuvers with the pedals coordinated to the turn. The remote operator may turn the robot helicopter by gradually changing the direction in which the speed-heading control stick 45 is leaned. In response, the robot helicopter will bank smoothly and level out on the new heading. The higher the rate of turn commanded, the greater is the degree of bank.

When the desired cruise altitude is reached, the collective control ring 48 is rotated from the climb setting in a Down Collective direction (see FIG. 5) to a predetermined setting such as approximately midway of its range of movement. The robot helicopter can now be put on altitude hold by stopping the transmission of any further transmission of the collective tone from the command transmitter. The robot helicopter will maintain its altitude through all flight maneuvers within its power capabilities.

If desired, the robot helicopter may be put on memory by actuating the memory-control switch 74 toward memory position (to the left as viewed in FIG. 4) and holding the switch toward memory position for a predetermined period of time (five seconds, for example). As described above in connection with operation on memory, the robot helicopter will continue on the last commanded course and at the last commanded altitude until taken under control again by the remote ground or airborne operator. To take over such control, the remote operator first leans the air speed-heading control stick 45 at the estimated heading and speed of the robot helicopter. The memory-control switch 74 is held on control for a predetermined period of time (five seconds, for example) or until a visual memory beacon or the like on the helicopter is observed to go out. If the estimated course and speed were in error, the attitude of the robot helicopter will change to obey the new command.

To land the robot helicopter, it is flown downwind from the landing site and then turned into the wind back toward the desired landing spot. The remote operator actuates the direct collective switch 22, thus taking the robot helicopter off of altitude hold, and rotates the collective control ring 48 to reduce the collective pitch to establish a descent. Air speed is reduced gradually as the robot helicopter approaches landing by moving the speed control stick 45 toward vertical. At a predetermined air speed (twenty knots, for example), the air speed switch will trip, putting the robot helicopter on heading hold. As the robot helicopter loses speed, it will be necessary to increase collective pitch in order to maintain altitude.

When the robot is hovering steadily over the desired landing spot, the collective pitch is reduced slightly by rotating collective control ring 48 toward Down Collective and the robot will settle gradually to the ground. After the landing gear makes contact with the ground, the collective ring 48 is brought full down and the close throttle switch 17 is actuated to bring the engine to idle. Then, when the rotors have slowed to a stop, the ground handler or safety pilot can secure the robot helicopter by turning off the remote control system and shutting down the engine.

*Conclusion*

From the foregoing detailed description and summary of operation, it is submitted as being apparent that, by utilizing a remote control system according to the present invention, a robot or drone helicopter can be controlled effectively and accurately from a remote control location. As mentioned in the introductory portion of this application, this enables the robot helicopter to perform many missions which would be impractical, hazardous or impossible to perform with a piloted helicopter. In particular, such a remotely controlled robot helicopter may perform many types of specialized military missions, anti-submarine warfare being merely one example of such military use.. An example of a hazardous non-military mission is use of a robot helicopter for fighting dangerous forest fires.

In the detailed description presented above, a robot helicopter has been described as being controlled from a ground control station. In this connection, it is to be understood that the term "ground" refers to any remote control location whether it be on land or at sea (on shipboard, for example). Also, it is submitted as being apparent that remote control according to the teaching of the present invention can be exercised from the air and, if desired, the operator could even occupy a seat in the robot helicopter, in which case the remote control unit would be adapted to be plugged into the helicopter control system instead of employing a transmitter and receiver.

It is submitted as being further apparent that even where the remote control commands are issued from the ground, these commands could be transmitted to the robot helicopter by a cable instead of utilizing radio commands. In the latter instance, the robot helicopter may be a "tethered" version, i.e., is restrained at a selected altitude by a cable which also supplies power to the robot from a surface power supply. Such a "tethered" version has obvious utility as an airborne platform for the elevation of radar to increase detection ranges against aerial targets, for over-the-horizon guidance of surface-to-air missiles, and for positioning electronic countermeasures equipment.

The precision hover control apparatus described above makes it possible to secure accuracy and otherwise facilitate the discharge of cargo or the like at a selected point. By placing control in the hands of the ground handler, the helicopter can be made responsive to precise commands exercised by the person who is, so to speak, on the spot. The precision hover system is therefore a valuable part of the overall remote control system and contributes materially to the overall utility of such a system.

While we have described and illustrated embodiments of our invention, we wish it to be understood that we do not intend to be restricted solely thereto but that we do intend to cover all modifications thereof which would be apparent to one skilled in the art and which come within the spirit and scope of our invention.

We claim as our invention:

1. A control system for a robot aircraft comprising control means remote from said aircraft including means for producing electrical signals representing flight direction and air speed commands, and means electrically connected to said signal producing means to transmit said signals to said robot aircraft; and control means carried by said robot aircraft including means to receive said signals transmitted from said remote control means, means electrically connected to said receiving means for producing electrical signals representing flight commands commanding said aircraft to fly in a first direction, means electrically connected to said receiving means for simultaneously producing electrical signals representing flight commands commanding said aircraft to fly in a second direction at right angles to said first direction, means electrically connected to both of said aircraft carried signal producing means for producing a resultant signal representing the desired direction of flight of said aircraft, and means electrically connected to said resultant signal producing means for converting said resultant signal into forward and lateral mechanical flight control movements.

2. A control system for a robot aircraft according to claim 1, wherein said flight direction and air speed signal producing means at said remote control means includes means for producing electrical signals representing flight commands commanding said aircraft to fly in said first direction, and means for simultaneously producing electrical signals representing flight commands commanding said aircraft to fly in said second direction.

3. A control system for a robot aircraft according to claim 1, wherein said first and second direction signal producing means carried by said aircraft include memory means operable to remember the last signals received by said receiving means.

4. A control system for a robot aircraft according to claim 3, wherein said memory means is a servo-mechanism.

5. A control system for a robot aircraft comprising control means remote from said aircraft including means for producing electrical signals representing North or South flight direction commands, means for producing electrical signals representing East or West flight direction commands, means electrically connected to both of said signal producing means to transmit composite North or South and East or West signals to said robot aircraft; and control means carried by said robot aircraft including means to receive said composite signals, means electrically connected to said receiving means to decode said composite signals into North or South and East or West flight direction command signals having a magnitude in accordance with the magnitude of said signals as produced by the respective signal producing means at said remote control means, means electrically connected to said aircraft-carried North or South and East or West flight direction signal producing means for producing resultant signal representing the desired direction of flight of said aircraft, means operatively associated with said resultant signal producing means for resolving said resultant signal into a lateral flight command signal having a magnitude proportional to the difference between the actual direction of flight of said aircraft and the desired direction of flight of said aircraft, and means electrically connected to said resolving means to convert said lateral flight command signal into mechanical lateral flight control movement.

6. A control system for a robot aircraft comprising control means remote from said aircraft including a remote controller having a reference axis, a movable mechanical member supported by said remote controller for movement in any direction away from said reference axis, a first electrical signal producing means carried by said remote controller, a second electrical signal producing means carried by said remote controller and located at right angles to said first signal producing means, means connecting both signal producing means to said movable mechanical member, said connecting means actuating each signal producing means to an extent proportional to the corresponding vector component of movement of said movable member, means electrically connected to both of said signal producing means to transmit signals produced by said means to said robot aircraft; and control means carried by said robot aircraft including means to receive the signals transmitted by said transmitting means, means electrically connected to said receiving means to convert the received first direction signals into mechanical flight control movements urging said aircraft to fly in one direction, and means electrically connected to said receiving means to convert said second direction signals into mechanical flight control movements urging said aircraft to fly in a direction at right angles to said first direction.

7. A control system for a robot aircraft comprising a ground control station including a ground controller having a reference axis, a movable mechanical member supported by said ground controller for movement in any direction away from said reference axis, North or South and East or West electrical signal producing means carried by said ground controller, means connecting said movable mechanical member to both said North or South and East or West signal producing means, said connecting means actuating both said North or South and East or West signal producing means when said movable mechanical member is moved away from said reference axis in a direction lying between due North or South and due East or West, the signals produced by each of said signal producing means being proportional in magnitude to the corresponding North or South and East or West vector component of movement of said movable mechanical member, means electrically connected to said signal producing means to transmit both North or South and East or West signals to said robot aircraft; and control means carried by said robot aircraft including means to receive the signals transmitted by said transmitting means, means electrically connected to said receiving means for producing North or South flight command signals having a magnitude dependent upon the magnitude of the North or South signals produced by the North or South signal producing means at the ground control station, means electrically connected to said receiving means for producing East or West flight command signals having a magnitude dependent upon the magnitude of the East or West signals produced by the East or West signal producing means at the ground control station, and means electrically connected to said North or South and East or West aircraft carried signal producing means for producing a resultant signal representing the desired direction of flight of said robot aircraft.

8. A control system for a robot aircraft comprising a ground control station including a ground controller having a horizontal table surface, a stick projecting centrally vertically upward with respect to said table surface, means carried by said ground controller supporting said stick for movement in any direction away from vertical, North-South and East-West electrical signal producing means, means connecting said stick to said North-South and East-West electrical signal producing means, said connecting means being operable when said stick is tilted away from vertical to actuate said North-South and East-West signal producing means to produce a North-South signal having a magnitude proportional to the North-South component of movement of said stick, and to produce an East-West signal having a magnitude proportional to the East-West component of movement of said stick, and means electrically connected to said signal producing means to transmit both signals to said robot aircraft; and control means carried by said robot aircraft including means to receive the signals transmitted by said transmitting means, means electrically connected to said receiving means to produce North-South and East-West signals in accordance with the North-South and East-West signals transmitted from the ground control station, and means electrically connected to said aircraft carried signal producing means to produce a resultant signal having a direction corresponding to the direction in which said stick was moved and having a magnitude dependent upon the extent of movement of said stick away from vertical.

9. A control system for a robot aircraft according to claim 8, wherein the signal producing means at the ground control station includes a first potentiometer oriented along a line lying in a North-South plane, and a second potentiometer oriented along a line lying in an East-West plane.

10. A control system for a robot aircraft according to claim 9, wherein said resultant signal producing means carried by the robot aircraft includes a first electrical winding oriented along a line lying in a North-South plane, and a second electrical winding oriented along a line lying in an East-West plane.

11. Apparatus for controlling a robot aircraft, said apparatus being carried by said robot aircraft and comprising means for producing a directional control signal having a linear orientation in the desired direction of flight of said aircraft, means operatively associated with said signal producing means to produce a lateral flight command electrical signal having a magnitude which is a function of the angular difference between the desired direction of flight of said aircraft and the heading of said aircraft, and means electrically connected to said lateral flight command signal producing means to convert said lateral flight command signal into a mechanical lateral flight control movement.

12. Apparatus for controlling a robot aircraft, said apparatus being carried by said robot aircraft and comprising means for producing a directional control signal having a linear orientation in the desired direction of flight of said aircraft, means operatively associated with said signal producing means for resolving said control signal into a forward flight command electrical signal and a lateral flight command electrical signal, means electrically connected to said resolving means to convert said forward flight command signal into mechanical forward flight control movement, and means electrically connected to said resolving means to convert said lateral flight command signal into mechanical lateral flight control movement.

13. Apparatus for controlling a robot aircraft, said apparatus being carried by said robot aircraft and comprising means for producing a magnetic flux signal along a flux path corresponding to the desired direction of flight of said aircraft, means inductively associated with said flux producing means for producing an electrical signal representing a lateral flight direction command and having a magnitude which is a function of the angular difference between the heading of said aircraft and the desired direction of flight of said aircraft, and means electrically connected to said lateral flight direction signal producing means for converting said lateral flight command signal into mechanical lateral flight control movement.

14. Apparatus for controlling a robot aircraft, said apparatus being carried by said robot aircraft and comprising means for producing a magnetic flux signal along a flux path corresponding to the desired direction of flight of said aircraft, said means including a first flux producing electrical winding oriented along a North-South axis and a second flux producing electrical winding oriented along an East-West axis, resolver means inductively coupled to said flux producing means for resolving said flux signal into a first electrical signal representing forward flight command and a second electrical signal representing a lateral flight command, means electrically connected to said resolver means for converting said forward flight signal into mechanical forward flight control movement, and means electrically connected to said resolver means for converting said lateral flight signal into mechanical lateral flight control movement.

15. A control system for a robot helicopter comprising control means remote from said helicopter including means for producing electrical signals representing collective pitch commands, means for producing electrical signals representing longitudinal cyclic pitch commands, means for producing electrical signals representing lateral cyclic pitch commands, and means electrically connected to all of said signal producing means for transmitting all of said signals to said robot helicopter; and control means carried by said robot helicopter including means to receive the signals transmitted by said transmitted means, means electrically connected to said receiving means to convert the received collective pitch signals into mechanical collective pitch control movements, means electrically connected to said receiving means to convert the received longitudinal cyclic pitch signals into mechanical longitudinal cyclic pitch control movements, and means electrically connected to said receiving means to convert the received lateral cyclic pitch signals into mechanical lateral cyclic pitch control movements.

16. A control system for a robot helicopter according to claim 15, wherein said transmitting means includes means to produce a composite signal for transmission by said transmitting means, said composite signal including all of the signals produced by said signal producing means, and the control means carried by said robot helicopter includes signal decoding means connected between said signal receiving means and said signal converting means.

17. A control system for a robot helicopter according to claim 15, wherein said control means carried by said robot helicopter also includes means for producing electrical signals representing changes in altitude, and means electrically connected to said last named means for converting said altitude signals into mechanical collective pitch control movements.

18. A control system for a robot helicopter comprising control means remote from said helicopter including means for producing electrical signals representing longitudinal cyclic pitch commands, means for producing electrical signals representing lateral cyclic pitch commands, means for producing a memory signal, and means electrically connected to said all of said signal producing means to transmit all of said signals to said robot helicopter; and control means carried by said robot helicopter including means to receive the signals transmitted by said transmitting means, means electrically connected to said receiving means to convert the received longitudinal cyclic pitch command signals into mechanical longitudinal cyclic pitch control movements, means electrically connected to said receiving means to convert the received lateral cyclic pitch command signals into mechanical lateral cyclic pitch control movements, memory signal responsive means electrically connected to said receiving means, and means electrically connecting said memory signal responsive means to both of said converting means, the latter being operable, in response to operation of said memory signal responsive means, to remember the last longitudinal cyclic pitch command signals and lateral cyclic pitch command signals received by said receiving means whereby said robot helicopter flies in a direction and at an air speed commanded at the time said memory signal is received by said receiving means.

19. A control system for a robot helicopter according to claim 18, wherein said control means carried by said robot helicopter also includes means to produce electrical signals representing changes in altitude, and means electrically connected to said last named means to convert said altitude signals into mechanical collective pitch control movements.

20. A control system for a robot helicopter according to claim 18, wherein said control means remote from said helicopter also includes means for producing a control signal, and said transmitting means is electrically connected to said control signal producing means to transmit said control signal to said robot helicopter; and said control means carried by said robot helicopter also includes control signal responsive means connected to said receiving means, and means connecting said control signal responsive means to said memory signal responsive means, said control signal responsive means being operable upon receipt of a control signal by said receiving means to overcome said memory signal responsive means whereby a remote operator may resume control over said robot helicopter after the latter has been flying on memory.

21. A control system for a robot helicopter comprising control means remote from said helicopter including means for producing electrical signals representing flight direction and air speed commands, electrical control signal producing means, electrical memory signal producing means, transmitter means, means electrically connecting said flight direction and air speed signal producing means to said transmitter means, means selectively connecting either said control signal producing means or said memory signal producing means to said transmitter means, said transmitter means being operative to transmit both said flight direction and air speed signals and either said control signals or said memory signals to said robot helicopter, and means connected to said transmitter means to de-energize said transmitter means after said memory signals have been transmitted by said transmitter means; and control means carried by said robot helicopter including means to receive the signals transmitted by said transmitter means, means electrically connected to said receiving means to convert the received flight direction and air speed signals into mechanical forward and lateral flight control movements, and means electrically connected to said converting means to maintain said robot helicopter on the last commanded heading and air speed, said last named means being responsive to receipt of said memory signal by said receiving means.

22. A control system for a robot helicopter comprising means for producing electrical signals representing flight direction and air speed commands, and means electrically connected to said signal producing means to transmit said flight direction and air speed command signals to said robot helicopter; and control means carried by said robot helicopter including means to receive the signals transmitted by said transmitting means, and means electrically connected to said receiving means to convert the received signals into mechanical longitudinal and lateral cyclic pitch control movements, said converting means including memory means operable to remember the last flight direction and air speed signals received by said receiving means, and said receiving means including means to actuate said memory means when flight direction and air speed command signals received by said receiving means are below a predetermined strength.

23. For use in a control system for a robot helicopter, a ground control station comprising means for producing electrical signals representing flight direction and air speed commands, electrical control signal producing means, electrical memory signal producing means, means for transmitting electrical signals produced by any of said signal producing means, means electrically connecting said flight direction and air speed signal producing means to said transmitting means, means selectively connecting either said control signal producing means or said memory signal producing means to said transmitting means, and means connected to said transmitting means to stop said transmitting means after said memory signal producing means has been connected to said transmitting means.

24. For use in a control system for a robot helicopter, a ground control station according to claim 23, wherein said stopping means includes time delay means operable to permit said transmitting means to transmit flight direction and air speed command signals for a predetermined time after said memory signal producing means is connected to said transmitting means.

25. A control system for a robot helicopter comprising control means remote from said helicopter including a plurality of sub-carrier oscillators each having a predetermined sub-carrier frequency, means electrically connected to each of said sub-carrier oscillators to frequency modulate each oscillator carrier wave to produce frequency modulated sub-carrier signals representing flight direction and air speed commands, a transmitter having a predetermined carrier frequency, and means connecting said sub-carrier oscillators to said transmitter to frequency modulate said transmitter carrier wave, said transmitter being operative to transmit a composite signal including said modulated sub-carrier signals; and control means carried by said robot helicopter including means to receive the composite signal transmitted by said transmitter, means electrically connected to said receiving means to decode the received composite signal into component signals in accordance with the modulation imparted to said sub-carrier waves, and means electrically connected to said decoding means to convert the decoded component signals into mechanical longitudinal and lateral cyclic pitch control movements, of such a character as to cause said helicopter to fly in the direction and at the air speed corresponding to said flight direction and air speed commands.

26. A control system for a robot helicopter comprising control means remote from said helicopter including a plurality of sub-carrier oscillators each having a predetermined sub-carrier frequency, means electrically connected to each of said sub-carrier oscillators to frequency modulate each oscillator carrier wave to produce frequency modulated sub-carrier signals representing flight direction and air speed commands, a plurality of fixed frequency oscillators each having a different fixed frequency, means to connect any one of said fixed frequency oscillators to one of said sub-carrier oscillators to frequency modulate the carrier wave of said one sub-carrier oscillator, a transmitter having a predetermined carrier frequency, and means connecting said sub-carrier oscillators to said transmitter to frequency modulate said transmitter carrier wave, said transmitter being operative to transmit a composite signal including said modulated sub-carrier signals; and control means carried by said robot helicopter including means to receive the composite signal transmitted by said transmitter, means electrically connected to said receiving means to decode the received composite signal into component signals in accordance with the modulation imparted to said sub-carrier waves, mean electrically connected to said decoding means to convert the decoded flight direction and air speed command signals into mechanical longitudinal and lateral cyclic pitch control movements of such a character as to cause said helicopter to fly in the direction and at the air speed corresponding to said flight direction and air speed commands, and a plurality of tone relays electrically connected to said decoding means, there being a tone relay corresponding to each fixed frequency oscillator and each tone relay being operative in response to receipt of a decoded signal having a frequency of the fixed frequency oscillator to which the tone relay corresponds.

27. A control system for a robot helicopter comprising control means remote from said helicopter including means for producing electrical signals representing flight direction and air speed commands, and means electrically connected to said signal producing means for transmitting said signals to said robot helicopter; and control means carried by said robot helicopter including means to receive the signals transmitted by said transmitter means, means electrically connected to said receiving means to convert the received signals into mechanical longitudinal and lateral cyclic pitch control movements of such a character as to cause said helicopter to fly in the direction and at the air speed corresponding to said flight direction and air speed commands, means for producing electrical signals representing yaw correcting commands, and means electrically connected to said yaw signal producing means to convert said yaw signals into mechanical yaw control movements.

28. A control system for an engine driven robot helicopter comprising control means remote from said helicopter including means for producing electrical signals representing flight direction and air speed commands, and transmitter means electrically connected to said signal producing means for transmitting said signals to said robot helicopter; and control means carried by said helicopter including means to receive the signals transmitted by said transmitter means, means electrically connected to said receiving means for converting flight direction and air speed command signals received by said receiving means into mechanical flight direction and air speed control movements, and engine speed regulating means including means connected to said engine for producing electrical signals representing the difference between actual engine speed and a predetermined engine speed, and means electrically connected to said engine speed signal producing means for converting said engine speed difference signals into mechanical engine speed control movements to adjust the engine speed to said predetermined engine speed.

29. A control system for an engine driven robot helicopter according to claim 28, wherein said means for converting said engine speed difference signals into mechanical engine speed control movements includes means automatically operable to decrease the rate of adjustment when said robot helicopter is on the ground.

30. A control system for a robot helicopter comprising a ground control station including a ground controller having a vertical reference axis and North-South and East-West axes intersecting said vertical axis, a mechanical flight direction and air speed control member carried by said ground controller, said mechanical member being supported by said ground controller for movement in any direction away from said vertical axis, electrical signal producing means carried by said ground controller, means mechanically connecting said flight direction and air speed control member to said signal producing means, said connecting means being operable, upon movement of said mechanical member, to actuate said signal producing means to produce North-South and East-West electrical signals each proportional, respectively, to the North-South and East-West vector of movement of said mechanical control member away from said vertical axis, and transmitter means electrically connected to said signal producing means for transmitting signals produced by said signal producing means to said robot helicopter; and control means carried by said helicopter including means to receive the signals transmitted by said transmitter means, a North-South and an East-West decoder connected to said receiving means for decoding, respectively, the North-South and East-West signals received by said receiving means, a North-South signal producing means connected to said North-South decoder, an East-West signal producing means connected to said East-West decoder, means electrically connected to both said North-South and East-West signal producing means to combine North-South and East-West signals produced by said means into into a resultant signal having an orientation in the desired direction of flight of said helicopter and a magnitude proportional to the desired air speed of said helicopter, resolver means operatively associated with said combining means to resolve said resultant signal into forward flight and lateral flight command signals, a servo-mechanism connected to said resolver means for converting forward flight signals produced by said resolver means into mechanical forward flight control movements, and a servo-mechanism connected to said resolver means for converting lateral flight signals produced by said resolver means into lateral flight control movements.

31. A control system for a robot helicopter according to claim 30, wherein the control means carried by said helicopter also includes means responsive to changes in altitude of said helicopter, means connected to said altitude responsive means for producing electrical signals representing changes in altitude detected by said altitude responsive means, and means electrically connected to said altitude signal producing means for converting signals produced by said means into mechanical collective pitch control movements.

32. A control system for a robot helicopter comprising a ground control station including a ground controller having a vertical reference axis and North-South and East-West reference axes, a vertical control stick supported by said ground controller for movement in any direction away from said vertical reference axis, a North-South potentiometer located on said North-South axis and an East-West potentiometer located on said East-West axis, means mechanically connecting said control stick to said potentiometers to actuate said North-South potentiometer an amount proportional to the North-South vector component of movement of said control stick away from vertical and to actuate said East-West potentiometer an amount proportional to the East-West vector component of movement of said control stick away from vertical, and transmitter means electrically connected to said potentiometers to transmit North-South and East-West signals produced by said potentiometers to said robot helicopter; and control means carried by said robot helicopter including means to receive the signals transmitted by said transmitter means, decoder means connected to said receiving means to decode North-South and East-West signals received by said receiving means, North-South and East-West signal producing means connected to said decoder means and including a pair of electrical windings located electrically 90° apart, one of said windings being oriented along a North-South axis and the other winding being oriented along an East-West axis whereby said windings have a spatial correspondence to the North-South and East-West potentiometers located at the ground control station, means operatively associated with said windings to produce a magnetic flux vector having an orientation corresponding to the direction in which said control stick at the ground control station was moved away from vertical and a magnitude proportional to the amount of said movement away from vertical, resolver means operatively associated with said flux producing means for resolving said flux signal into a forward flight command electrical signal and a lateral flight command electrical signal each being a vector component of said resultant signal, a servo-mechanism connected to said resolver signal, means to convert said forward flight signal into mechanical forward flight control movement, and a servo-mechanism connected to said resolver means to convert said lateral flight signal into mechanical lateral flight control movement.

33. A control system for a robot helicopter according to claim 32, wherein said ground control station also includes a collective potentiometer, and said transmitter means is electrically connected to said collective potentiometer to transmit collective signals to said robot helicopter; and said control means carried by said robot helicopter also includes a collective decoder, means connected to said collective decoder to produce electrical signals representing collective pitch commands, and a servo-mechanism connected to said collective pitch signal producing means for converting collective pitch signals into mechanical collective pitch control movements.

34. In a control system for a robot helicopter, a remote control station including means for producing an electrical signal representing a North-South component of the desired direction of flight of a robot helicopter, means for producing an electrical signal representing an East-West component of the desired direction of flight of a robot helicopter, means for producing an electrical signal representing a collective pitch command for a robot helicopter, and means electrically connected to all of said signal producing means for transmitting said signals to a robot helicopter.

35. In a control system for a robot helicopter, a remote control station according to claim 34, wherein each of said signal producing means is a potentiometer, said remote control station also includes a flight direction and air speed control stick, and said North-South and East-West signal producing potentiometers are each connected to said control stick, movement of said control stick in a direction other than due North or South, or due East or West, actuating both said North-South potentiometer and said East-West potentiometer.

36. A control system for a robot helicopter comprising control means remote from said helicopter including means for producing electrical signals representing collective pitch commands, means for producing electrical signals representing longitudinal cyclic pitch commands, means for producing electrical signals representing lateral cyclic pitch commands, and means electrically connected to all of said signal producing means for transmitting all of said signals to said robot helicopter; precision hover control means carried by said robot helicopter including means for producing electrical signals representing collective pitch commands, means for producing electrical signals representing longitudinal cyclic pitch commands, and means for producing electrical signals representing lateral cyclic pitch commands; control means carried by said helicopter including means to receive the signals transmitted by said transmitting means, means electrically connectible to either said receiving means or said precision hover collective pitch signal producing means for converting either the received collective pitch signals or the precision hover collective pitch signals into mechanical collective pitch control movements, means electrically connectible to either said receiving means or said precision hover longitudinal cyclic pitch signal producing means to either convert the received longitudinal cyclic pitch signals into mechanical longitudinal cyclic pitch control movements or to convert the precision hover longitudinal cyclic pitch signals into mechanical longitudinal cyclic pitch control movements, and means electrically connectible to either said receiving means or said precision hover lateral cyclic pitch signal producing means to either convert the received lateral cyclic pitch signals into mechanical lateral cyclic pitch control movements or to convert the precision hover lateral cyclic pitch signals into mechanical lateral cyclic pitch control movements.

37. A control system for a robot helicopter according to claim 36, wherein said precision hover control means also includes means actuable by a ground handler to enable the ground handler to assume control of said robot helicopter, and said control means carried by said robot helicopter includes means connected to and responsive to actuation of said actuable means for disconnecting all of said converting means from said receiving means and connecting said converting means to said precision hover signal producing means.

38. A precision hover control system for a robot helicopter comprising an elongated precision hover control member, means carried by said helicopter supporting one end of said control member so that said control member hangs vertically downward from said helicopter, said control member including first and second members one of which is tubular and the other of which is telescopically received in the bore of said tubular member, one of said first and second members also including a grip member which is movable lengthwise of said control member with respect to the upper end of said control member to effect relative telescoping movement of said first and second members, means carried by said control member and located within said tubular member thereof which means is responsive to lengthwise movement of said first member relative to said second member for producing electrical signals representing collective pitch commands, and means carried by said helicopter and electrically connected to said signal producing means for converting said signals into mechanical collective pitch control movements.

39. A precision hover control system for a robot helicopter comprising an elongated precision hover mechanical control member, means carried by said helicopter supporting one end of said control member so that said control member hangs vertically downward from said helicopter, the length of said control member being such that the lower end of the control member can come within reach of a ground handler while said helicopter is hovering above the ground surface on which the ground handler is standing, said support means for said control member supporting said control member so that the lower end of the control member may be moved away from vertical in any direction, said support means also including means for producing electrical signals proportional to the amount of fore and aft and inboard or outboard movement of the lower end of said control member away from vertical regardless of the attitude of said helicopter, said control member including a grip and said grip being movable lengthwise of said control member with respect to the supported upper end of said control member, means carried by said control member for producing electrical signals representing collective pitch commands in response to lengthwise movement of said grip, means carried by said helicopter and electrically connected to said fore and aft and inboard or outboard signal producing means for converting fore or aft and inboard or outboard signals into mechanical fore or aft and inboard or outboard flight control movements to cause said helicopter to move in the fore or aft and inboard or outboard directions respectively, and means carried by said helicopter and electrically connected to said collective pitch signal producing means for converting collective pitch signals into mechanical collective pitch control movements.

40. A precision hover control system for a robot helicopter comprising an elongated hollow precision hover control member, means carried by said helicopter supporting one end of said control member so that the opposite end of the control member is free and the control member hangs vertically downward, said supporting means also supporting said control member so that the lower end of the control member may be moved away from vertical in any direction, an elongated rod carried by said control member and located axially with respect to said control member, a telescopic tube surrounding said rod, said tube having a hand grip at one end thereof, means in said control member supporting said tube for lengthwise movement with respect to said rod, means carried by said tube and engaging said rod to turn said rod when said tube moves lengthwise with respect to said rod, and means connected to said rod and responsive to turning movement of said rod for producing electrical signals representing collective pitch commands.

41. A precision hover control apparatus for a robot helicopter comprising an elongated tubular casing, means at one end of said casing for attaching said casing with respect to a helicopter so that said casing hangs vertically with respect to said helicopter, electrical signal producing means carried by said casing adjacent the end of said casing adapted to be supported by a helicopter, an elongated drive rod for actuating said signal producing means, an inner tubular sleeve surrounding said drive rod, means supporting said inner sleeve for lengthwise movement with respect to said drive rod and said casing whereby said sleeve may be extended from within said casing in a direction axially of said casing, and means carried by said inner sleeve and engaging said drive rod to turn said drive rod when said sleeve is moved lengthwise with respect to said drive rod.

42. A precision hover control system for a robot helicopter comprising precision hover control means carried by said robot helicopter and adapted to be actuated by a ground handler on a ground surface above which the helicopter is hovering to produce electrical signals representing collective pitch commands, said control means including collective trim means adapted for manipulation by said ground handler for adjusting said control means, and means electrically connected to said collective pitch signal producing means for converting said collective pitch signals into mechanical collective pitch control movements.

43. A control system for a robot helicopter comprising control means remote from said helicopter including means for producing an electrical signal representing a right turn command, means for producing an electrical signal representing a left turn command, and means electrically connected to said signal producing means for transmitting said signals to said robot helicopter; and control means carried by said robot helicopter including means to receive signals transmitted by said transmitter means, means electrically connected to said receiving means to convert the received signals into mechanical right turn or left turn control movements depending upon whether said receiving means receives a right turn signal or a left turn signal, means to disconnect said turn signal converting means from said receiving means, and means responsive to the air speed of said robot helicopter, said air speed responsive means being connected to said disconnecting means and being operable to actuate said disconnecting means when the air speed of said robot helicopter exceeds a predetermined air speed.

44. A control system for a robot helicopter comprising control means remote from said helicopter including means for producing electrical signals representing flight direction and air speed commands, and means electrically connected to said signal producing means for transmitting said signals to said robot helicopter; and control means carried by said robot helicopter including means to receive the signals transmitted by said transmitter means, means electrically connected to said receiving means to convert the received signals into mechanical longitudinal and lateral cyclic pitch control movements, means for producing electrical signals representing yaw correcting commands, means electrically connected to said yaw signal producing means to convert said yaw signals into mechanical yaw control movements, means to disconnect said yaw signal converting means from said yaw signal producing means, and means responsive to the air speed of said robot helicopter, said air speed means being connected to said disconnecting means and being operable to actuate said disconnecting means when the air speed of said robot helicopter exceeds a predetermined air speed.

45. A precision hover control system for a robot helicopter comprising an elongated rigid control rod supported at its upper end by said robot helicopter so that the lower end of the rod can come within reach of a ground handler while said helicopter is hovering above the ground surface on which the ground handler is standing, said control rod hanging downwardly with respect to said helicopter and being supported so that the lower end of the rod may be grasped to move said lower end away from vertical in any direction, means for producing fore or aft electrical signals proportional to the amount of fore or aft movement respectively of the lower end of said rod away from vertical regardless of the attitude of said helicopter and for producing inboard or outboard electrical signals proportional to the amount of inboard or outboard movement respectively of the lower end of said rod away from vertical regardless of the attitude of said helicopter, and means electrically connected to said signal producing means for converting said fore or aft signals into fore or aft mechanical flight control movements to cause said helicopter to move in the fore or aft direction respectively and for converting said inboard or outboard signals into mechanical inboard or outboard flight control movements to cause said helicopter to move in the inboard or outboard direction respectively.

46. A precision hover control system for a robot helicopter comprising an elongated precision hover mechanical control member, means carried by said helicopter supporting one end of said control member so that said control member hangs vertically downward with respect to said helicopter, the length of said control member being such that the lower end of the control member can come within reach of a ground handler while said helicopter is hovering above the ground surface on which the ground handler is standing, said support means for said control member supporting said control member so that the lower end of the control member may be moved away from vertical in any direction, said support means also including means for producing electrical signals proportional to the amount of fore and aft and inboard or outboard movement of the lower end of said control member away from vertical, said control member including a grip and said grip being movable lengthwise of said control member with respect to the supported upper end of said control member, means carried by said control member for producing electrical signals representing collective pitch commands in response to lengthwise movement of said grip, means carried by said helicopter and electrically connected to said fore and aft and inboard or outboard signal producing means for converting fore or aft and inboard or outboard signals into mechanical fore or aft and inboard or outboard flight control movements, and means carried by said helicopter and electrically connected to said collective pitch signal producing means for converting collective pitch signals into mechanical collective pitch control movements, said precision hover control member including a rotatable rod member, said collective pitch signal producing means being actuated by rotation of said rod member to produce collective pitch signals, and means connected to said grip to rotate said rod member when said grip is moved lengthwise with respect to the supported upper end of said control member.

47. In a control system for a robot helicopter, a remote control station including a flight direction control means, an annular upper surface member surrounding said flight direction control means, other control means carried by and projecting upwardly from said annular upper surface member, and means supporting said annular upper surface member for turning movement about a vertical axis relative to said flight direction control means whereby said flight direction control means may be oriented with respect to magnetic North and said annular upper surface member may be turned relative to said flight control means so that said other control means are facing the operator.

48. A precision hover control system for a robot helicopter comprising an elongated control member supported at its upper end by said robot helicopter so that the lower end of the member can come within reach of a ground handler while said helicopter is hovering above the ground surface on which the ground handler is standing, said control member hanging downward from said helicopter and being supported so that the lower end of said member may be grasped to move said lower end away from vertical in any direction, a vertical gyroscope mechanism carried by said helicopter and which vertical gyroscope maintains a vertical reference axis with respect to said ground surface regardless of the attitude of said helicopter, means interconnected with said vertical gyroscope mechanism for producing fore or aft electrical signals proportional to the amount of fore or aft movement respectively of the lower end of said member away from vertical and for producing inboard or outboard electrical signals proportional to the amount of inboard or outboard movement respectively of the lower end of said member away from vertical, and means electrically connected to said signal producing means for converting said fore or aft signals into fore or aft mechanical flight control movements to cause said helicopter to move in the fore or aft direction respectively and for converting said inboard or outboard signals into mechanical inboard or outboard flight control movements to cause said helicopter to move in the inboard or outboard direction respectively.

49. A precision hover control system for a robot helicopter comprising an elongated control member supported at its upper end by said robot helicopter so that the lower end of the member can come within reach of a ground handler while said helicopter is hovering above the ground surface on which the ground handler is standing, said control member hanging downwardly with respect to said helicopter and being supported so that the lower end of said member may be grasped to move said lower end away from vertical in any direction, means for stabilizing said helicopter to cause the latter to hover over a substantially fixed point on said ground surface when said control member is disposed vertically relative to said ground surface regardless of the attitude of said helicopter, means for causing said helicopter to move fore or aft when said lower end of said control member is moved fore or aft respectively away from vertical, and means for causing said helicopter to move laterally inboard or outboard as the lower end of said control member is moved laterally inboard or outboard respectively away from vertical.

References Cited in the file of this patent

UNITED STATES PATENTS

| | | |
|---|---|---|
| 1,958,259 | Becker | May 8, 1934 |
| 1,974,884 | Opel | Sept. 25, 1934 |
| 2,188,158 | Rock | Jan. 23, 1940 |
| 2,379,778 | Allen | July 3, 1945 |
| 2,393,892 | Ganahl | Jan. 29, 1946 |
| 2,442,205 | Kail | May 25, 1948 |
| 2,524,238 | Soule | Oct. 3, 1950 |
| 2,567,212 | Klopp | Sept. 11, 1951 |
| 2,650,046 | Vanderlip | Aug. 25, 1953 |
| 2,680,579 | Hohenemser | June 8, 1954 |
| 2,733,878 | Ciscel | Feb. 7, 1956 |
| 2,873,075 | Mooers | Feb. 10, 1959 |
| 2,925,234 | Wodal | Feb. 16, 1960 |

UNITED STATES PATENT OFFICE
CERTIFICATE OF CORRECTION

Patent No. 3,096,046                              July 2, 1963

Delvin E. Kendall, Jr., et al.

It is hereby certified that error appears in the above numbered patent requiring correction and that the said Letters Patent should read as corrected below.

Column 8, line 49, for "tbe" read -- be --; column 9, line 46, for "59" read -- 69 --; column 10, line 47, for "circuits" read -- circuit --; line 57, for "it" read -- its --; column 11, line 70, for "one" read -- on --; column 18, line 1, for "Whe" read -- When --; line 32, for "memery" read -- memory --; column 24, line 32, for "on" read -- of --; column 25, line 51, after "stick" insert -- 45 --; column 28, line 18, for "detent" read -- detect --; column 36, line 35, strike out "as"; column 40, line 71, for "got" read -- goes --; column 41, line 30, for "being" read -- begin --; column 43, line 61, after "producing", second occurrence, insert -- a --; column 46, line 19, for "transmitted", second occurrence, read -- transmitting --.

Signed and sealed this 21st day of January 1964.

(SEAL)
Attest:
ERNEST W. SWIDER

Attesting Officer

EDWIN L. REYNOLDS

Acting Commissioner of
Patents

UNITED STATES PATENT OFFICE
CERTIFICATE OF CORRECTION

Patent No. 3,096,046 July 2, 1963

Delvin E. Kendall, Jr., et al.

It is hereby certified that error appears in the above numbered patent requiring correction and that the said Letters Patent should read as corrected below.

Column 8, line 49, for "tbe" read -- be --; column 9, line 46, for "59" read -- 69 --; column 10, line 47, for "circuits" read -- circuit --; line 57, for "it" read -- its --; column 11, line 70, for "one" read -- on --; column 18, line 1, for "Whe" read -- When --; line 32, for "memery" read -- memory --; column 24, line 32, for "on" read -- of --; column 25, line 51, after "stick" insert -- 45 --; column 28, line 18, for "detent" read -- detect --; column 36, line 35, strike out "as"; column 40, line 71, for "got" read -- goes --; column 41, line 30, for "being" read -- begin --; column 43, line 61, after "producing", second occurrence, insert -- a --; column 46, line 19, for "transmitted", second occurrence, read -- transmitting --.

Signed and sealed this 21st day of January 1964.

(SEAL)
Attest:
ERNEST W. SWIDER

Attesting Officer

EDWIN L. REYNOLDS

Acting Commissioner of Patents